US011919325B2

(12) United States Patent
Kunieda et al.

(10) Patent No.: US 11,919,325 B2
(45) Date of Patent: Mar. 5, 2024

(54) ENCLOSING-SEALING APPARATUS AND IMAGE FORMING SYSTEM

(71) Applicants: Akira Kunieda, Tokyo (JP); Michitaka Suzuki, Kanagawa (JP); Shinji Asami, Tokyo (JP); Nobuyoshi Suzuki, Tokyo (JP); Yuusuke Shibasaki, Tokyo (JP); Takahiro Matsuda, Kanagawa (JP); Makoto Hidaka, Tokyo (JP); Kazuyoshi Matsuo, Miyagi (JP); Shingo Yoshizawa, Kanagawa (JP); Takahiro Watanabe, Kanagawa (JP); Takuya Morinaga, Tokyo (JP)

(72) Inventors: Akira Kunieda, Tokyo (JP); Michitaka Suzuki, Kanagawa (JP); Shinji Asami, Tokyo (JP); Nobuyoshi Suzuki, Tokyo (JP); Yuusuke Shibasaki, Tokyo (JP); Takahiro Matsuda, Kanagawa (JP); Makoto Hidaka, Tokyo (JP); Kazuyoshi Matsuo, Miyagi (JP); Shingo Yoshizawa, Kanagawa (JP); Takahiro Watanabe, Kanagawa (JP); Takuya Morinaga, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 127 days.

(21) Appl. No.: 17/721,762

(22) Filed: Apr. 15, 2022

(65) Prior Publication Data

US 2022/0379653 A1 Dec. 1, 2022

(30) Foreign Application Priority Data

May 26, 2021 (JP) ................................ 2021-088534

(51) Int. Cl.

| | |
|---|---|
| ***B43M 3/04*** | (2006.01) |
| ***B43M 5/04*** | (2006.01) |
| ***G03G 15/00*** | (2006.01) |

(52) U.S. Cl.

CPC ............ *B43M 3/045* (2013.01); *B43M 5/042* (2013.01); *G03G 15/6582* (2013.01)

(58) Field of Classification Search

CPC ................................ B43M 3/045; B43M 5/02

(Continued)

(56) References Cited

U.S. PATENT DOCUMENTS 5,020,473 A * 6/1991 Bergman ............... B43M 5/042 118/680

2004/0250517 A1* 12/2004 Hsieh ..................... B43M 3/045 53/284.3

(Continued)

FOREIGN PATENT DOCUMENTS

| | | |
|---|---|---|
| JP | 9-058193 | 3/1997 |
| JP | 2011-194651 | 10/2011 |

(Continued)

*Primary Examiner* — Jacob A Smith

(74) *Attorney, Agent, or Firm* — Harness, Dickey & Pierce, P.L.C.

(57) ABSTRACT

An enclosing-sealing apparatus includes a flap opener that opens a flap of an envelope while the envelope is conveyed to an enclosing position. A first envelope detector is disposed upstream from the flap opener in an envelope conveyance direction and detects both ends of the envelope in the envelope conveyance direction. A second envelope detector is disposed downstream from the flap opener in the envelope conveyance direction and detects both ends of the envelope in the envelope conveyance direction in an open state in which the flap opens. A controller determines the open state of the flap based on a first detection result sent from the first envelope detector and a second detection result sent from the second envelope detector. The controller performs trouble- (Continued)

shooting for enclosing the enclosure into the envelope if the controller determines that the open state of the flap is faulty.

16 Claims, 35 Drawing Sheets

(58) Field of Classification Search
USPC .......................................................... 53/415
See application file for complete search history.

(56) References Cited

U.S. PATENT DOCUMENTS

| | | | | |
|---|---|---|---|---|
| 2006/0042196 | A1* | 3/2006 | Stemmle | B65B 43/28<br>53/381.5 |
| 2007/0069448 | A1* | 3/2007 | Honda | B65H 31/10<br>271/145 |
| 2012/0192529 | A1* | 8/2012 | Sytema | B65H 39/043<br>53/469 |
| 2012/0260606 | A1* | 10/2012 | Noguchi | G03G 15/6594<br>53/255 |
| 2016/0026411 | A1* | 1/2016 | Nishihata | B65H 45/142<br>358/1.12 |
| 2019/0299667 | A1* | 10/2019 | Furumido | B65H 31/3027 |
| 2021/0279538 | A1* | 9/2021 | Suzuki | B65H 31/10 |

FOREIGN PATENT DOCUMENTS

| | | |
|---|---|---|
| JP | 2012-162340 | 8/2012 |
| JP | 2018-001572 | 1/2018 |

* cited by examiner

ENCLOSING-SEALING APPARATUS AND IMAGE FORMING SYSTEM

CROSS-REFERENCE TO RELATED APPLICATION

This patent application is based on and claims priority pursuant to 35 U.S.C. § 119(a) to Japanese Patent Application No. 2021-088534, filed on May 26, 2021, in the Japan Patent Office, the entire disclosure of which is hereby incorporated by reference herein.

BACKGROUND

Technical Field

Exemplary aspects of the present disclosure relate to an enclosing-sealing apparatus and an image forming system, and more particularly, to an enclosing-sealing apparatus and an image forming system incorporating the enclosing-sealing apparatus.

Discussion of the Background Art

Related-art enclosing apparatuses for enclosing an enclosure into an envelope automatically include an enclosing-sealing apparatus that encloses a folded sheet, serving as an enclosure that is produced by performing predetermined folding on a sheet serving as a medium, into an envelope and seals the envelope. A related-art image forming system interlocks an image forming apparatus with a folding apparatus and an enclosing-sealing apparatus. The image forming apparatus forms an image on a sheet. The folding apparatus folds the sheet formed with the image. The enclosing-sealing apparatus encloses the folded sheet formed with the image into an envelope and seals the envelope.

SUMMARY

This specification describes below an improved enclosing-sealing apparatus. In one embodiment, the enclosing-sealing apparatus encloses an enclosure into an envelope conveyed to an enclosing position and seals the envelope. The enclosing-sealing apparatus includes a conveyance roller that conveys the envelope to the enclosing position and a flap opener that opens a flap of the envelope while the envelope is conveyed to the enclosing position. A first envelope detector is disposed upstream from the flap opener in an envelope conveyance direction in which the envelope is conveyed. The first envelope detector detects a leading end and a trailing end of the envelope in the envelope conveyance direction while the envelope is conveyed. A second envelope detector is disposed downstream from the flap opener in the envelope conveyance direction. The second envelope detector detects the leading end and the trailing end of the envelope in the envelope conveyance direction in an open state in which the flap opens while the envelope is conveyed. A controller controls enclosing of the enclosure into the envelope. The controller determines the open state of the flap based on a first detection result sent from the first envelope detector and a second detection result sent from the second envelope detector. The controller performs troubleshooting for enclosing the enclosure into the envelope if the controller determines that the open state of the flap is faulty.

This specification further describes an improved image forming system. In one embodiment, the image forming system includes an image forming apparatus that forms an image on a medium and the enclosing-sealing apparatus described above that encloses the medium as an enclosure sent from the image forming apparatus into an envelope.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
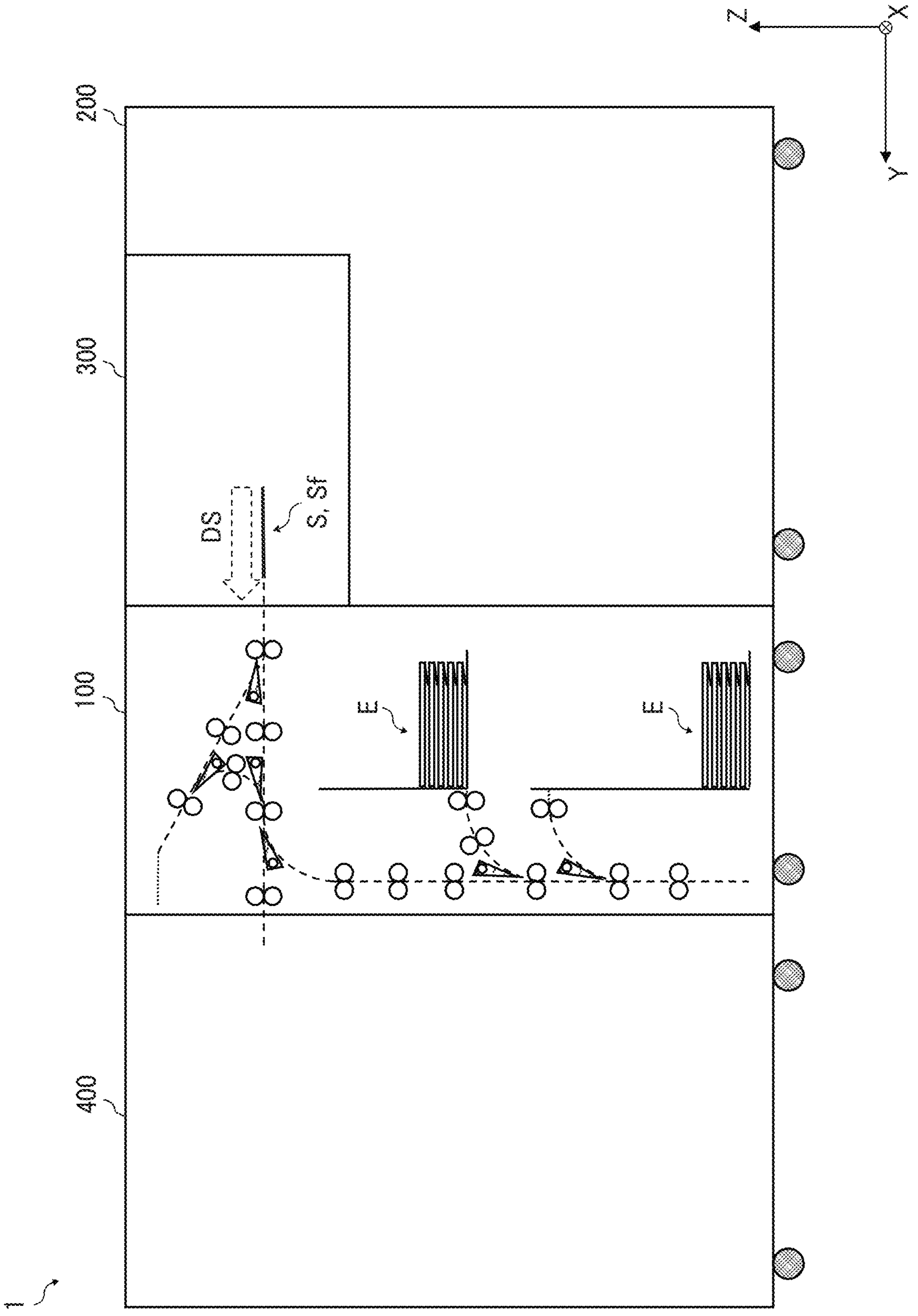
FIG. 1 is a front cross-sectional view of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

A description is provided of a construction of an image forming system according to an embodiment of the present disclosure.

FIG. 1 is a front cross-sectional view of a print system 1 as one example of the image forming system, schematically illustrating an interior construction thereof. The print system 1 includes an image forming apparatus 200, a folding apparatus 300 serving as a sheet processing apparatus, an enclosing-sealing apparatus 100 according to an embodiment of the present disclosure, and a post-processing apparatus 400.

The image forming apparatus 200 is one example of an apparatus that forms an image on a sheet S serving as a medium by a predetermined image forming method and ejects the sheet S. The folding apparatus 300 performs predetermined folding on the sheet S, serving as the medium formed with the image, to produce a folded sheet Sf and ejects the folded sheet Sf to the enclosing-sealing apparatus 100. Alternatively, the folding apparatus 300 may not fold the sheet S and may eject the sheet S to the enclosing-sealing apparatus 100. The image forming apparatus 200 includes a controller (e.g., a printer controller 260 described below with reference to FIG. 2) that outputs an instruction to fold or not to fold the sheet S based on information input by a user of the print system 1. Alternatively, a folding controller 320 illustrated in FIG. 2, that is incorporated in the folding apparatus 300, may output the instruction based on the information input by the user of the print system 1. The enclosing-sealing apparatus 100 performs enclosing-sealing processing to enclose the folded sheet Sf serving as an enclosure into an envelope E and seal the envelope E. The enclosure is ejected by an upstream apparatus (e.g., the image forming apparatus 200 or the folding apparatus 300) disposed upstream from the enclosing-sealing apparatus 100 in a sheet conveyance direction DS in which the folded sheet Sf is conveyed into the enclosing-sealing apparatus 100. In addition to the folded sheet Sf, the enclosure also defines the sheet S conveyed into the enclosing-sealing apparatus 100 from the upstream apparatus disposed upstream from the enclosing-sealing apparatus 100 in the sheet conveyance direction DS. Alternatively, the enclosing-sealing apparatus 100 may not perform the enclosing-sealing processing on the sheet S or the folded sheet Sf and may eject the sheet S or the folded sheet Sf to a downstream apparatus disposed downstream from the enclosing-sealing apparatus 100 in the sheet conveyance direction DS.

The post-processing apparatus 400 performs post-processing, such as stapling, instructed via the controller on the sheet S or the folded sheet Sf ejected from the folding apparatus 300 or the enclosing-sealing apparatus 100 disposed upstream from the post-processing apparatus 400 in the sheet conveyance direction DS.

The enclosing-sealing apparatus 100 encloses the folded sheet Sf into the envelope E in a proper orientation. The proper orientation defines an orientation of the folded sheet Sf in which an information area such as an address printed on the folded sheet Sf serving as the enclosure overlaps a transparent window formed in the envelope E in advance so that the user visually recognizes the address through the transparent window after the folded sheet Sf is enclosed in the envelope E. A plurality of types of folding is available for the folded sheet Sf. An orientation of the information area such as the address with respect to the sheet conveyance direction DS varies depending on the type of folding. To address this circumstance, the enclosing-sealing apparatus 100 determines whether or not to reverse the folded sheet Sf in a direction perpendicular to the sheet conveyance direction DS of the folded sheet Sf according to the type of folding. If the enclosing-sealing apparatus 100 determines that the folded sheet Sf is to be reversed, a conveying mechanism of the enclosing-sealing apparatus 100 reverses the folded sheet Sf by using a conveyance path disposed upstream from an enclosing position where the folded sheet Sf is enclosed into the envelope E in the sheet conveyance direction DS, and then conveys the folded sheet Sf to the enclosing position. Details of control processes for reversing and conveying the folded sheet Sf are described below. Similarly, the enclosing-sealing apparatus 100 also encloses the sheet S, serving as an enclosure that is not folded, into the envelope E.

A description is provided of coordinate axes referred to in descriptions of embodiments of the present disclosure.

As illustrated in FIG. 1, Y-axis defines an axis that is parallel to a placement face on which the print system 1 is placed and is extended in an arrangement direction in which the apparatuses (e.g., the image forming apparatus 200, the folding apparatus 300, the enclosing-sealing apparatus 100, and the post-processing apparatus 400) that construct the print system 1 are arranged. A direction indicated with an arrow of Y-axis defines a positive Y-direction. A direction opposite to the positive Y-direction defines a negative Y-direction. The sheet S bearing the image formed by the image forming apparatus 200 is conveyed in the positive Y-direction. Thereafter, the sheet S is conveyed to the folding apparatus 300, the enclosing-sealing apparatus 100, and the post-processing apparatus 400 that are disposed downstream from the image forming apparatus 200 in the positive Y-direction.

Similarly, X-axis defines an axis that is parallel to the placement face on which the print system 1 is placed and is extended in a front-rear direction of the print system 1. A direction indicated with an arrow of X-axis defines a positive X-direction. A direction opposite to the positive X-direction defines a negative X-direction.

Z-axis defines an axis that is perpendicular to X-axis and Y-axis and is extended in a height direction of the print system 1. A direction indicated with an arrow of Z-axis defines a positive Z-direction. A direction opposite to the positive Z-direction defines a negative Z-direction.

If drawings referred to in descriptions below are also attached with coordinate axes similar to the coordinate axes described above, directions of the coordinate axes are also defined as described above.

The sheet S bearing the image formed by the image forming apparatus 200 is ejected in the positive Y-direction. Thereafter, the sheet S is conveyed to the folding apparatus 300, the enclosing-sealing apparatus 100, and the post-processing apparatus 400 that are disposed downstream from the image forming apparatus 200 in the positive Y-direction. Hence, the positive Y-direction is equivalent to the sheet conveyance direction DS. However, although the sheet S enters the enclosing-sealing apparatus 100 in the positive Y-direction, the sheet S or the folded sheet Sf is conveyed in a Z-direction when the sheet S or the folded sheet Sf is inserted into the envelope E and the envelope E is sealed.

For example, in the enclosing-sealing apparatus 100 of the print system 1, the envelope E is conveyed in the Z-direction. The envelope E is conveyed to the enclosing position in the positive Z-direction. The envelope E is conveyed from the enclosing position to a sealing position where the envelope E is sealed in the negative Z-direction.

Figure 2:
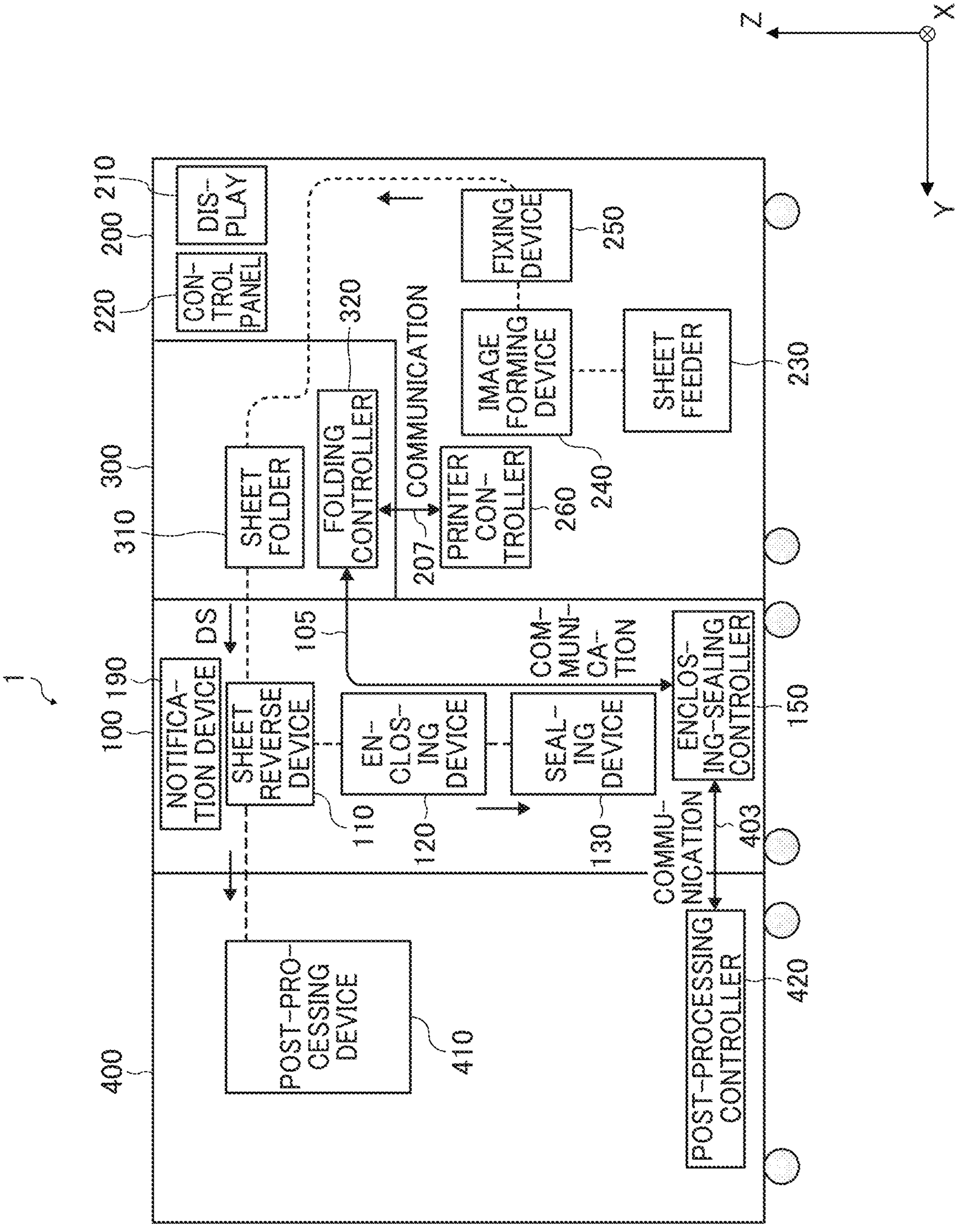
FIG. 2 is a block diagram of the image forming system depicted in FIG. 1, illustrating a control configuration thereof.

Referring to FIG. 2, a description is provided of functional blocks of an entirety of the print system 1.

In a description below, an enclosure serving as a medium conveyed and inserted into the envelope E is the folded sheet Sf that bears the image formed by the image forming apparatus 200 and is treated with predetermined folding by the folding apparatus 300. FIG. 2 illustrates a motion path (e.g., a conveyance path) of the folded sheet Sf with a broken line. FIG. 2 illustrates a channel used for sending and receiving a signal between the functional blocks with a solid line. FIG. 2 illustrates a motion path (e.g., a conveyance path) of the sheet S with the broken line also.

For example, the image forming apparatus 200 forms the image on the sheet S by general electrophotographic processes. The image forming apparatus 200 includes a display 210, a control panel 220, a sheet feeder 230, an image forming device 240, a fixing device 250, and the printer controller 260.

The display 210 displays information to the user, such as a status of each function and an operation to be specified by the user. The control panel 220 is equivalent to an operation interface with which the user performs settings such as a setting for specifying an operating mode and a number of prints and a setting for reversing the sheet S when the enclosing-sealing apparatus 100 inserts the sheet S or the folded sheet Sf into the envelope E. The sheet feeder 230 includes a sheet feeding mechanism that stocks the sheets S and separates and feeds the sheets S one by one. The image forming device 240 forms a latent image on a photoconductor, develops the latent image into an image (e.g., a toner image), and transfers the image onto the sheet S. The fixing device 250 fixes the image transferred onto the sheet S thereon. The printer controller 260 controls operations of the functional blocks described above.

A description is provided of a construction of the enclosing-sealing apparatus 100.

The enclosing-sealing apparatus 100 includes a sheet reverse device 110, an enclosing device 120, a sealing device 130, a notification device 190, and an enclosing-sealing controller 150.

Figure 34A:
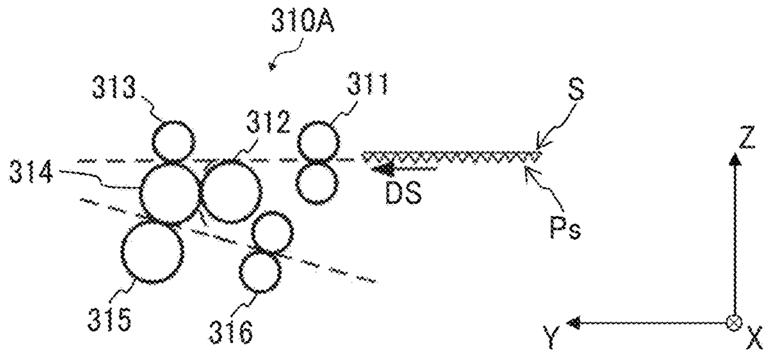
FIG. 34A is a cross-sectional view of a sheet folder of one type interlocked with the enclosing-sealing apparatus depicted in FIG. 3, illustrating a process for folding a sheet.

The sheet reverse device 110 performs sheet conveyance processing that conveys the folded sheet Sf conveyed from a sheet folder 310 to the enclosing position according to an orientation of an image forming face Ps of the folded sheet Sf illustrated in FIG. 34A. The sheet conveyance processing defines conveyance of the folding sheet Sf, that corresponds to a control mode (e.g., a type of folding, a position on a print face of the folded sheet Sf, and the like) instructed to the enclosing-sealing controller 150 from the folding controller 320 via a communication line 105. In other words, the sheet reverse device 110 performs conveyance of the folded sheet Sf downstream in the sheet conveyance direction DS, reversing of the folded sheet Sf to change places of a leading end and a trailing end of the folded sheet Sf in the sheet conveyance direction DS, and the like. Conveyance and reversing of the folded sheet Sf convey the folded sheet Sf to the enclosing device 120 or the post-processing apparatus 400.

The enclosing device 120 includes a mechanism that moves the envelope E to the enclosing position where the folded sheet Sf conveyed from the sheet reverse device 110 is inserted into the envelope E, causes the envelope E to wait at a predetermined position, and inserts the folded sheet Sf serving as the enclosure into the envelope E that waits. The enclosing device 120 further includes a mechanism that opens a flap ef illustrated in FIG. 3 so that a mouth (e.g., an opening) of the envelope E opens before the envelope E reaches the predetermined position. The enclosing device 120 further includes a mechanism used to calculate a length of the envelope E (e.g., a dimension in an enclosing direction in which the enclosure is inserted into the envelope E) and a length of the flap ef before the envelope E reaches the predetermined position. The mechanisms insert the folded sheet Sf into the envelope E in an open state in which the envelope E is held at the predetermined position and the mouth of the envelope E opens. The mechanisms insert the folded sheet Sf into the envelope E that varies in type and size properly.

Figure 3:
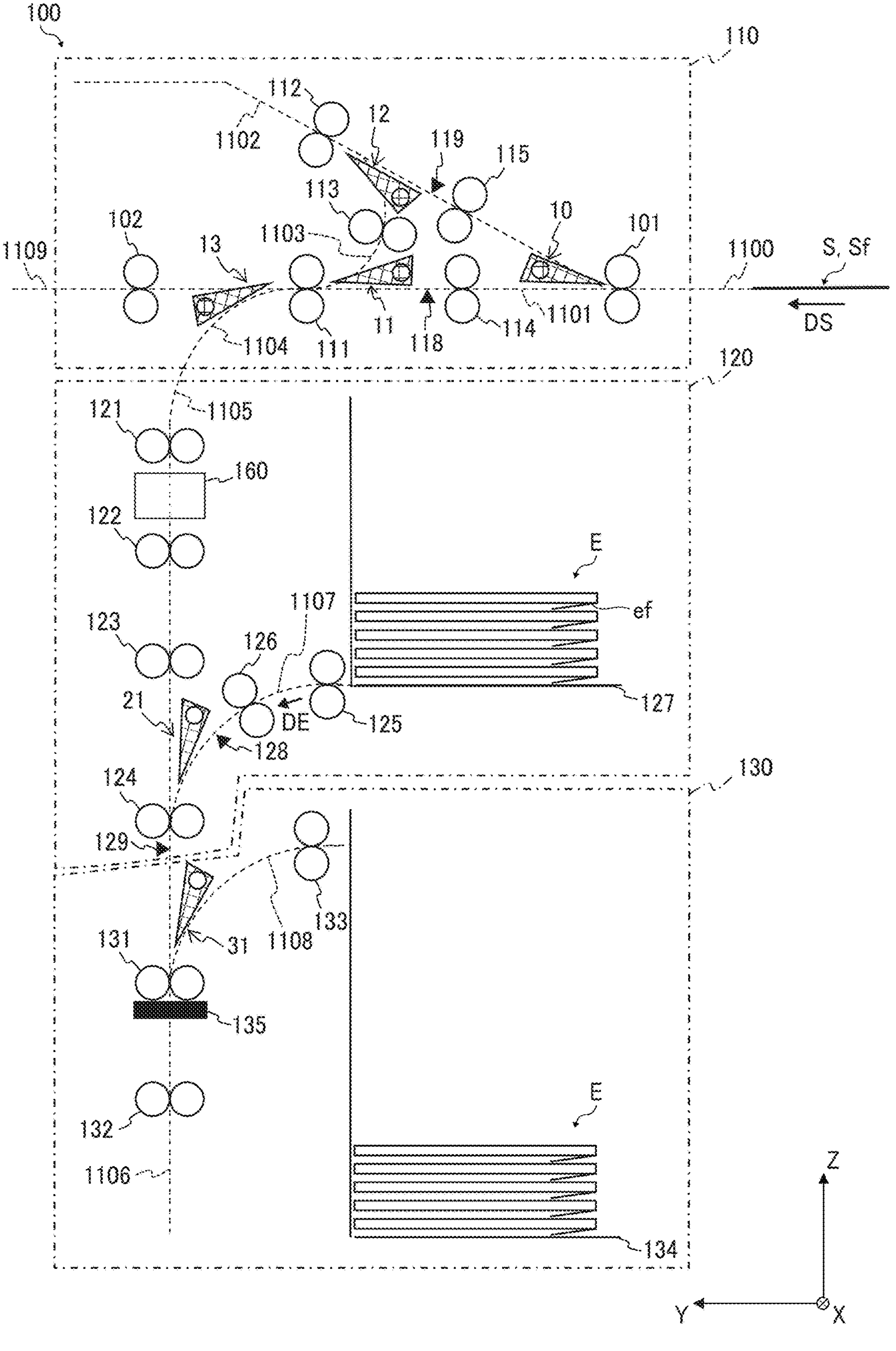
FIG. 3 is a cross-sectional view of an enclosing-sealing apparatus incorporated in the image forming system depicted in FIG. 1.

The sealing device 130 closes the flap ef of the envelope E enclosed with the folded sheet Sf, and then ejects the sealed envelope E to an envelope ejection tray 134 illustrated in FIG. 3.

If failure occurs in conveyance, enclosing, and sealing of the envelope E, that are controlled by the enclosing-sealing controller 150, the notification device 190 serving as a notifier notifies the user of the print system 1 and the enclosing-sealing apparatus 100 of the failure.

The enclosing-sealing controller 150 controls motion of a plurality of conveyance roller pairs that constructs the sheet reverse device 110, the enclosing device 120, and the sealing device 130 and motion of switching pawls that switch conveyance paths of the envelope E. If the enclosing-sealing controller 150 detects failure in controlling the construction described above, the enclosing-sealing controller 150 notifies the user of the failure through the notification device 190.

The enclosing-sealing controller 150 is a controller that controls conveyance of the folded sheet Sf including reversing and enclosing of the folded sheet Sf. The enclosing-sealing controller 150 serving as the controller receives enclosing target data as data relating to the folded sheet Sf from the printer controller 260 and the folding controller 320. The enclosing-sealing controller 150 controls conveyance of the folded sheet Sf based on an instruction indicated by each data included in the received, enclosing target data.

The enclosing target data is data relating to the sheet S and the folded sheet Sf serving as the enclosure. Specifically, the enclosing target data includes data used to control a leading end of the sheet S or the folded sheet Sf in the sheet conveyance direction DS when the sheet S or the folded sheet Sf enters the envelope E to be a desired end of the sheet S or the folded sheet Sf. For example, the enclosing target data further includes folding type data that specifies a type of folding applied to produce the folded sheet Sf. The enclosing target data further includes reverse data that specifies whether or not to perform reversing and conveyance described below of the folded sheet Sf as an operation instruction from the image forming apparatus 200 as one of the upstream apparatuses disposed upstream from the enclosing-sealing apparatus 100 in the sheet conveyance direction DS. For example, the enclosing target data further includes print face data that specifies the image forming face Ps of the folded sheet Sf, that bears the image. For example, the enclosing target data further includes folder type data that specifies a type of the sheet folder 310 (e.g., type A or type B) that performs folding.

The post-processing apparatus 400 includes a post-processing device 410 and a post-processing controller 420. The post-processing controller 420 controls the post-processing device 410 to perform predetermined post-processing on the sheet S conveyed from the upstream apparatus disposed upstream from the post-processing apparatus 400 in the sheet conveyance direction DS. The post-processing controller 420 controls the post-processing performed by the post-processing device 410 according to an operating mode sent from the printer controller 260, the folding controller 320, and the enclosing-sealing controller 150 via a communication line 403.

The printer controller 260, the folding controller 320, the enclosing-sealing controller 150, and the post-processing controller 420 are coupled with each other to communicate data needed for control via each of communication lines (e.g., the communication lines 207, 105, and 403). Thus, with linkage between controllers (e.g., the printer controller 260, the folding controller 320, the enclosing-sealing controller 150, and the post-processing controller 420), the controllers share data relating to a processing mode in which the user requests processing on the sheet S and the folded sheet Sf and a size of the sheet S and the folded sheet Sf. Accordingly, the entirety of the print system 1 shares control data based on which each of the mechanisms described above performs predetermined processing through a predetermined process at a predetermined time.

The enclosing-sealing controller 150 that performs a central control according to this embodiment includes a central processing unit (CPU) serving as an arithmetic processing unit, a read only memory (ROM) serving as a memory, and a random access memory (RAM). The enclosing-sealing controller 150 further includes an interface that outputs a control signal to each conveyance roller and receives a signal from each conveyance roller and another interface that receives an output signal from each sensor. The enclosing-sealing controller 150 controls operations of the enclosing-sealing apparatus 100 with a control program that executes control processing by using hardware resources described above. The functional blocks of the enclosing-sealing controller 150 are described below in detail.

The printer controller 260, the folding controller 320, and the post-processing controller 420, like the enclosing-sealing controller 150, also control operations of hardware mechanisms with a control program that achieves functions by using the hardware resources constructed by the CPU, the ROM, the RAM, and the like.

FIGS. 1 and 2 illustrate a construction in which the enclosing-sealing apparatus 100 is coupled with the post-processing apparatus 400 disposed downstream from the enclosing-sealing apparatus 100 in the sheet conveyance direction DS as an example of the construction of the print system 1. The post-processing apparatus 400 is typically a finisher that staples the sheets S, a stacker, a bookbinding machine, or the like. As an example of a system construction of the print system 1, the enclosing-sealing apparatus 100 may be disposed most downstream in the sheet conveyance direction DS in the print system 1.

A description is provided of a control of the print system 1 according to an embodiment of the present disclosure antecedently.

The control according to this embodiment is performed based on an envelope length of the envelope E and a flap length of the flap ef that are calculated by the enclosing device 120 described below.

Before the envelope E reaches a standby position, the enclosing-sealing controller 150, with the control program, calculates a length (e.g., the envelope length) of the envelope E and a length (e.g., the flap length) of the flap ef of the envelope E. The enclosing-sealing controller 150 notifies the envelope length and the flap length that are calculated to the folding controller 320, the post-processing controller 420, and the printer controller 260 through the folding controller 320.

According to this embodiment, the envelope length defines a distance between both ends of the envelope E, that is, a distance from a leading end to a trailing end of the envelope E, in an envelope conveyance direction DE when the envelope E is supplied to an envelope enclosing conveyance path 1105 described below with reference to FIG. 3. In other words, the envelope length defines a distance from the leading end to the trailing end of the envelope E in a moving direction of the envelope E, that is, the envelope conveyance direction DE, when the envelope E is conveyed from an envelope tray 127 to the envelope enclosing conveyance path 1105 through an envelope entry path 1107 as described below. According to this embodiment, the envelope length, in the envelope conveyance direction DE defined as the moving direction of the envelope E, includes an envelope length (e.g., a first envelope length) of the envelope E conveyed in a close state in which the flap ef closes and an envelope length (e.g., a second envelope length) of the envelope E conveyed in the open state in which the flap ef opens.

The first envelope length is equivalent to a top-to-bottom dimension of the envelope E, that is, a distance from a bottom of the envelope E to a top (e.g., a folded position) of the envelope E in the close state in which the flap ef is folded and closed. The second envelope length is equivalent to a distance from the bottom of the envelope E to an end of the flap ef in the open state in which the flap ef opens. In a description below, the envelope length indicates the first envelope length unless otherwise specified. A value obtained by subtracting the first envelope length from the second envelope length is equivalent to a length of the flap ef in the envelope conveyance direction DE, that is referred to as the flap length. A description is provided of operations of the enclosing-sealing apparatus 100.

Referring to FIG. 3, the following describes configurations of conveyance rollers, switching pawls that switch a conveyance direction of a conveyed object, and conveyance paths provided with the conveyance rollers and the switching pawls. The conveyance rollers, the switching pawls, and the conveyance paths construct the sheet reverse device 110, the enclosing device 120, and the sealing device 130 of the enclosing-sealing apparatus 100.

A description is provided of a construction of the sheet reverse device 110.

As illustrated in FIG. 3, the sheet reverse device 110 includes a plurality of conveyance paths that is distinguished as an entry path 1100, a first conveyance path 1101, a second conveyance path 1102, a switchback conveyance path 1103, an enclosing conveyance path 1104 serving as a fourth conveyance path, and a sheet ejecting path 1109.

The entry path 1100 is provided with an entry roller pair 101. The entry path 1100 is a sheet conveyance path that receives the folded sheet Sf ejected from the upstream apparatus disposed upstream from the enclosing-sealing apparatus 100 in the sheet conveyance direction DS, for example, the folding apparatus 300. The enclosing-sealing controller 150 receives the enclosing target data as data relating to the folded sheet Sf from the controllers disposed upstream from the enclosing-sealing controller 150 in the sheet conveyance direction DS, that is, the printer controller 260 and the folding controller 320. Thus, the enclosing-sealing controller 150 controls the entry roller pair 101 to resume and interrupt rotation.

The first conveyance path 1101 is one of a plurality of conveyance paths disposed downstream from the entry roller pair 101 in the sheet conveyance direction DS and branches from the entry path 1100. The first conveyance path 1101 is provided with a first conveyance roller pair 111 serving as a first conveyor and a first intermediate conveyance roller pair 114. The first conveyance path 1101 is further provided with a first sheet detecting sensor 118 serving as a first medium sensor that detects an end (e.g., the trailing end) of the folded sheet Sf conveyed in the sheet conveyance direction DS. The first sheet detecting sensor 118 is interposed between the first intermediate conveyance roller pair 114 and the first conveyance roller pair 111.

The second conveyance path 1102 is one of the conveyance paths disposed downstream from the entry roller pair 101 in the sheet conveyance direction DS and branches from the entry path 1100 in a direction different from a direction in which the first conveyance path 1101 extends. The second conveyance path 1102 is provided with a second conveyance roller pair 112 serving as a second conveyor and a second intermediate conveyance roller pair 115. The second conveyance path 1102 is further provided with a second sheet detecting sensor 119 serving as a second medium sensor that detects the end (e.g., the trailing end) of the folded sheet Sf conveyed in the sheet conveyance direction DS. The second sheet detecting sensor 119 is interposed between the second intermediate conveyance roller pair 115 and the second conveyance roller pair 112.

The sheet reverse device 110 further includes the switchback conveyance path 1103. The switchback conveyance path 1103 bridges between the first conveyance path 1101 at a junction position thereon and the second conveyance path 1102 at a branch position thereon. The switchback conveyance path 1103 adjoins the first conveyance path 1101 at the junction position disposed upstream from the first conveyance roller pair 111 in the sheet conveyance direction DS. The switchback conveyance path 1103 branches from the second conveyance path 1102 at the branch position disposed downstream from the second intermediate conveyance roller pair 115 in the sheet conveyance direction DS. The switchback conveyance path 1103 switches back the folded sheet Sf conveyed through the second conveyance path 1102 downstream in the sheet conveyance direction DS and guides the folded sheet Sf to the first conveyance path 1101. The switchback conveyance path 1103 serving as a third conveyance path is provided with a switchback conveyance roller pair 113 serving as a third conveyor.

The sheet reverse device 110 further includes the sheet ejecting path 1109 that adjoins the first conveyance path 1101 and is disposed downstream from the first conveyance path 1101 in the sheet conveyance direction DS. The sheet ejecting path 1109 ejects the sheet S or the folded sheet Sf that has passed through the sheet reverse device 110 into the post-processing apparatus 400 disposed downstream from the sheet reverse device 110 in the sheet conveyance direction DS. The sheet ejecting path 1109 is provided with an exit roller pair 102.

If the folded sheet Sf conveyed from the folding apparatus 300 is not treated with enclosing described below, the folded sheet Sf passes through the entry path 1100, the first conveyance path 1101, and the sheet ejecting path 1109 and is ejected into the post-processing apparatus 400 disposed downstream from the sheet reverse device 110 in the sheet conveyance direction DS.

The sheet reverse device 110 further includes the enclosing conveyance path 1104 disposed downstream from the first conveyance roller pair 111 in the sheet conveyance direction DS and branched from the first conveyance path 1101. The enclosing conveyance path 1104 serves as the fourth conveyance path that guides the folded sheet Sf to an enclosing roller pair 121 that holds the envelope E into which the folded sheet Sf is inserted. As described below, the enclosing conveyance path 1104 is contiguous to the envelope enclosing conveyance path 1105.

The sheet reverse device 110 further includes a branch pawl 10 serving as a branch member disposed at a branch position where the first conveyance path 1101 and the second conveyance path 1102 branch from the entry path 1100. The folded sheet Sf is conveyed to the first conveyance path 1101 or the second conveyance path 1102 from the branch position. The branch pawl 10 switches a conveyance path between the first conveyance path 1101 and the second conveyance path 1102 based on the enclosing target data relating to the folded sheet Sf entering the entry path 1100 so that the branch pawl 10 guides the folded sheet Sf to the first conveyance path 1101 or the second conveyance path 1102.

The sheet reverse device 110 further includes a first switching pawl 11 serving as a first switch disposed at the junction position where the switchback conveyance path 1103 adjoins the first conveyance path 1101. The first switching pawl 11 pivots between a first position where the first switching pawl 11 guides the folded sheet Sf conveyed from the entry path 1100 to the first conveyance path 1101 toward the first conveyance roller pair 111 and a second position where the first switching pawl 11 guides the folded sheet Sf conveyed from the switchback conveyance path 1103 to the first conveyance path 1101.

The sheet reverse device 110 further includes a second switching pawl 12 serving as a second switch disposed at the branch position where the switchback conveyance path 1103 branches from the second conveyance path 1102. The second switching pawl 12 pivots between a first position where the second switching pawl 12 guides the folded sheet Sf conveyed from the entry path 1100 to the second conveyance path 1102 toward the second conveyance roller pair 112 and a second position where the second switching pawl 12 guides the folded sheet Sf conveyed from the second conveyance path 1102 to the switchback conveyance path 1103 so as to switch back the folded sheet Sf.

The sheet reverse device 110 further includes a third switching pawl 13 serving as a third switch disposed at a branch position where the enclosing conveyance path 1104 branches from the first conveyance path 1101. The third switching pawl 13 pivots between a first position where the third switching pawl 13 guides the folded sheet Sf conveyed through the first conveyance path 1101 to the enclosing conveyance path 1104 and a second position where the third switching pawl 13 guides the folded sheet Sf conveyed through the first conveyance path 1101 to the sheet ejecting path 1109.

The first intermediate conveyance roller pair 114 conveys the folded sheet Sf conveyed through the first conveyance path 1101 to the first conveyance roller pair 111. The first conveyance roller pair 111 conveys the conveyed, folded sheet Sf downstream in the sheet conveyance direction DS. When the third switching pawl 13 is at the first position depicted in FIG. 3, the third switching pawl 13 guides the folded sheet Sf to the enclosing conveyance path 1104. When the folded sheet Sf is conveyed for a predetermined distance after the first sheet detecting sensor 118 detects the trailing end of the folded sheet Sf conveyed from the first intermediate conveyance roller pair 114 to the first conveyance roller pair 111, the folded sheet Sf has already moved to the enclosing conveyance path 1104. Accordingly, the conveyance roller pairs of the sheet reverse device 110, that have rotated, interrupt rotation.

The second intermediate conveyance roller pair 115 conveys the folded sheet Sf conveyed through the second conveyance path 1102 to the second conveyance roller pair 112. When the folded sheet Sf is conveyed for a predetermined distance after the second sheet detecting sensor 119 detects the trailing end of the folded sheet Sf conveyed through the second conveyance path 1102 in the sheet conveyance direction DS, the second conveyance roller pair 112 interrupts forward rotation, and then starts backward rotation. Thus, the second conveyance roller pair 112 conveys the folded sheet Sf through the switchback conveyance path 1103 that switches back the folded sheet Sf. Before the second conveyance roller pair 112 rotates backward or at a time when the second conveyance roller pair 112 rotates backward, at a time when the trailing end of the folded sheet Sf in the sheet conveyance direction DS passes the second switching pawl 12, that is determined based on a detection result sent from the second sheet detecting sensor 119, the enclosing-sealing controller 150 pivots the second switching pawl 12. Thus, the second switching pawl 12 reaches the second position where the second switching pawl 12 guides the folded sheet Sf to the switchback conveyance path 1103.

As the second switching pawl 12 guides the folded sheet Sf from the second conveyance path 1102 to the switchback conveyance path 1103, the switchback conveyance roller pair 113 conveys the folded sheet Sf to the first conveyance path 1101.

A description is provided of a construction of the enclosing device 120.

As illustrated in FIG. 3, the enclosing device 120 includes the envelope enclosing conveyance path 1105 adjoining the enclosing conveyance path 1104 serving as the fourth conveyance path. The envelope enclosing conveyance path 1105 receives the sheet S or the folded sheet Sf serving as the enclosure conveyed from the sheet reverse device 110 and conveys the sheet S or the folded sheet Sf to be inserted into the envelope E. The envelope enclosing conveyance path 1105 is provided with an envelope opener-holder 160 that opens the mouth of the envelope E at the enclosing position and holds the envelope E in the open state in which the enclosure is inserted into the envelope E readily.

The envelope enclosing conveyance path 1105 adjoins a sealing conveyance path 1106 that seals the envelope E enclosed with the enclosure. The envelope enclosing conveyance path 1105 adjoins the enclosing conveyance path 1104 and the sealing conveyance path 1106, constructing an envelope conveyance path.

The envelope enclosing conveyance path 1105 is provided with a first vertical conveyance roller pair 122 and a second vertical conveyance roller pair 123 that convey the envelope E to a reception position where the envelope E receives the folded sheet Sf. The enclosing roller pair 121 disposed in the envelope enclosing conveyance path 1105 holds the envelope E conveyed to the reception position where the envelope E receives the folded sheet Sf.

The envelope opener-holder 160 is interposed between the enclosing roller pair 121 and the first vertical conveyance roller pair 122 and disposed beside the envelope enclosing conveyance path 1105. A construction of the envelope opener-holder 160 is described below in detail.

Figure 4:
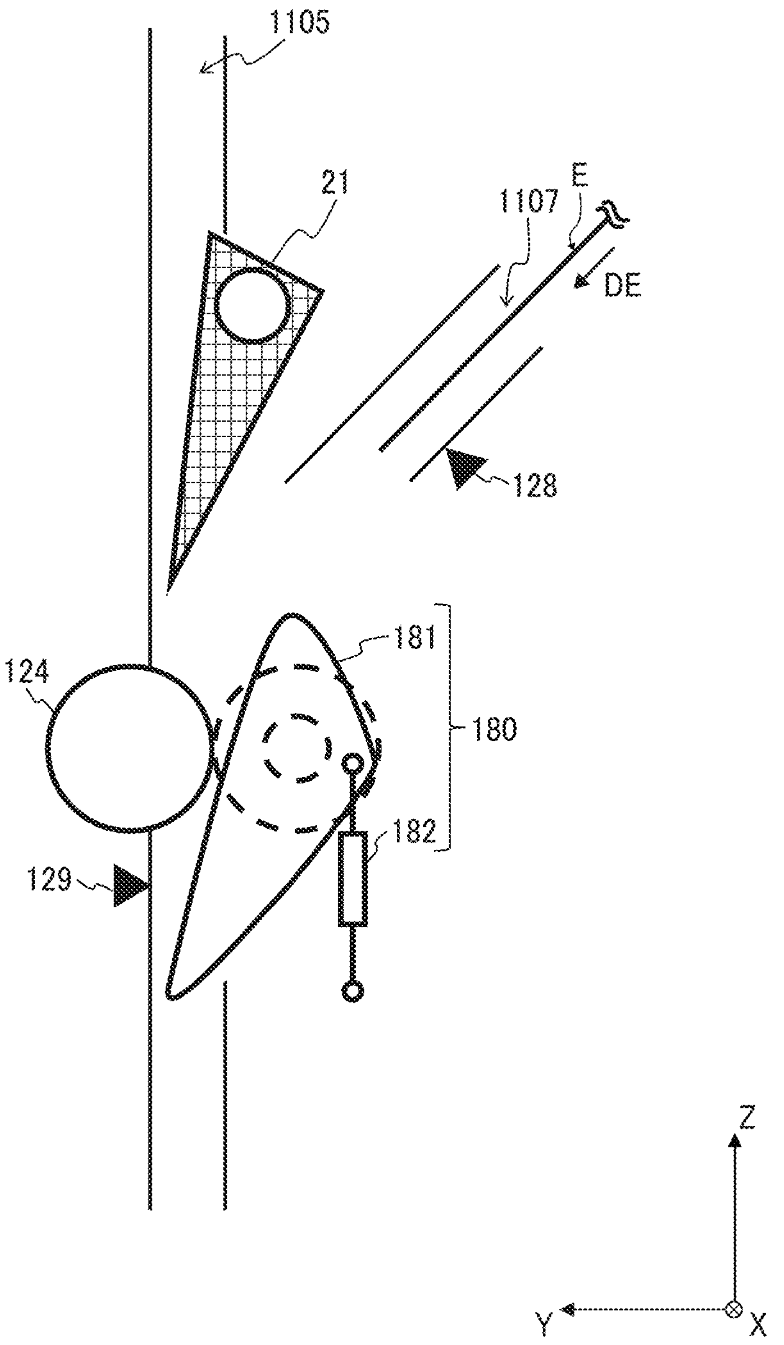
FIG. 4 is a schematic cross-sectional view of a flap opener incorporated in the enclosing-sealing apparatus depicted in FIG. 3.

A flap opening roller pair 124 is disposed at a junction position where the envelope enclosing conveyance path 1105 adjoins the sealing conveyance path 1106. As illustrated in FIG. 4, the flap opening roller pair 124 is attached with a flap opener 180 that opens the flap ef when the flap opening roller pair 124 conveys the envelope E ejected from the envelope tray 127 through the envelope entry path 1107 to a prejunctional position before a junction position where the envelope entry path 1107 adjoins the envelope enclosing conveyance path 1105.

A separation sensor 128 is disposed upstream from the flap opening roller pair 124 in the envelope conveyance direction DE. The separation sensor 128 detects the first envelope length of the envelope E in the envelope conveyance direction DE in the close state in which the flap ef closes. A flap opening detecting sensor 129 is disposed downstream from the flap opening roller pair 124 in the envelope conveyance direction DE. The flap opening detecting sensor 129 detects whether or not the flap ef of the envelope E opens, that is, whether or not the flap ef is in the open state. The flap opening detecting sensor 129 detects the second envelope length of the envelope E in the envelope conveyance direction DE.

An envelope switchback switching pawl 21 is disposed at the junction position where the envelope entry path 1107 adjoins the envelope enclosing conveyance path 1105.

As illustrated in FIG. 3, the envelope entry path 1107 that adjoins the envelope enclosing conveyance path 1105 is provided with a separating roller pair 125, an envelope conveyance roller pair 126, and the separation sensor 128 serving as a first envelope detector. The envelope tray 127 adjoins an end of the envelope entry path 1107. The envelope entry path 1107 also constructs the envelope conveyance path together with the envelope enclosing conveyance path 1105.

As illustrated in FIG. 3, a plurality of envelopes E is placed on the envelope tray 127. Each of the envelopes E placed on the envelope tray 127 includes the bottom, that is, an opposite end being opposite to the flap et'. The bottom of the envelope E faces the separating roller pair 125. Hence, the bottom of the envelope E serves as the leading end of the envelope E in the envelope conveyance direction DE when the envelope E is ejected from the envelope tray 127. Another end of the envelope E, that is provided with the flap ef, serves as the trailing end of the envelope E in the envelope conveyance direction DE.

As the separating roller pair 125 picks up one envelope E from the plurality of envelopes E placed on the envelope tray 127, the separating roller pair 125 and the envelope conveyance roller pair 126 convey the envelope E through the envelope entry path 1107 to a past position that is past the envelope switchback switching pawl 21. As the flap opening roller pair 124 also conveys the envelope E, when the trailing end of the envelope E in the envelope conveyance direction DE is past the envelope switchback switching pawl 21, the envelope switchback switching pawl 21 pivots to allow the envelope E to be switched back and conveyed.

For example, the envelope switchback switching pawl 21 pivots between a first position and a second position. At the first position, the envelope switchback switching pawl 21 temporarily guides the envelope E picked up from the envelope tray 127 to the sealing conveyance path 1106. At the second position, the envelope switchback switching pawl 21 guides the envelope E to the envelope enclosing conveyance path 1105 so that the envelope E is conveyed toward the sheet reverse device 110 through the envelope enclosing conveyance path 1105. The envelope switchback switching pawl 21 switches a conveyance direction of the envelope E conveyed through the envelope enclosing conveyance path 1105.

The first vertical conveyance roller pair 122 and the second vertical conveyance roller pair 123 convey the envelope E to the enclosing position as a predetermined position in the envelope enclosing conveyance path 1105 and hold the envelope E. At the enclosing position, as described below, the mouth of the envelope E (e.g., the flap ef) is disposed below the enclosing roller pair 121 and above the first vertical conveyance roller pair 122 in FIG. 3.

The enclosing roller pair 121 is one type of a pair of conveyance rollers, that rotates in the enclosing direction in which the folded sheet Sf conveyed from the sheet reverse device 110 is inserted into the envelope E.

A description is provided of a construction of the sealing device 130.

As illustrated in FIG. 3, the sealing device 130 includes the sealing conveyance path 1106 provided with a third vertical conveyance roller pair 131 and a fourth vertical conveyance roller pair 132. A sealer 135 is interposed between the third vertical conveyance roller pair 131 and the fourth vertical conveyance roller pair 132. The sealer 135 closes the flap ef of the envelope E enclosed with the enclosure.

The third vertical conveyance roller pair 131 and the fourth vertical conveyance roller pair 132 convey the envelope E to a predetermined position in the sealing conveyance path 1106 and hold the envelope E.

An envelope ejecting switching pawl 31 is disposed at a branch position where an envelope ejecting path 1108 branches from the sealing conveyance path 1106. An envelope ejecting roller pair 133 is disposed at an end of the envelope ejecting path 1108. The envelope ejecting roller pair 133 ejects the envelope E onto the envelope ejection tray 134. The envelope ejection tray 134 is placed with the envelope E ejected by the envelope ejecting roller pair 133.

The envelope ejecting switching pawl 31 pivots between a first position and a second position. At the first position, the envelope ejecting switching pawl 31 guides the envelope E from the flap opening roller pair 124 to the third vertical conveyance roller pair 131 through the sealing conveyance path 1106. At the second position, the envelope ejecting switching pawl 31 guides the envelope E from the sealing conveyance path 1106 to the envelope ejecting path 1108. Thus, the envelope ejecting switching pawl 31 switches a conveyance direction of the envelope E.

As described above, in the enclosing-sealing apparatus 100, the conveyance paths (e.g., the enclosing conveyance path 1104, the envelope enclosing conveyance path 1105, and the sealing conveyance path 1106) that convey the folded sheet Sf from the sheet reverse device 110 to the enclosing device 120 and the sealing device 130 are arranged contiguously and vertically in the Z-direction. The conveyance paths that convey the folded sheet Sf and the envelope E construct a vertical conveyance path that couples the envelope enclosing conveyance path 1105 of the enclosing device 120 with the sealing conveyance path 1106 of the sealing device 130 vertically in the Z-direction.

Referring to FIG. 4, a detailed description is provided of a construction of the flap opener 180 attached to the flap opening roller pair 124.

The flap opener 180 includes a flap scooping pawl 181 and a spring 182. The flap scooping pawl 181 is pivotally attached to a rotation shaft of one of a pair of conveyance rollers constructing the flap opening roller pair 124. The spring 182 biases the flap scooping pawl 181.

As the separating roller pair 125 separates one envelope E from other envelopes E placed on the envelope tray 127 and the envelope conveyance roller pair 126 conveys the envelope E through the envelope entry path 1107, the envelope E comes into contact with the flap scooping pawl 181. Before the envelope E comes into contact with the flap scooping pawl 181, the spring 182 biases the flap scooping pawl 181 to close the envelope enclosing conveyance path 1105, blocking the envelope E conveyed from the envelope entry path 1107 toward the envelope enclosing conveyance path 1105. While the envelope E is not conveyed from the envelope entry path 1107, the flap scooping pawl 181 is at a default position where the flap scooping pawl 181 contacts a conveyance guide that constructs the envelope enclosing conveyance path 1105 and restricts pivoting of the flap scooping pawl 181 by the spring 182. As the envelope E contacts and presses against the flap scooping pawl 181, the flap scooping pawl 181 pivots against a biasing force from the spring 182, causing the envelope E to move to the envelope enclosing conveyance path 1105.

When the envelope E conveyed through the envelope entry path 1107 passes over the flap scooping pawl 181 and presses against the flap scooping pawl 181, the flap scooping pawl 181 pivots. Accordingly, a head of the flap scooping pawl 181 catches or hooks the flap ef. In a state in which the head of the flap scooping pawl 181 hooks the flap ef, the flap opening roller pair 124 moves the envelope E in the negative Z-direction, thus opening the flap ef that has been closed.

As illustrated in FIG. 4, the envelope entry path 1107 is provided with the separation sensor 128 serving as the first envelope detector disposed upstream from the flap opening roller pair 124 in the envelope conveyance direction DE. The flap opening detecting sensor 129 serving as a second envelope detector is disposed downstream from the flap opening roller pair 124 in the envelope conveyance direction DE.

Figure 5:
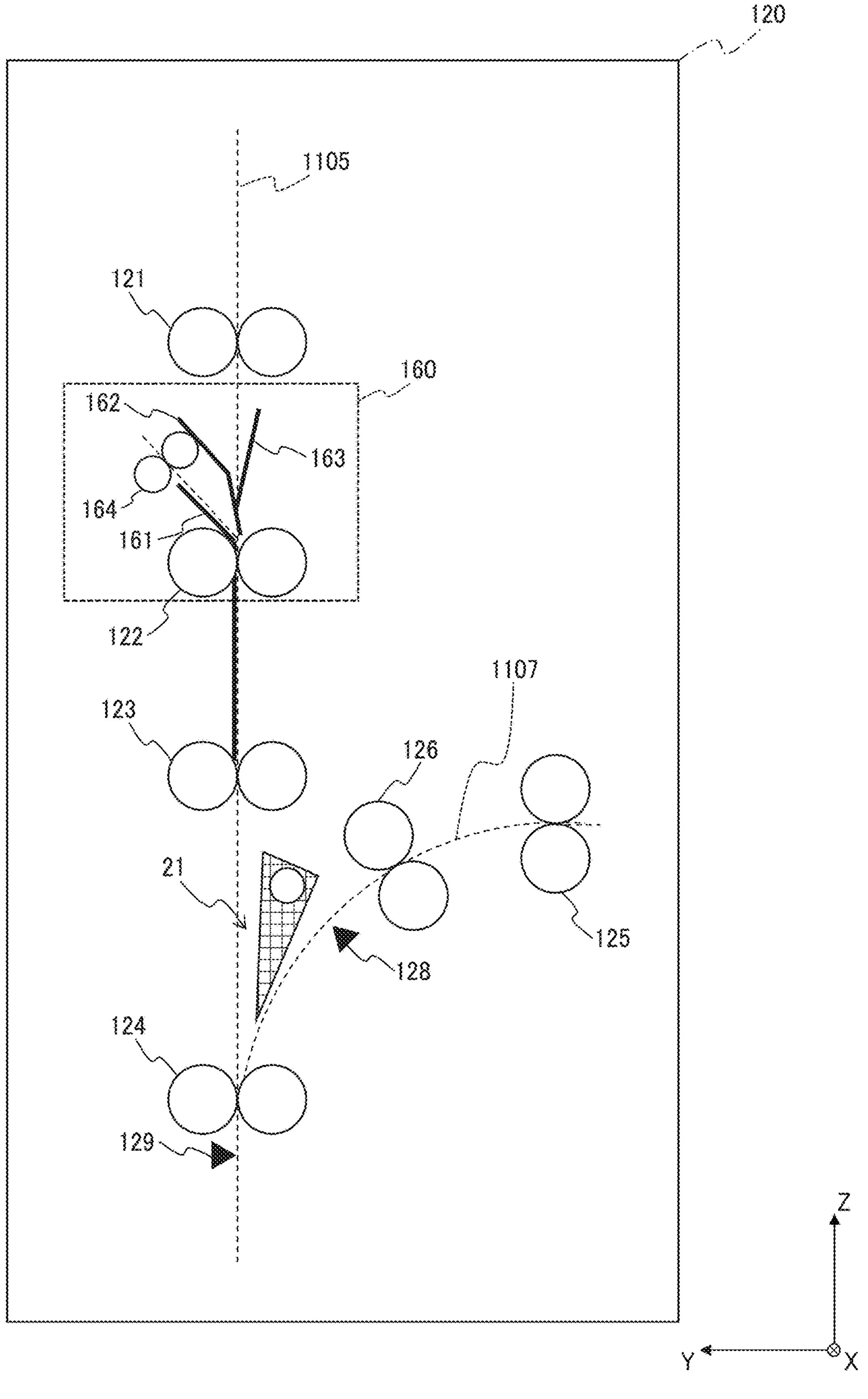
FIG. 5 is a schematic cross-sectional view of an envelope opener-holder incorporated in the enclosing-sealing apparatus depicted in FIG. 3.

Referring to FIG. 5, a description is provided of a construction of the envelope opener-holder 160 of the enclosing device 120.

FIG. 5 schematically illustrates a partial construction of the enclosing device 120 and a main construction of the envelope opener-holder 160. The envelope opener-holder 160 is interposed between the enclosing roller pair 121 and the first vertical conveyance roller pair 122 and disposed in the envelope enclosing conveyance path 1105.

The envelope opener-holder 160 includes, as the main construction thereof, a flap guide plate 161, a first enclosing guide pawl 162, a second enclosing guide pawl 163, and a flap holding roller pair 164.

The flap guide plate 161 is a plate that holds the flap ef of the envelope E conveyed through the envelope enclosing conveyance path 1105 such that the flap ef opens.

The first enclosing guide pawl 162 moves the flap ef of the envelope E conveyed to the enclosing position to the flap guide plate 161.

The second enclosing guide pawl 163 pivots a front edge of the first enclosing guide pawl 162 toward the flap guide plate 161.

The flap holding roller pair 164 serves as a flap nipper that nips the flap ef pressed against the flap guide plate 161.

Referring to FIGS. 6 to 8, 9A, 9B, 9C, 9D, and 10 to 23, a description is provided of an example of a series of processes for enclosing and sealing, that is performed by the enclosing-sealing apparatus 100.

In the drawings, reference numerals and the like are assigned to elements used in the description of the series of processes for enclosing and sealing.

Figure 6:
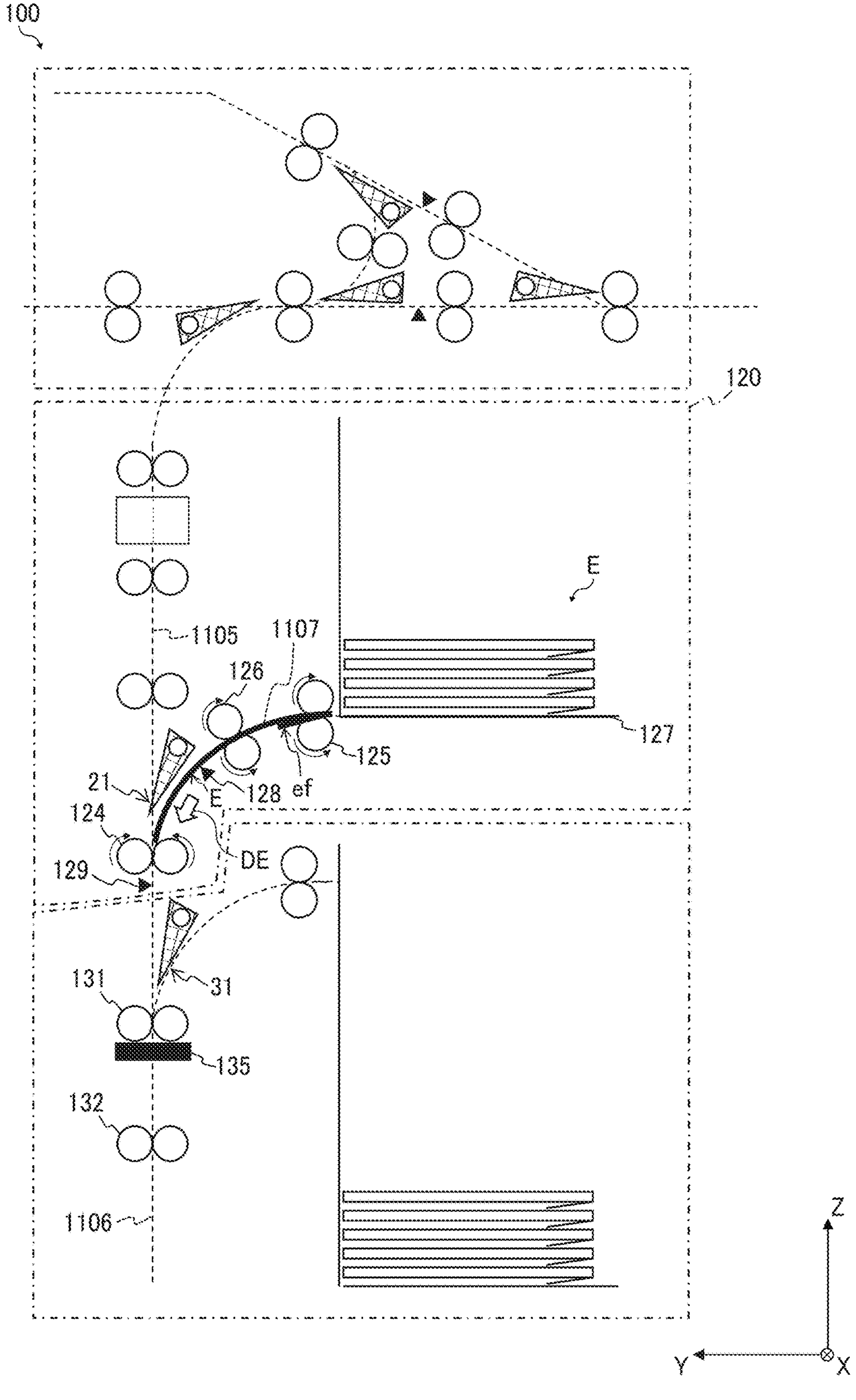
FIG. 6 is a schematic cross-sectional view of the enclosing-sealing apparatus depicted in FIG. 3, illustrating an envelope conveyed through an envelope entry path.

As illustrated in FIG. 6, as the separating roller pair 125 rotates, the separating roller pair 125 picks up and separates one envelope E from the plurality of envelopes E placed on the envelope tray 127 and feeds the separated envelope E to the envelope entry path 1107. The envelope conveyance roller pair 126 disposed in the envelope entry path 1107 conveys the separated envelope E to the flap opening roller pair 124.

The separation sensor 128 detects the leading end and the trailing end of the envelope E in the envelope conveyance direction DE. The enclosing-sealing controller 150 calculates the envelope length of the envelope E based on a detection result sent from the separation sensor 128 as described below.

When the envelope E is conveyed through the envelope entry path 1107, the envelope switchback switching pawl 21 is oriented in a direction in which the envelope switchback switching pawl 21 guides the envelope E from the envelope entry path 1107 to the envelope enclosing conveyance path 1105, as illustrated in FIG. 6. The envelope ejecting switching pawl 31 is oriented in a direction in which the envelope ejecting switching pawl 31 guides the envelope E from the envelope enclosing conveyance path 1105 to the sealing conveyance path 1106, as illustrated in FIG. 6.

The flap opening roller pair 124, the third vertical conveyance roller pair 131, and the fourth vertical conveyance roller pair 132 rotate in a direction to convey the envelope E in the negative Z-direction. Thus, the envelope E moves from the envelope entry path 1107 to the sealing conveyance path 1106 through the envelope enclosing conveyance path 1105.

Figure 7:
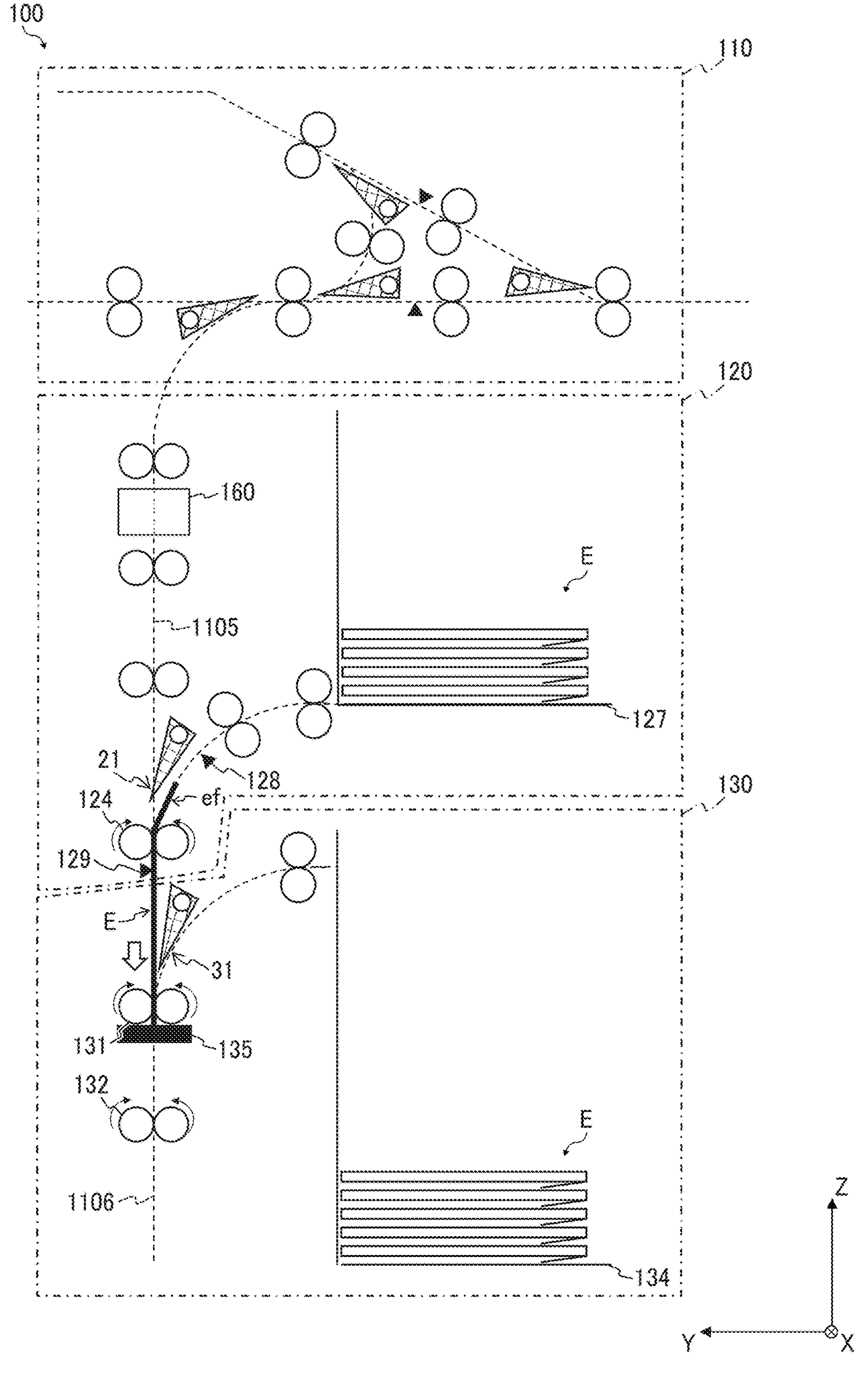
FIG. 7 is a cross-sectional view of the enclosing-sealing apparatus depicted in FIG. 3, illustrating a process for enclosing an enclosure into the envelope.

Subsequently, as illustrated in FIG. 7, before the envelope E passes the flap opening roller pair 124, the flap opener 180 depicted in FIG. 4 opens the flap ef of the envelope E. The flap opening roller pair 124, the third vertical conveyance roller pair 131, and the fourth vertical conveyance roller pair 132 continue rotating.

Figure 8:
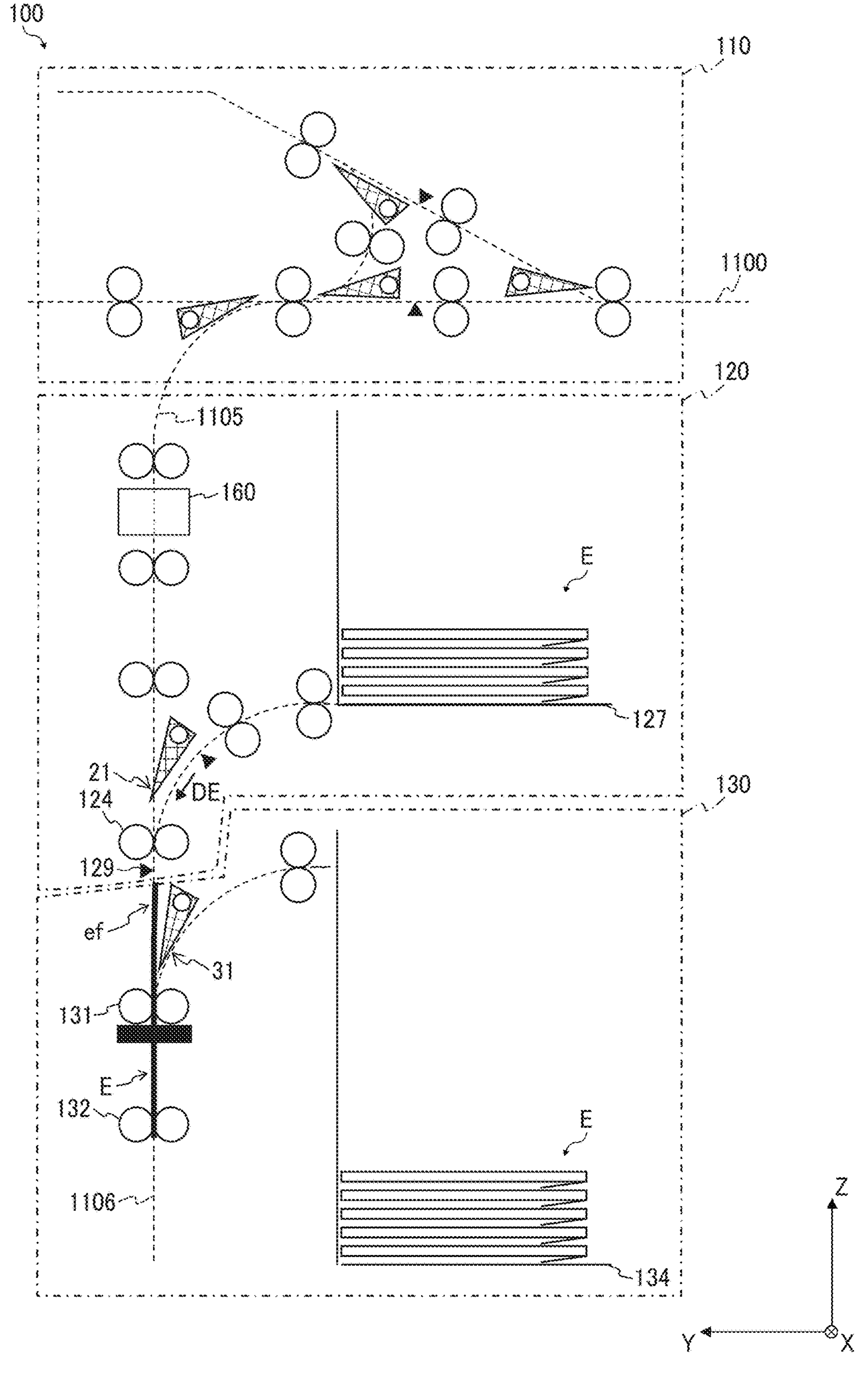
FIG. 8 is a cross-sectional view of the enclosing-sealing apparatus depicted in FIG. 3, illustrating another process for enclosing the enclosure into the envelope.

Thereafter, as illustrated in FIG. 8, when an end (e.g., a trailing end) of the flap ef in the envelope conveyance direction DE passes the flap opening detecting sensor 129, the flap opening roller pair 124, the third vertical conveyance roller pair 131, and the fourth vertical conveyance roller pair 132 interrupt rotation and are ready to switch back and convey the envelope E through the envelope enclosing conveyance path 1105.

Referring to FIGS. 9A, 9B, 9C, and 9D, a description is provided of an overview of operations of the flap opener 180 and calculation of the envelope length of the envelope E in conveyance of the envelope E depicted in FIGS. 6, 7, and 8.

Figure 9A:
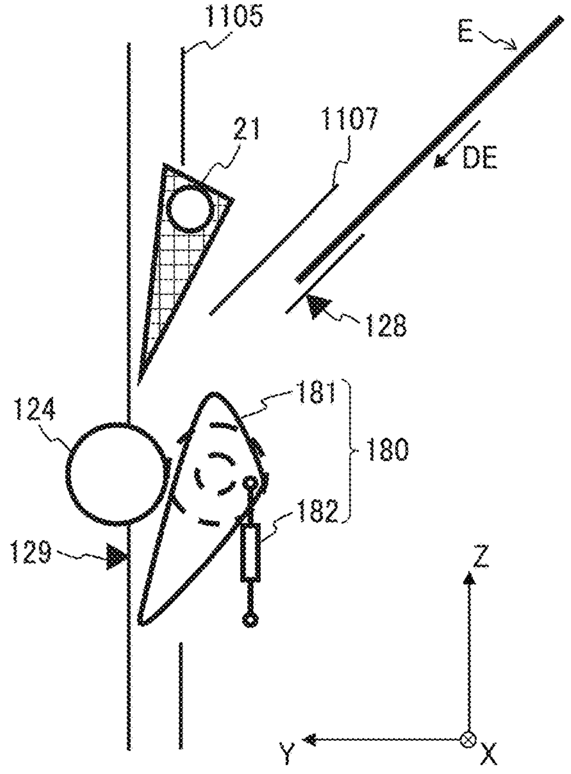
FIG. 9A is a cross-sectional view of the flap opener depicted in FIG. 4, illustrating a motion thereof during enclosing performed by the enclosing-sealing apparatus.

As illustrated in FIG. 9A, the separation sensor 128 detects the leading end of the envelope E conveyed toward the flap opening roller pair 124 in the envelope conveyance direction DE before the envelope E reaches a nip formed between two rollers constructing the flap opening roller pair 124.

Figure 9B:
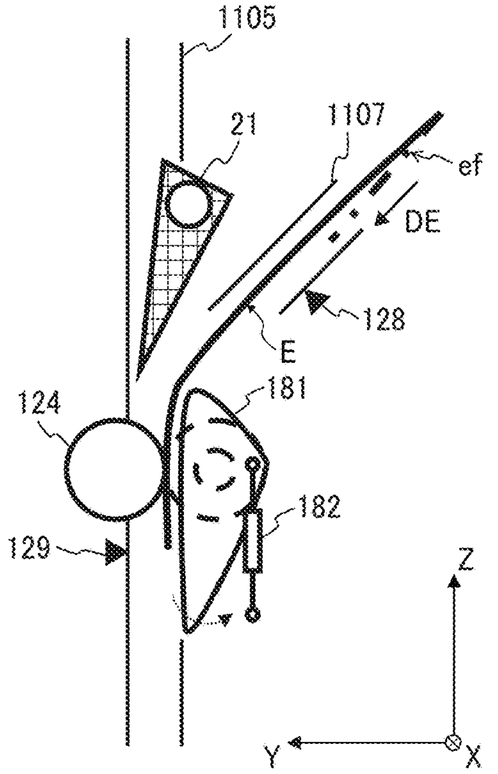
FIG. 9B is a cross-sectional view of the flap opener depicted in FIG. 9A, illustrating another motion thereof.

Subsequently, as illustrated in FIG. 9B, as the leading end of the envelope E in the envelope conveyance direction DE passes the nip of the flap opening roller pair 124 and moves in the negative Z-direction, the leading end of the envelope E in the envelope conveyance direction DE comes into contact with and presses against the flap scooping pawl 181 situated at the default position where the flap scooping pawl 181 blocks the envelope enclosing conveyance path 1105. The flap scooping pawl 181 pressed by the leading end of the envelope E in the envelope conveyance direction DE pivots, causing the envelope E to move through the envelope enclosing conveyance path 1105. Thus, the envelope E reaches the envelope enclosing conveyance path 1105.

Figure 9C:
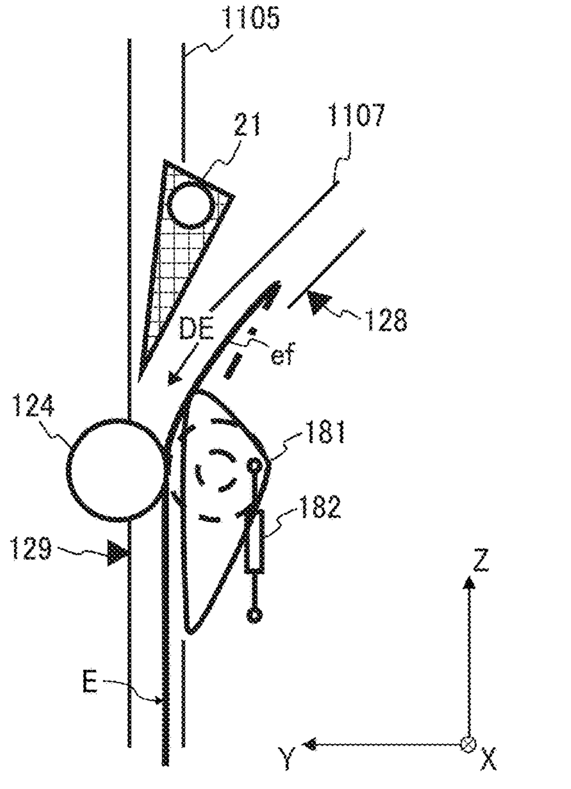
FIG. 9C is a cross-sectional view of the flap opener depicted in FIG. 9A, illustrating yet another motion thereof.

Before an entirety of the envelope E reaches the envelope enclosing conveyance path 1105, the separation sensor 128 also detects the trailing end of the envelope E in the envelope conveyance direction DE while the envelope E passes over the separation sensor 128, as illustrated in FIG. 9C. Accordingly, based on a time period that elapses after the separation sensor 128 detects the leading end of the envelope E until the separation sensor 128 detects the trailing end of the envelope E in the envelope conveyance direction DE (e.g., a time difference between a time at which the leading end of the envelope E is detected and a time at which the trailing end of the envelope E is detected), and a conveyance speed at which the envelope E is conveyed, a number of rotations of the envelope conveyance roller pair 126 depicted in FIG. 6, or the like, the enclosing-sealing controller 150 calculates the first envelope length as the envelope length of the envelope E in the close state in which the flap ef closes.

As the leading end of the envelope E in the envelope conveyance direction DE presses against and pivots the flap scooping pawl 181, a part of the flap scooping pawl 181, that is, the head of the flap scooping pawl 181, presses and lifts the envelope E conveyed through the envelope entry path 1107 slightly. Accordingly, the envelope E is bent slightly in the envelope entry path 1107. Consequently, the flap ef of the envelope E opens slightly. As the flap opening roller pair 124 farther conveys the envelope E in the open state in which the flap ef opens slightly, the end of the flap ef in the envelope conveyance direction DE engages the head of the flap scooping pawl 181.

Figure 9D:
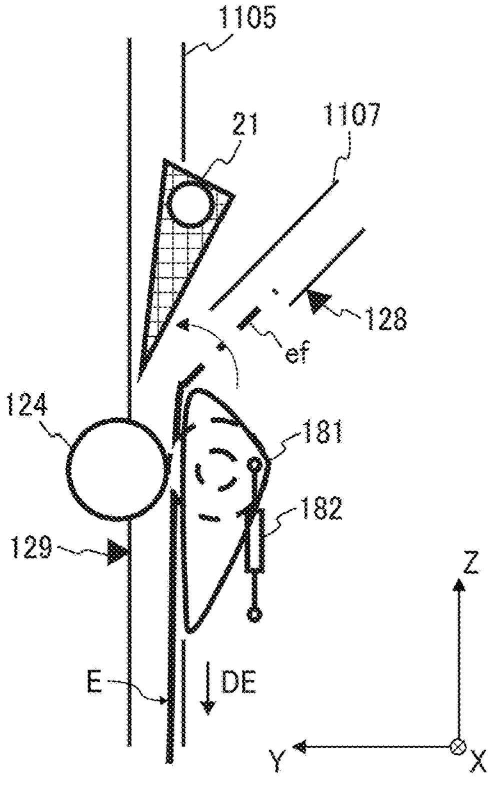
FIG. 9D is a cross-sectional view of the flap opener depicted in FIG. 9A, illustrating yet another motion thereof.

As the flap opening roller pair 124 conveys the envelope E even farther, as illustrated in FIG. 9D, the end of the flap ef in the envelope conveyance direction DE contacts the head of the flap scooping pawl 181. The flap ef pivots and opens as the envelope E is conveyed. The flap opening roller pair 124 farther conveys the envelope E in the envelope conveyance direction DE in the open state in which the flap ef opens. Subsequently, the envelope E illustrated in FIG. 9D moves to a position illustrated in FIG. 8.

Figure 10:
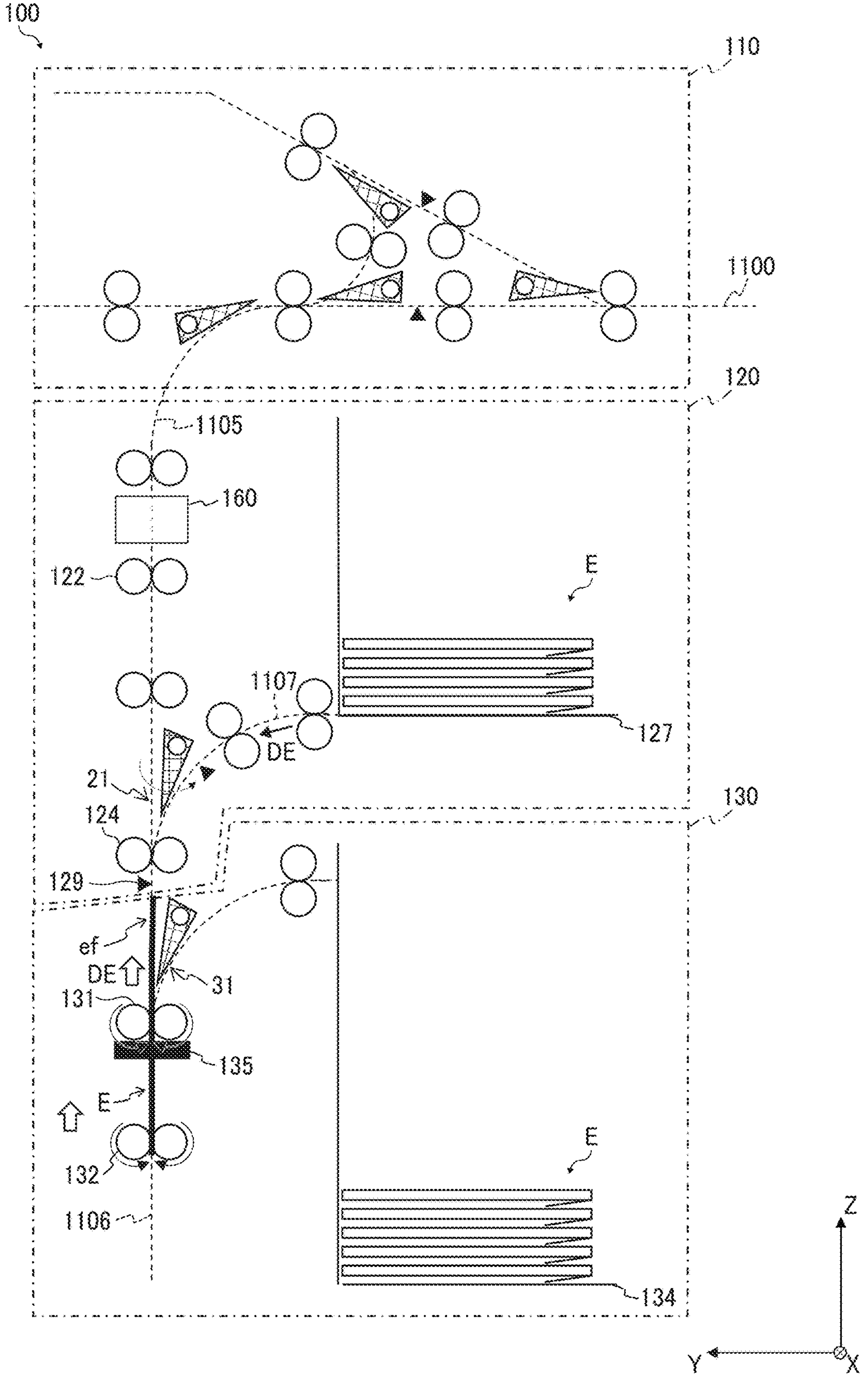
FIG. 10 is a cross-sectional view of the enclosing-sealing apparatus depicted in FIG. 3, illustrating yet another process for enclosing performed by the enclosing-sealing apparatus.

Subsequently to FIG. 8, as illustrated in FIG. 10, after the flap ef of the envelope E opens and the flap ef is past the flap opening roller pair 124, the third vertical conveyance roller pair 131 and the fourth vertical conveyance roller pair 132 rotate backward, thus conveying the envelope E through the sealing conveyance path 1106 and the envelope enclosing conveyance path 1105 in the positive Z-direction. Thus, the envelope E is conveyed with switchback conveyance. Before switchback conveyance of the envelope E starts or simultaneously with switchback conveyance, the envelope switchback switching pawl 21 pivots in a direction illustrated with an arrow in FIG. 10. Accordingly, the envelope switchback switching pawl 21 allows the envelope E to be conveyed upward through the envelope enclosing conveyance path 1105 in FIG. 10.

Subsequently, the envelope E depicted in FIG. 10 is conveyed with switchback conveyance to the enclosing position as the predetermined position in the enclosing device 120. While the envelope E is conveyed with switchback conveyance, the flap opening detecting sensor 129 detects the end of the opened flap ef in the envelope conveyance direction DE, that is, the trailing end of the envelope E in the envelope conveyance direction DE in the envelope entry path 1107. Thereafter, the flap opening detecting sensor 129 detects the bottom of the envelope E, that is, the leading end of the envelope E in the envelope conveyance direction DE in the envelope entry path 1107. While the envelope E is conveyed with switchback conveyance, the end of the flap ef is the leading end of the envelope E in the envelope conveyance direction DE. However, for consistency, also in a description below, the end of the flap ef is mentioned as the trailing end of the envelope E or the flap ef in the envelope conveyance direction DE regardless of the moving direction (e.g., the conveyance direction) of the envelope E during switchback conveyance. Similarly, the bottom of the envelope E is mentioned as the leading end of the envelope E in the envelope conveyance direction DE.

Accordingly, before the flap ef reaches the first vertical conveyance roller pair 122, the flap opening detecting sensor 129 detects the end of the flap ef (e.g., the trailing end of the envelope E) and the bottom (e.g., the leading end) of the envelope E in the envelope conveyance direction DE in which the envelope E is conveyed in the envelope entry path 1107 before switchback conveyance. According to a detection result sent from the flap opening detecting sensor 129, based on a time period that elapses after the flap opening detecting sensor 129 detects the leading end of the envelope E (e.g., the end of the flap ef) in the envelope conveyance direction DE illustrated in the sealing conveyance path 1106 until the flap opening detecting sensor 129 detects the trailing end of the envelope E (e.g., the bottom of the envelope E) in the envelope conveyance direction DE, and a conveyance speed at which the envelope E is conveyed or a number of rotations of the third vertical conveyance roller pair 131 and the fourth vertical conveyance roller pair 132, the enclosing-sealing controller 150 also calculates the second envelope length as the envelope length of the envelope E in the open state in which the flap ef opens.

The enclosing-sealing controller 150 subtracts the envelope length (e.g., the first envelope length) of the envelope E in the close state in which the flap ef closes from the envelope length (e.g., the second envelope length) of the envelope E in the open state in which the flap ef opens, thus calculating the length of the flap ef (e.g., the flap length).

Figure 11:
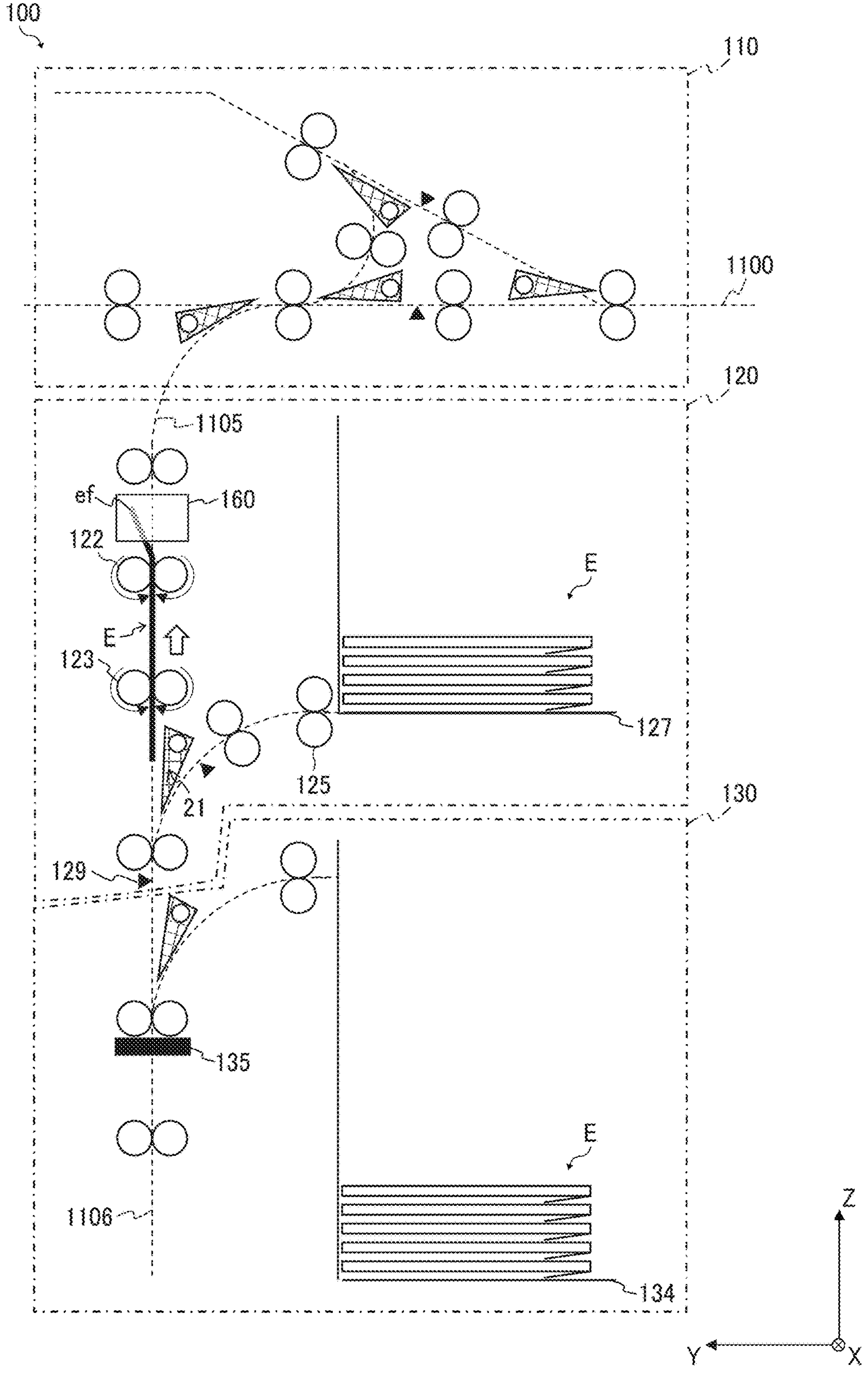
FIG. 11 is a cross-sectional view of the enclosing-sealing apparatus depicted in FIG. 3, illustrating yet another process for enclosing performed by the enclosing-sealing apparatus.

Subsequently, as illustrated in FIG. 11, the second vertical conveyance roller pair 123 and the first vertical conveyance roller pair 122 convey the envelope E to the enclosing position determined based on the flap length. When the flap ef reaches a past position where the flap ef is past the first vertical conveyance roller pair 122, that is, the enclosing position determined based on the flap length, the second vertical conveyance roller pair 123 and the first vertical conveyance roller pair 122 interrupt rotation. Thus, the envelope E starts waiting for the enclosure to be inserted into the envelope E.

In a control in which the enclosing-sealing controller 150 controls each conveyance roller pair to convey the envelope E to the standby position where the envelope E starts waiting for the enclosure to be inserted into the envelope E, after the separating roller pair 125 picks up the envelope E, the enclosing-sealing controller 150 calculates a conveyance amount of the envelope E based on a rotation amount (e.g., a number of rotations) of each conveyance roller pair. The enclosing-sealing controller 150 determines a position of the envelope E in the envelope enclosing conveyance path 1105 based on the conveyance amount of the envelope E and a length of each conveyance path.

Figure 12:
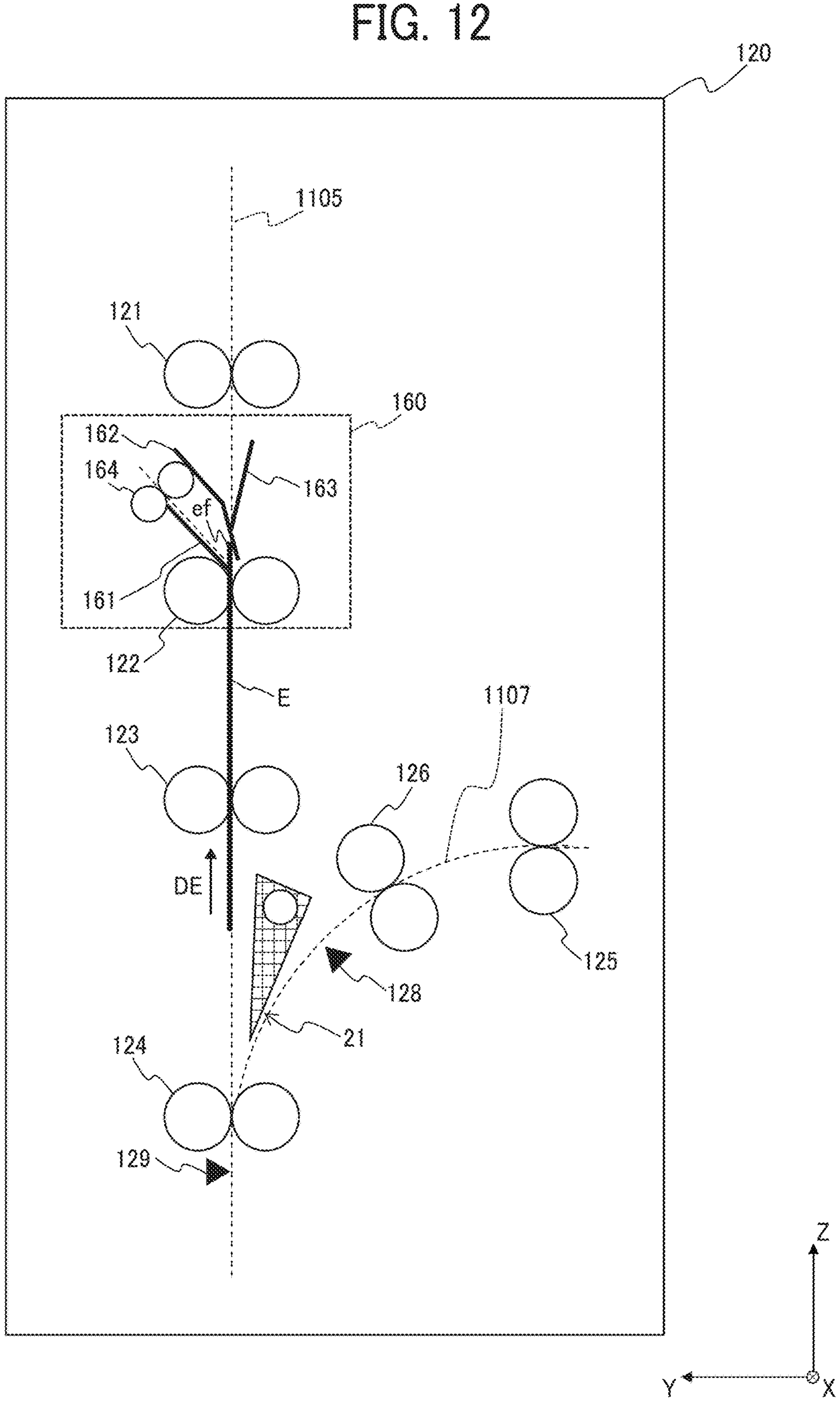
FIG. 12 is a cross-sectional view of the envelope opener-holder depicted in FIG. 5, illustrating a motion thereof during enclosing performed by the enclosing-sealing apparatus.
Figure 13:
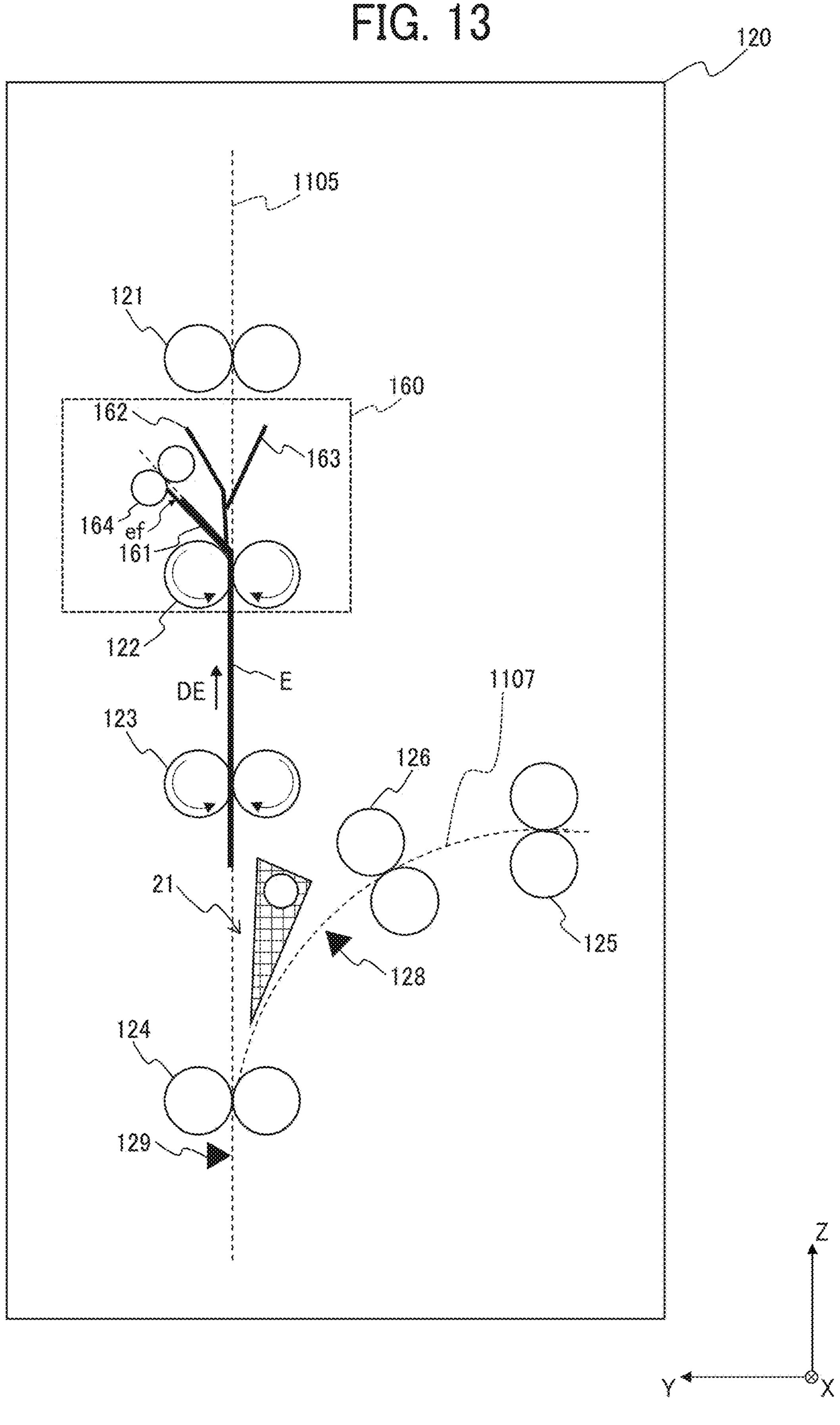
FIG. 13 is a cross-sectional view of the envelope opener-holder depicted in FIG. 5, illustrating another motion thereof during enclosing performed by the enclosing-sealing apparatus.
Figure 14:
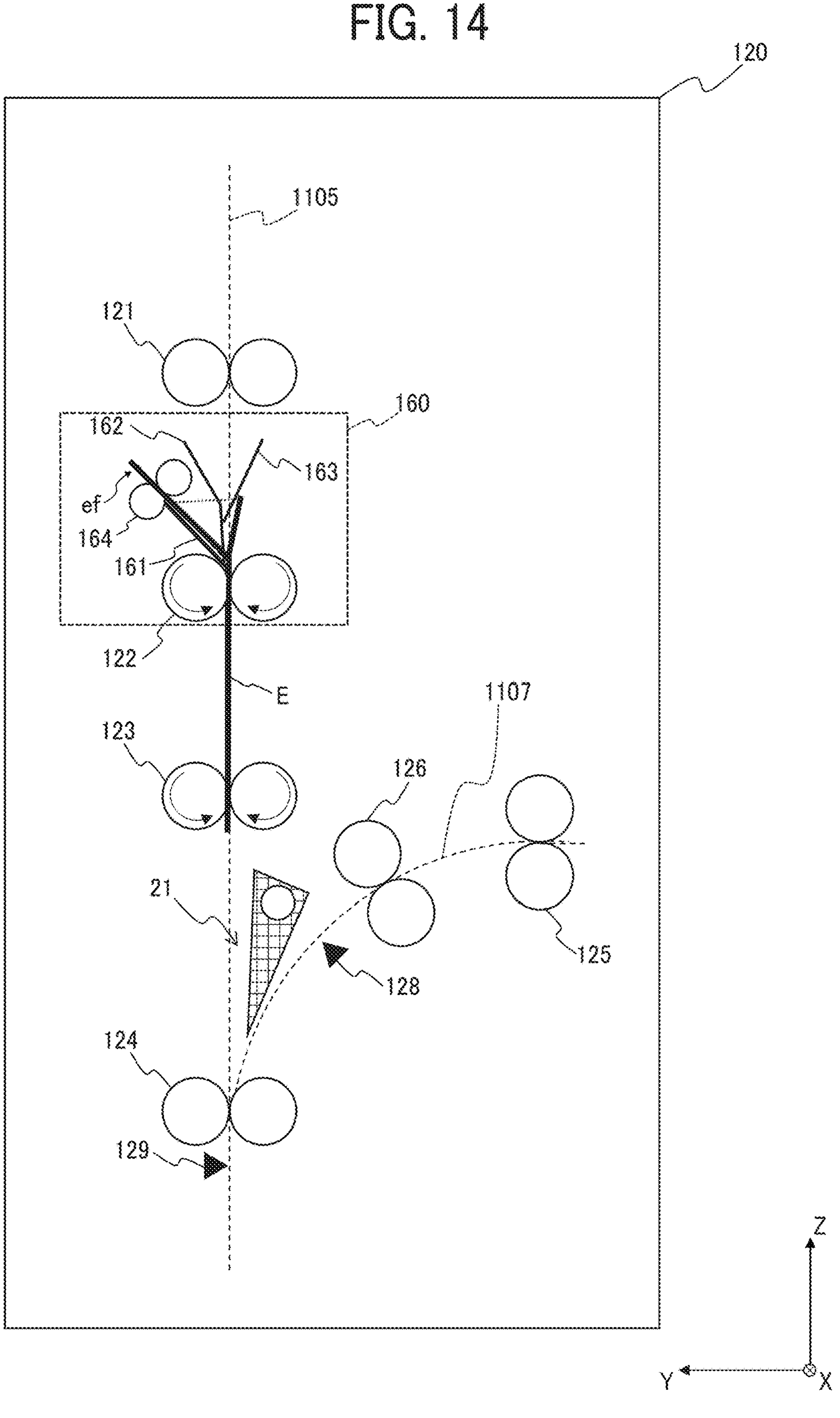
FIG. 14 is a cross-sectional view of the envelope opener-holder depicted in FIG. 5, illustrating yet another motion thereof during enclosing performed by the enclosing-sealing apparatus.

Referring to FIGS. 12, 13, and 14, a description is provided of operations of the enclosing device 120 until the envelope opener-holder 160 holds the envelope E with the opened flap ef such that the envelope E is ready to receive the enclosure while the envelope E moves from a position illustrated in FIG. 10 to a position illustrated in FIG. 11.

As illustrated in FIG. 12, when the end of the flap ef in the envelope conveyance direction DE overlaps the first enclosing guide pawl 162, the first vertical conveyance roller pair 122 and the second vertical conveyance roller pair 123 interrupt rotation. The enclosing-sealing controller 150 determines an interruption time at which the enclosing-sealing controller 150 controls the first vertical conveyance roller pair 122 and the second vertical conveyance roller pair 123 to interrupt rotation by determining a motion amount of the envelope E and a position of the flap ef based on a rotation amount (e.g., a number of rotations) of each conveyance roller pair and the like according to the flap length calculated. Subsequently, as illustrated in FIG. 13, the second enclosing guide pawl 163 pivots to pivot the front edge of the first enclosing guide pawl 162 toward the flap guide plate 161. Accordingly, the first enclosing guide pawl 162 presses the flap ef against the flap guide plate 161 in the open state in which the flap ef opens.

When the flap ef moves to the flap guide plate 161 in the open state in which the flap ef opens, the first vertical conveyance roller pair 122 and the second vertical conveyance roller pair 123 resume rotation, conveying the envelope E in the positive Z-direction. Accordingly, as illustrated in FIG. 13, a leading end of the flap ef in the envelope conveyance direction DE moves to a nip formed between two rollers of the flap holding roller pair 164 along the flap guide plate 161.

As the first vertical conveyance roller pair 122 and the second vertical conveyance roller pair 123 continue rotating to convey the envelope E in the positive Z-direction, the first enclosing guide pawl 162 and the second enclosing guide pawl 163 enter the envelope E through the mouth of the envelope E in the open state in which the flap ef opens. Simultaneously, the flap holding roller pair 164 holds the flap ef at the nip of the flap holding roller pair 164.

As a result, as illustrated in FIG. 14, the flap holding roller pair 164 nips the flap ef. The first enclosing guide pawl 162 and the second enclosing guide pawl 163 form a taper that widens the mouth of the envelope E. Thus, the envelope E is in an enclosing standby state in which the envelope E reaches the enclosing position and waits for the enclosure to be inserted into the envelope E.

Figure 15:
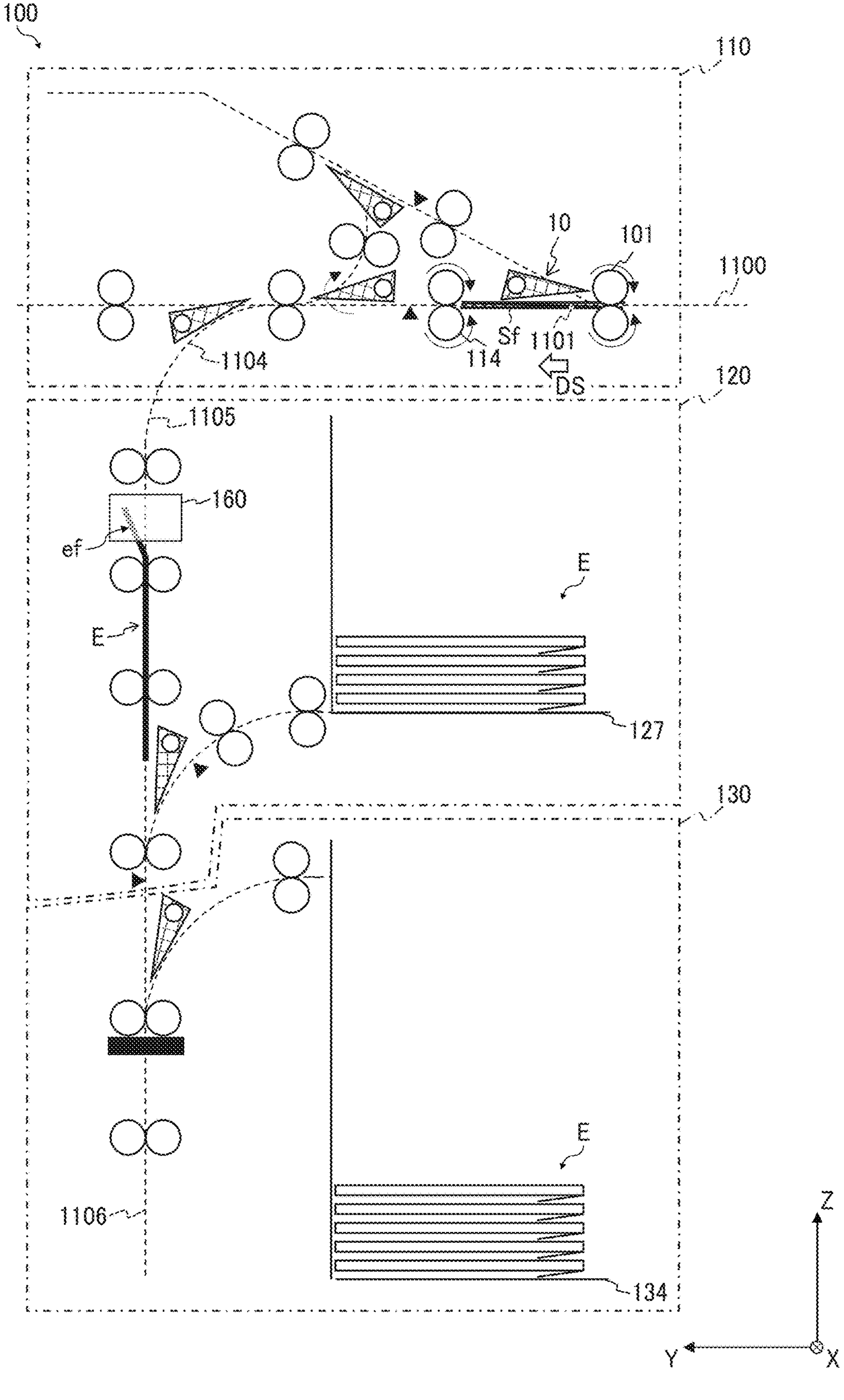
FIG. 15 is a cross-sectional view of the enclosing-sealing apparatus depicted in FIG. 3, illustrating yet another process for enclosing performed by the enclosing-sealing apparatus.

Subsequently, as illustrated in FIG. 15, while the envelope E is in the enclosing standby state at the enclosing position, the entry roller pair 101 of the enclosing-sealing apparatus 100 receives the folded sheet Sf ejected from the upstream apparatus (e.g., the folding apparatus 300) disposed upstream from the enclosing-sealing apparatus 100 in the sheet conveyance direction DS. The entry roller pair 101 conveys the folded sheet Sf to the first conveyance path 1101.

Figure 16:
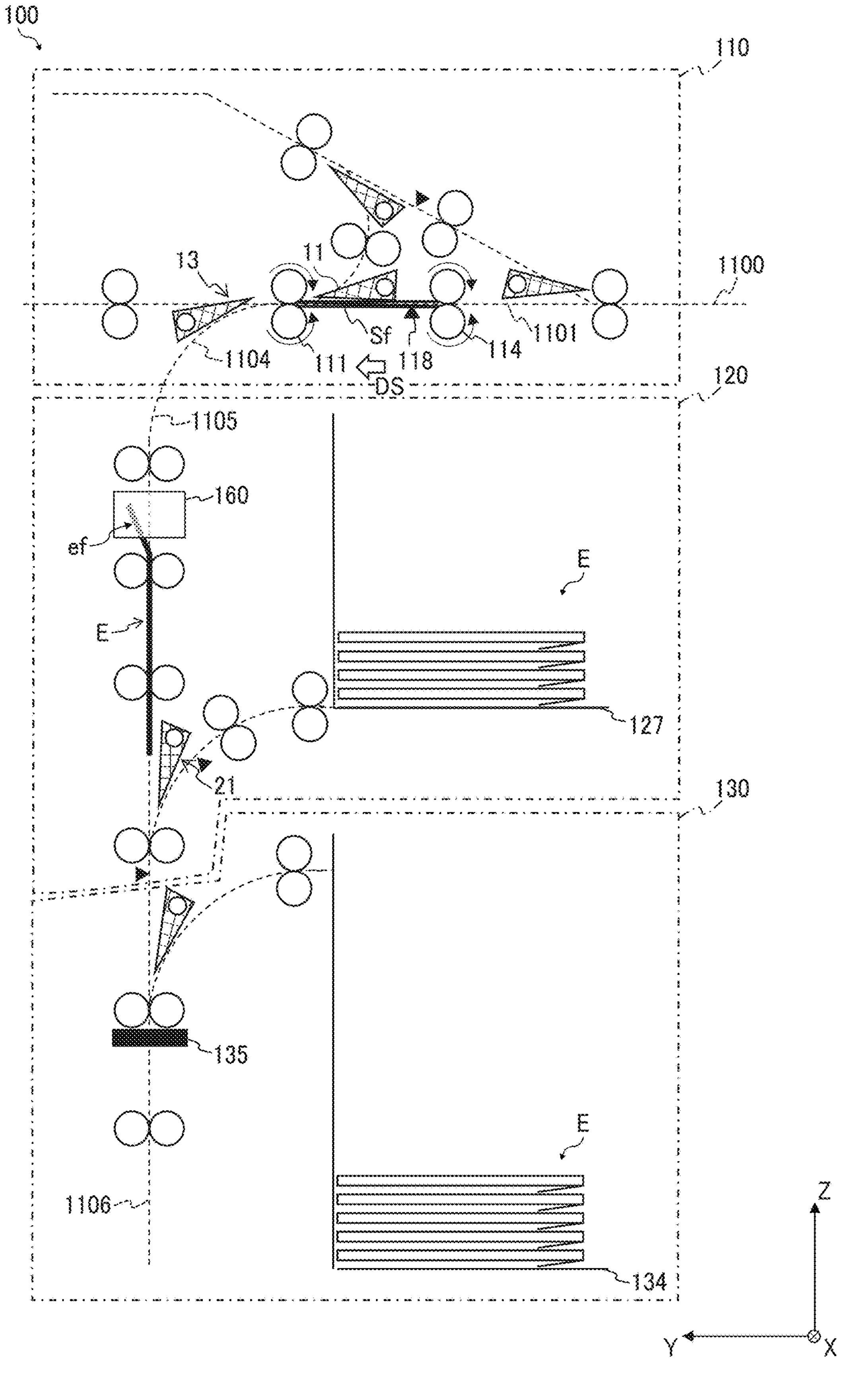
FIG. 16 is a cross-sectional view of the enclosing-sealing apparatus depicted in FIG. 3, illustrating yet another process for enclosing performed by the enclosing-sealing apparatus.

Subsequently, as illustrated in FIG. 16, the first intermediate conveyance roller pair 114 and the first conveyance roller pair 111 convey the folded sheet Sf downstream in the sheet conveyance direction DS. The first switching pawl 11 and the third switching pawl 13 are positioned as illustrated in FIG. 16, guiding the folded sheet Sf from the first conveyance path 1101 to the enclosing conveyance path 1104.

Figure 17:
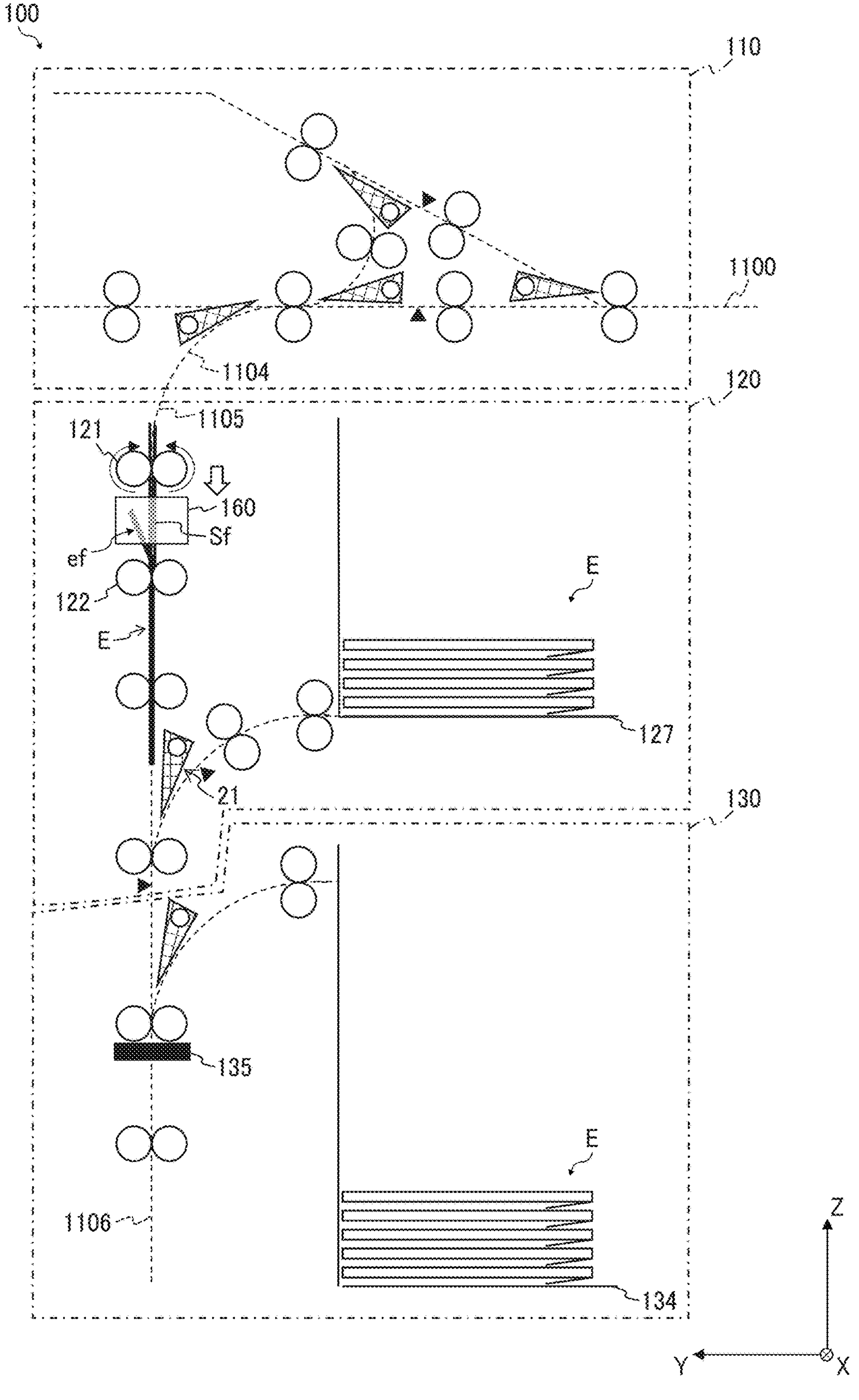
FIG. 17 is a cross-sectional view of the enclosing-sealing apparatus depicted in FIG. 3, illustrating yet another process for enclosing performed by the enclosing-sealing apparatus.

Thereafter, as illustrated in FIG. 17, the enclosing roller pair 121 conveys the folded sheet Sf conveyed from the enclosing conveyance path 1104 to the envelope enclosing conveyance path 1105 farther in the negative Z-direction. As a result, the first vertical conveyance roller pair 122 and the like hold the folded sheet Sf at the predetermined enclosing position in the envelope enclosing conveyance path 1105. The folded sheet Sf is inserted into the envelope E in the enclosing standby state.

Figure 18:
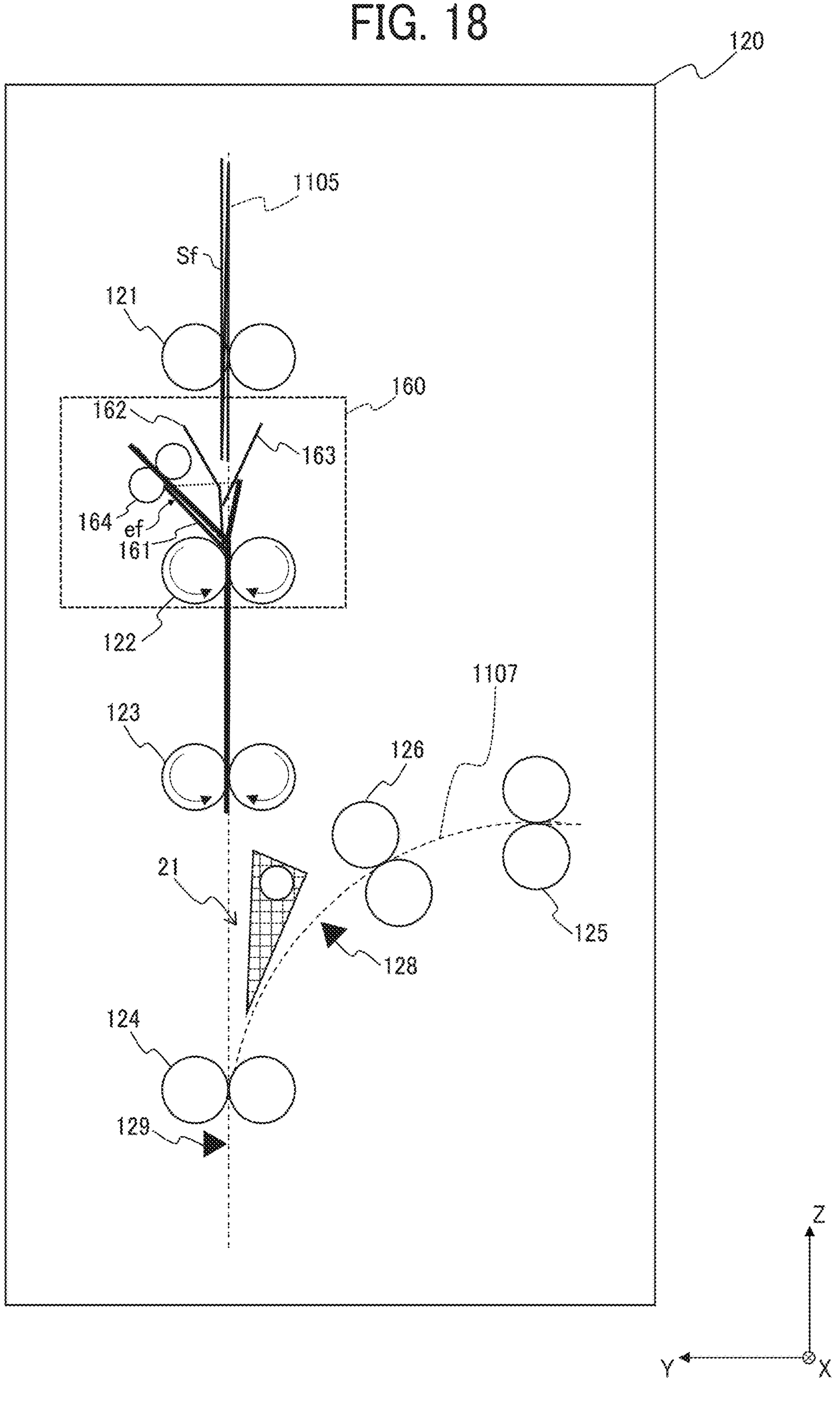
FIG. 18 is a cross-sectional view of the envelope opener-holder depicted in FIG. 5, illustrating yet another motion thereof during enclosing performed by the enclosing-sealing apparatus.
Figure 19:
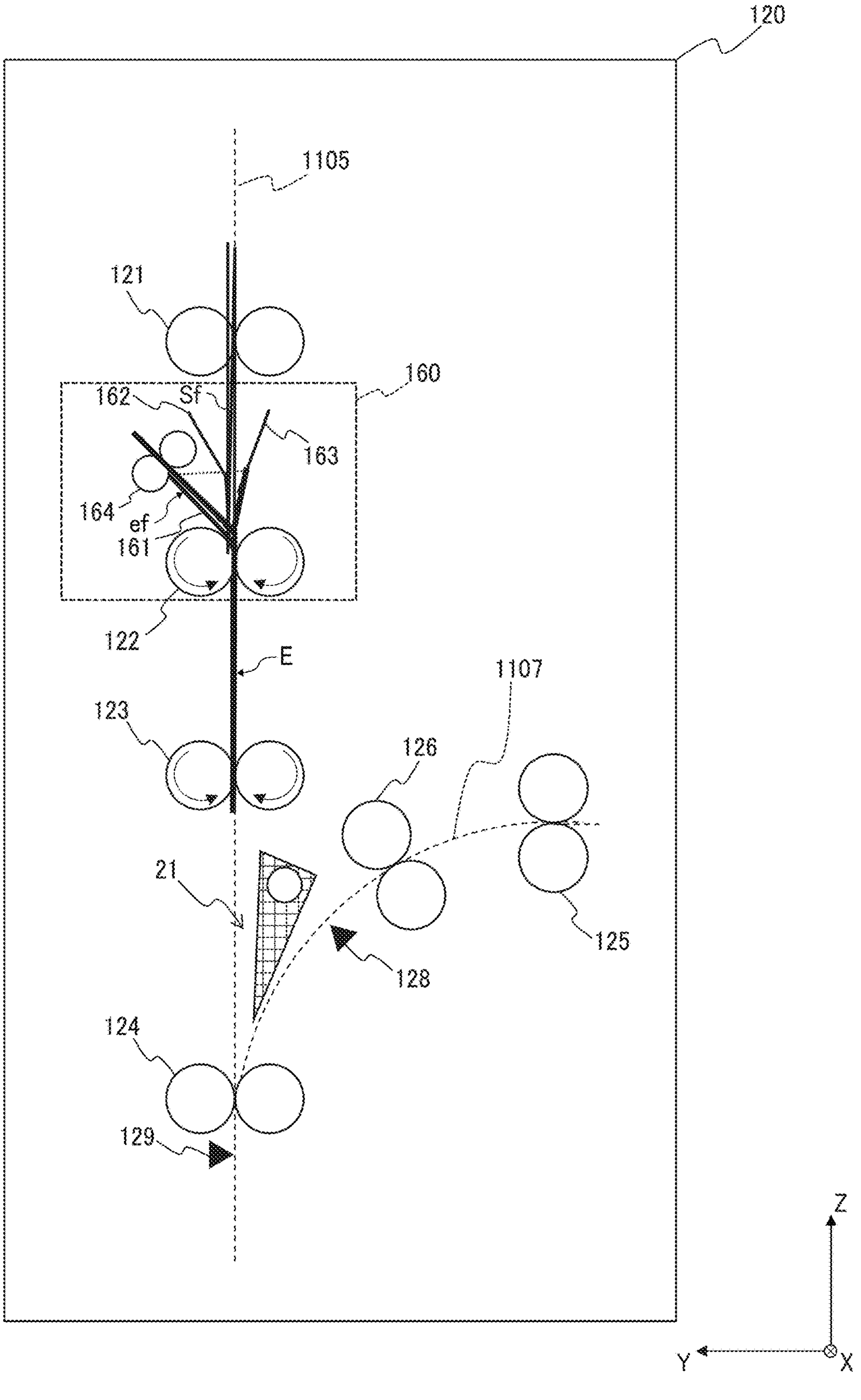
FIG. 19 is a cross-sectional view of the envelope opener-holder depicted in FIG. 5, illustrating yet another motion thereof during enclosing performed by the enclosing-sealing apparatus.

As illustrated in FIG. 18, the enclosing roller pair 121 conveys the folded sheet Sf serving as the enclosure to a gap between the first enclosing guide pawl 162 and the second enclosing guide pawl 163. As a result, as illustrated in FIG. 19, the folded sheet Sf thrusts the second enclosing guide pawl 163 aside and is conveyed into the envelope E. Each of the first vertical conveyance roller pair 122 and the second vertical conveyance roller pair 123 releases pressure applied at a nip formed between two rollers thereof. Thus, the two rollers of each of the first vertical conveyance roller pair 122 and the second vertical conveyance roller pair 123 separate from each other, causing the folded sheet Sf serving as the enclosure to be inserted into the envelope E.

Figure 20:
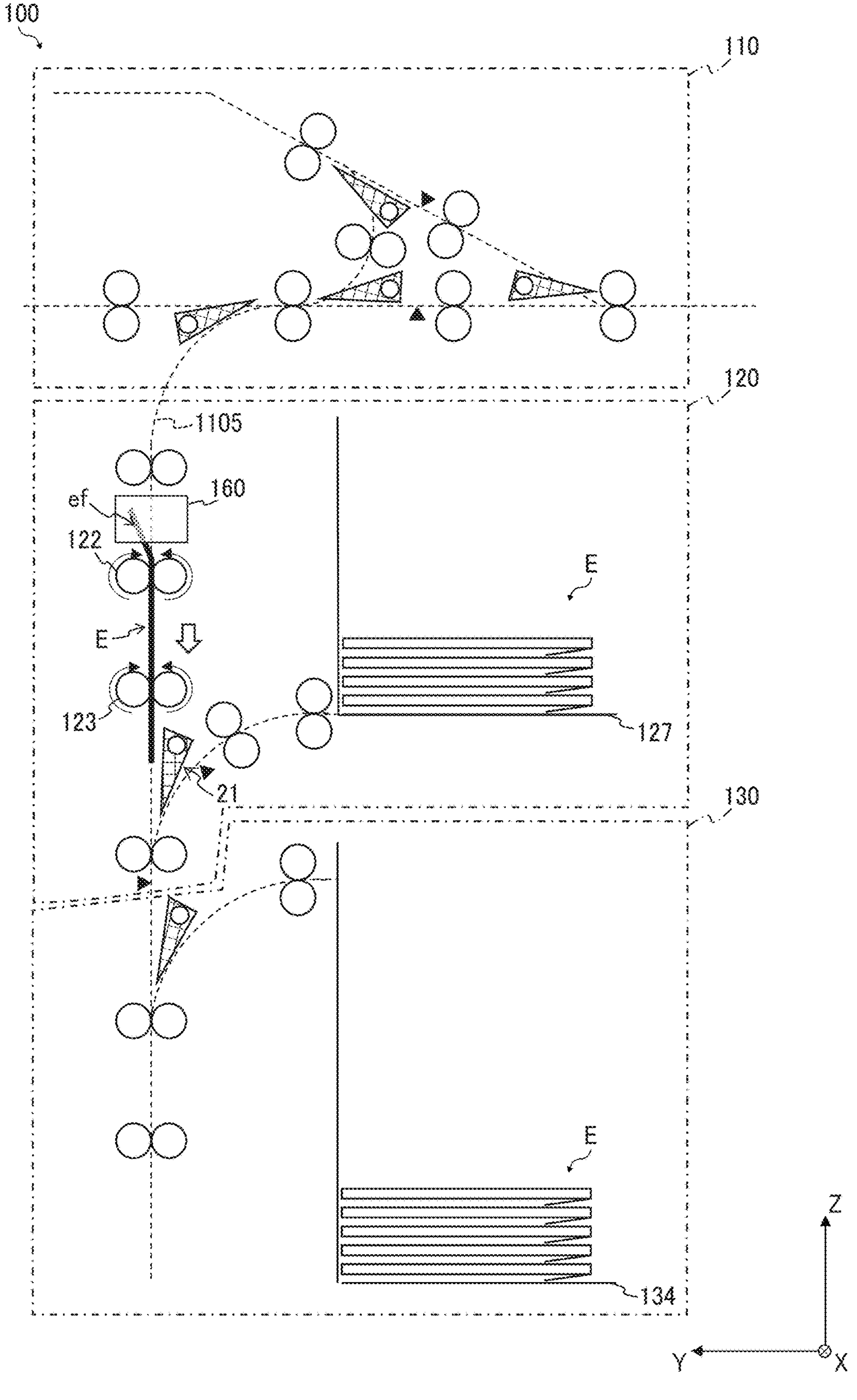
FIG. 20 is a cross-sectional view of the enclosing-sealing apparatus depicted in FIG. 3, illustrating yet another process for enclosing performed by the enclosing-sealing apparatus.
Figure 21:
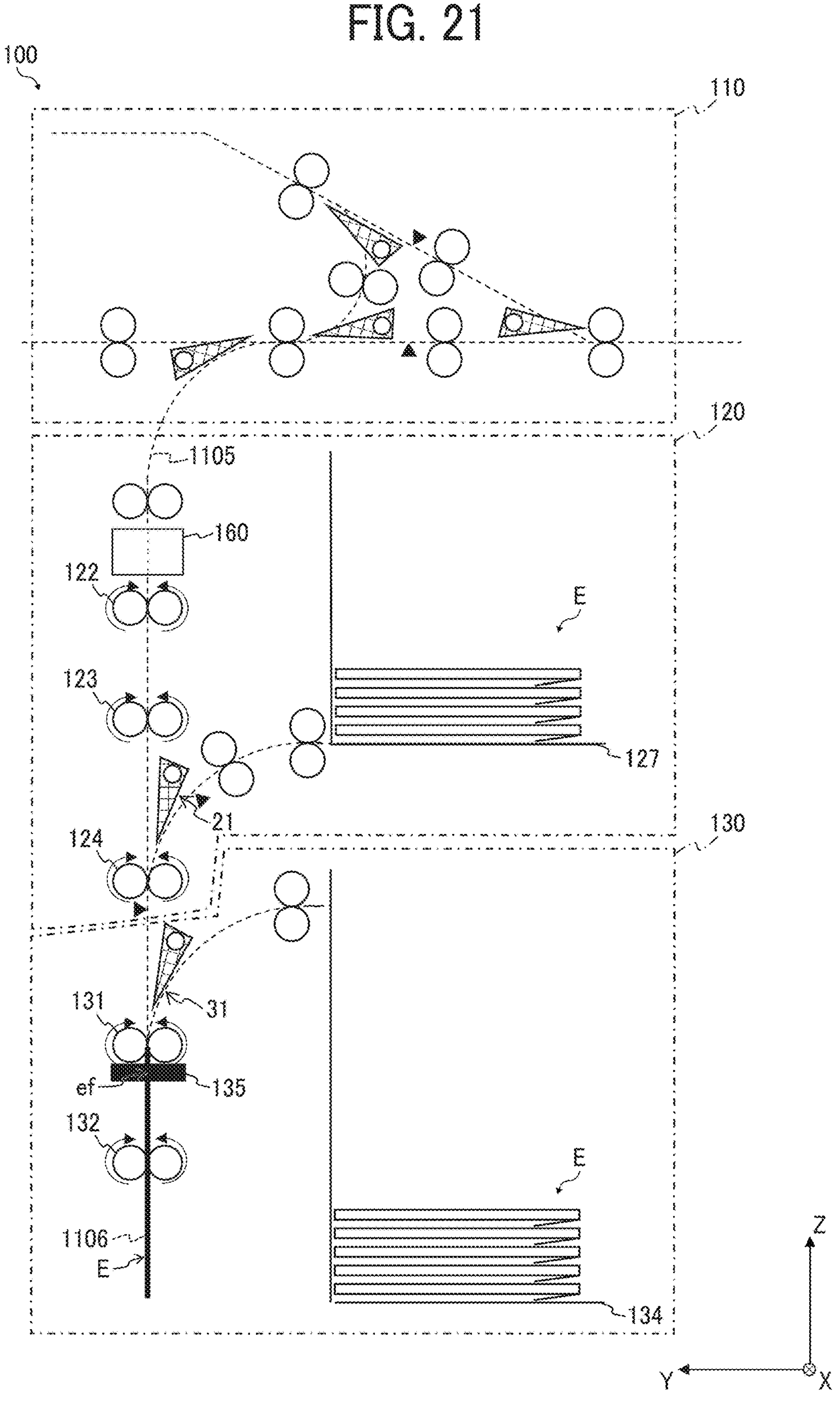
FIG. 21 is a cross-sectional view of the enclosing-sealing apparatus depicted in FIG. 3, illustrating yet another process for enclosing performed by the enclosing-sealing apparatus.

Subsequently, as illustrated in FIG. 20, the first vertical conveyance roller pair 122 and the second vertical conveyance roller pair 123 rotate, conveying the envelope E downward to the fourth vertical conveyance roller pair 132 as illustrated in FIG. 21. The envelope E enclosed with the folded sheet Sf is conveyed to a past position where the flap ef is past the envelope ejecting switching pawl 31.

Figure 22:
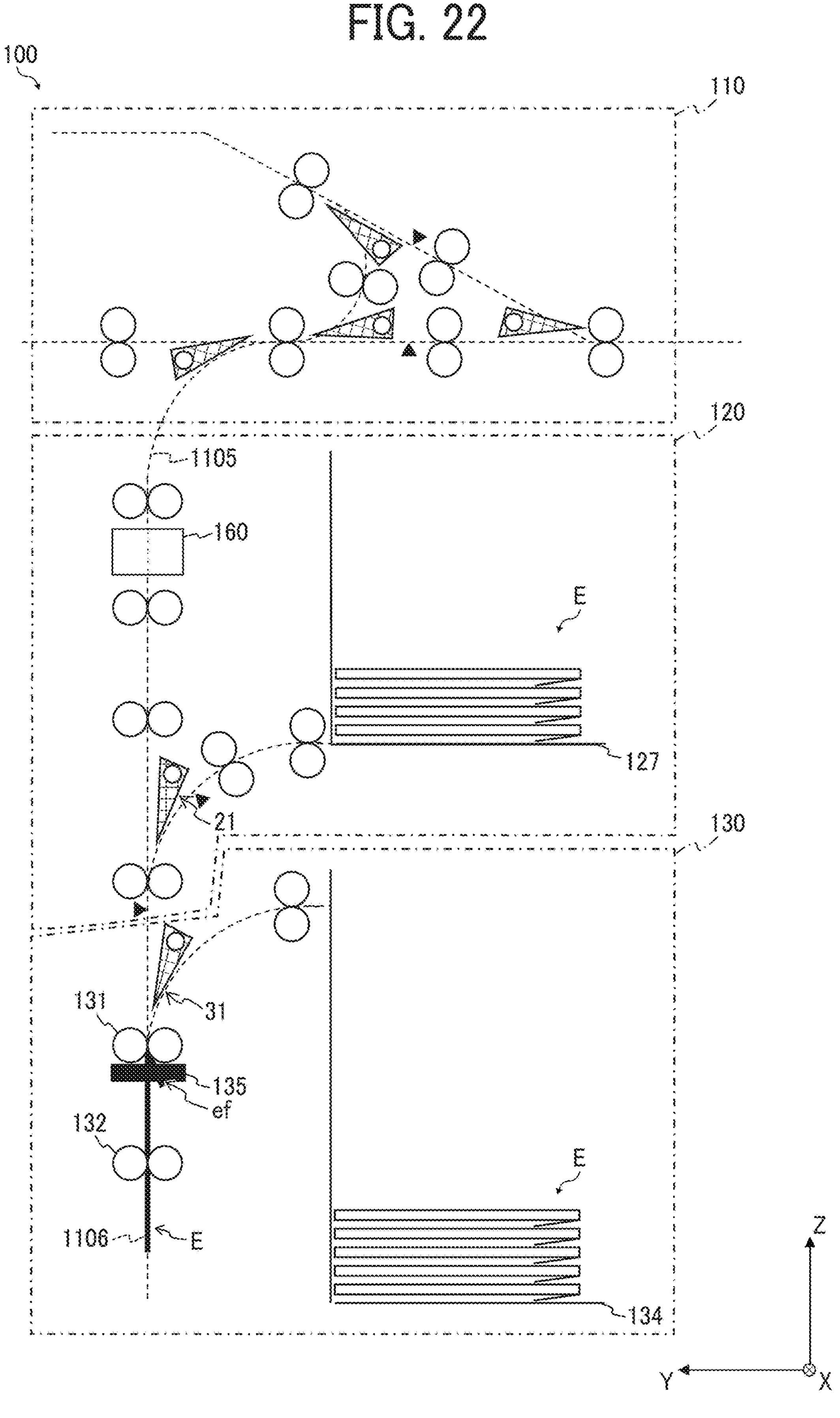
FIG. 22 is a cross-sectional view of the enclosing-sealing apparatus depicted in FIG. 3, illustrating yet another process for enclosing performed by the enclosing-sealing apparatus.

Thereafter, as illustrated in FIG. 22, the sealer 135 closes the flap ef, sealing the envelope E at a position interposed between the third vertical conveyance roller pair 131 and the fourth vertical conveyance roller pair 132.

Figure 23:
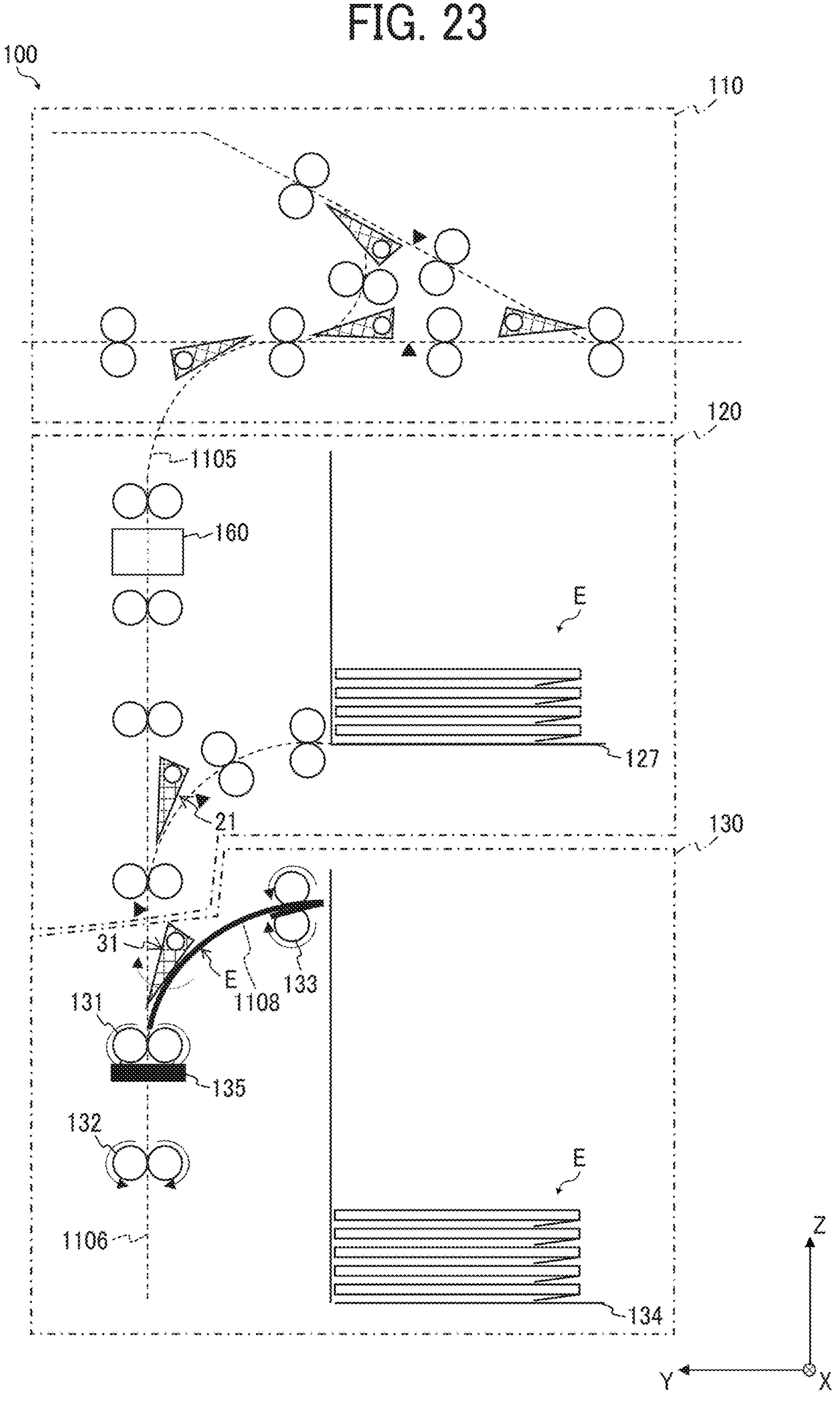
FIG. 23 is a cross-sectional view of the enclosing-sealing apparatus depicted in FIG. 3, illustrating yet another process for enclosing performed by the enclosing-sealing apparatus.

Thereafter, as illustrated in FIG. 23, the third vertical conveyance roller pair 131 and the fourth vertical conveyance roller pair 132 rotate backward, switching back and conveying the sealed envelope E. Before the third vertical conveyance roller pair 131 and the fourth vertical conveyance roller pair 132 rotate backward, the envelope ejecting switching pawl 31 pivots to a position depicted in FIG. 23. Accordingly, the third vertical conveyance roller pair 131 and the fourth vertical conveyance roller pair 132 convey the envelope E enclosed with the folded sheet Sf from the sealing conveyance path 1106 to the envelope ejecting path 1108.

Figure 24:
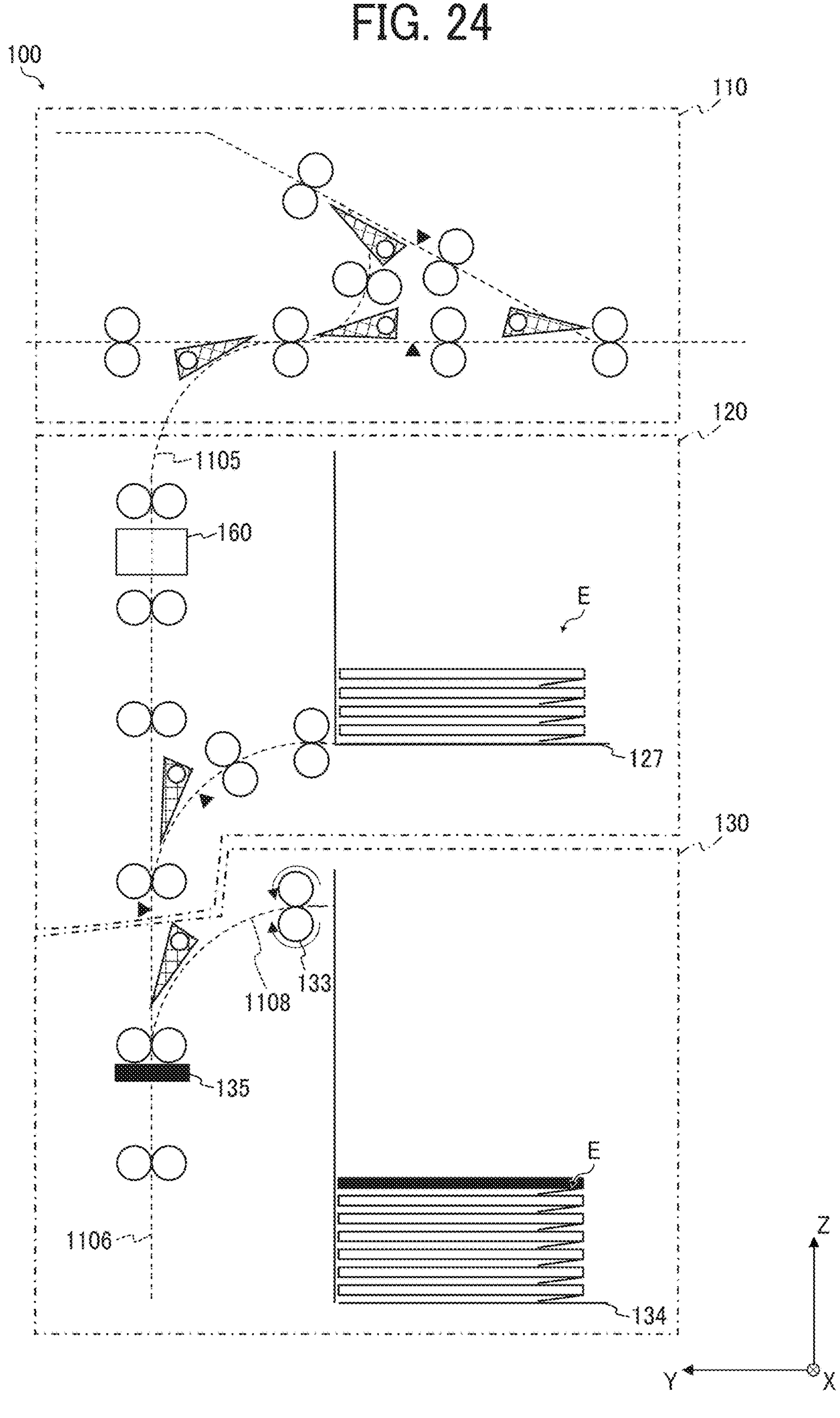
FIG. 24 is a cross-sectional view of the enclosing-sealing apparatus depicted in FIG. 3, illustrating yet another process for enclosing performed by the enclosing-sealing apparatus.

As a result, as illustrated in FIG. 24, the envelope ejecting roller pair 133 ejects the sealed envelope E onto the envelope ejection tray 134.

A description is provided of a construction of a comparative enclosing-sealing apparatus.

Before an enclosure is inserted into an envelope, a controller determines an open state of a flap of the envelope, that is, whether or not the flap of the envelope opens properly. For example, a sensor has a detection line that defines an angle not perpendicular to a conveyance direction of the envelope and is disposed at a height from an upper part of a leading end of the flap opened at an angle perpendicular to a conveyance face of the envelope. The controller determines the open state of the flap by using the sensor.

Since the comparative enclosing-sealing apparatus includes the sensor exclusively used for the controller to determine the open state of the flap, the comparative enclosing-sealing apparatus is not downsized. Additionally, in order to enclose the enclosure into envelopes of various types, since a flap length of the flap of the envelope varies depending on the type of the envelope, the controller is requested to control enclosing of the enclosure into the envelope according to the flap length. Hence, the controller is requested to measure the flap length. The comparative enclosing-sealing apparatus determines the open state of the flap. However, the controller may not measure the flap length precisely. Thus, the comparative enclosing-sealing apparatus may not detect the open state of the flap and the flap length precisely while attaining downsizing.

To address those circumstances of the comparative enclosing-sealing apparatus, the enclosing-sealing apparatus 100 according to embodiments of the present disclosure, that is downsized, detects the open state of the flap of and the flap length precisely.

A description is provided of functional blocks of the enclosing-sealing controller 150 that controls enclosing and the like described above.

Figure 25:
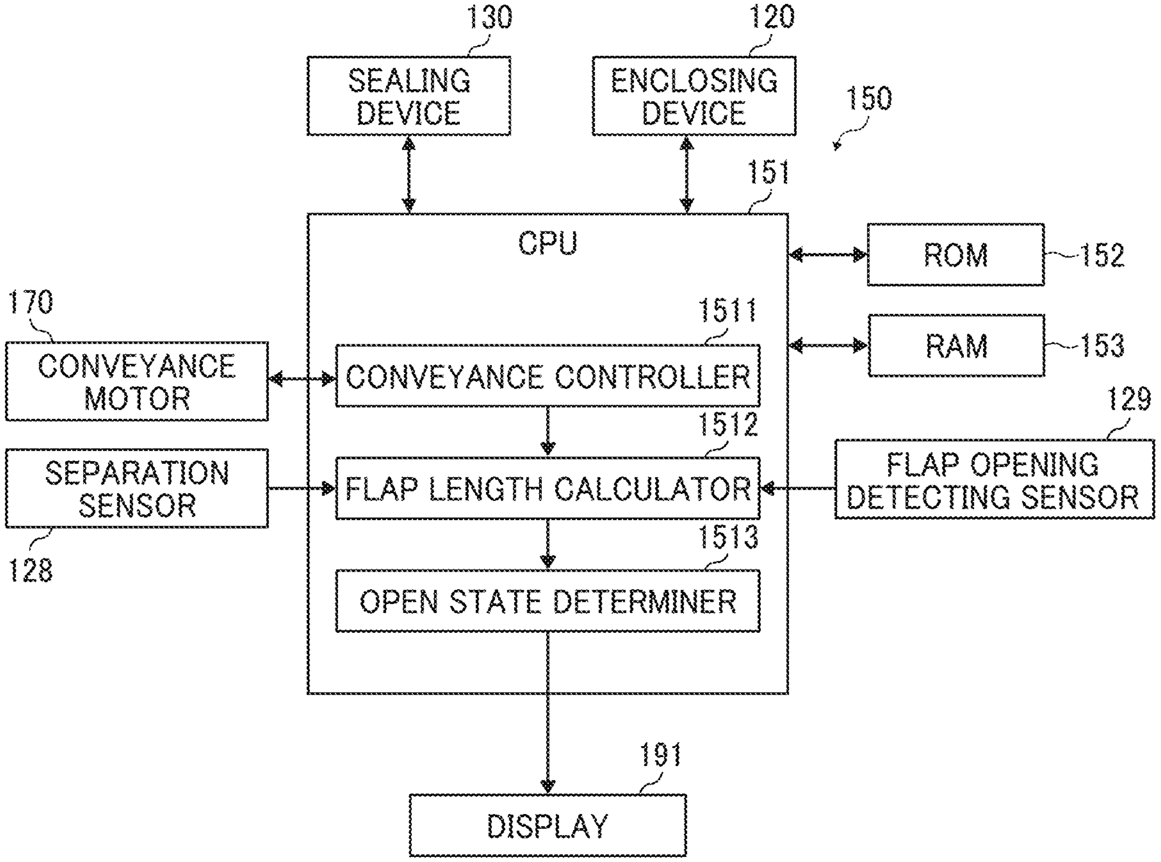
FIG. 25 is a functional block diagram of a controller incorporated in the enclosing-sealing apparatus depicted in FIG. 2.

As illustrated in FIG. 25, the enclosing-sealing controller 150 includes, as the functional blocks, a central processing unit (CPU) 151 serving as an arithmetic processing unit, a read only memory (ROM) 152 that stores a control program executed by the CPU 151, and a random access memory (RAM) 153 serving as a work area where the CPU 151 executes the control program to perform a predetermined control.

As the CPU 151 executes the control program, a conveyance controller 1511, a flap length calculator 1512, and an open state determiner 1513 establish a conveyance function. The conveyance controller 1511 controls rotation of a conveyance motor 170 serving as a driver that drives and rotates the plurality of conveyance roller pairs that conveys the envelope E. The conveyance motor 170, serving as the driver that rotates each of the conveyance roller pairs described above, is disposed properly in the enclosing-sealing apparatus 100.

The conveyance controller 1511 controls a rotation speed and a rotation amount (e.g., a number of rotations) of the conveyance motor 170 and sends a notification concerning the rotation speed and the rotation amount of the conveyance motor 170 to the flap length calculator 1512.

The flap length calculator 1512 receives detection signals sent from the separation sensor 128 and the flap opening detecting sensor 129 each of which detects the leading end and the trailing end of the envelope E in the envelope conveyance direction DE. Based on the detection signals sent from the separation sensor 128 and the flap opening detecting sensor 129 and the notification sent from the conveyance controller 1511, the flap length calculator 1512 calculates the first envelope length and the second envelope length, calculates the flap length, and sends a notification concerning the flap length to the open state determiner 1513.

The open state determiner 1513 determines the open state of the flap ef of the envelope E, that is, whether or not the flap ef of the envelope E opens properly, based on the notified flap length. If the open state determiner 1513 determines that the flap ef of the envelope E suffers from failure that the flap ef does not open properly, the open state determiner 1513 controls a display 191 to display information that the failure occurs. The display 191 is one example of the notification device 190 depicted in FIG. 2. The display 191 notifies the user of a status of enclosing the folded sheet Sf into the envelope E.

Figure 26:
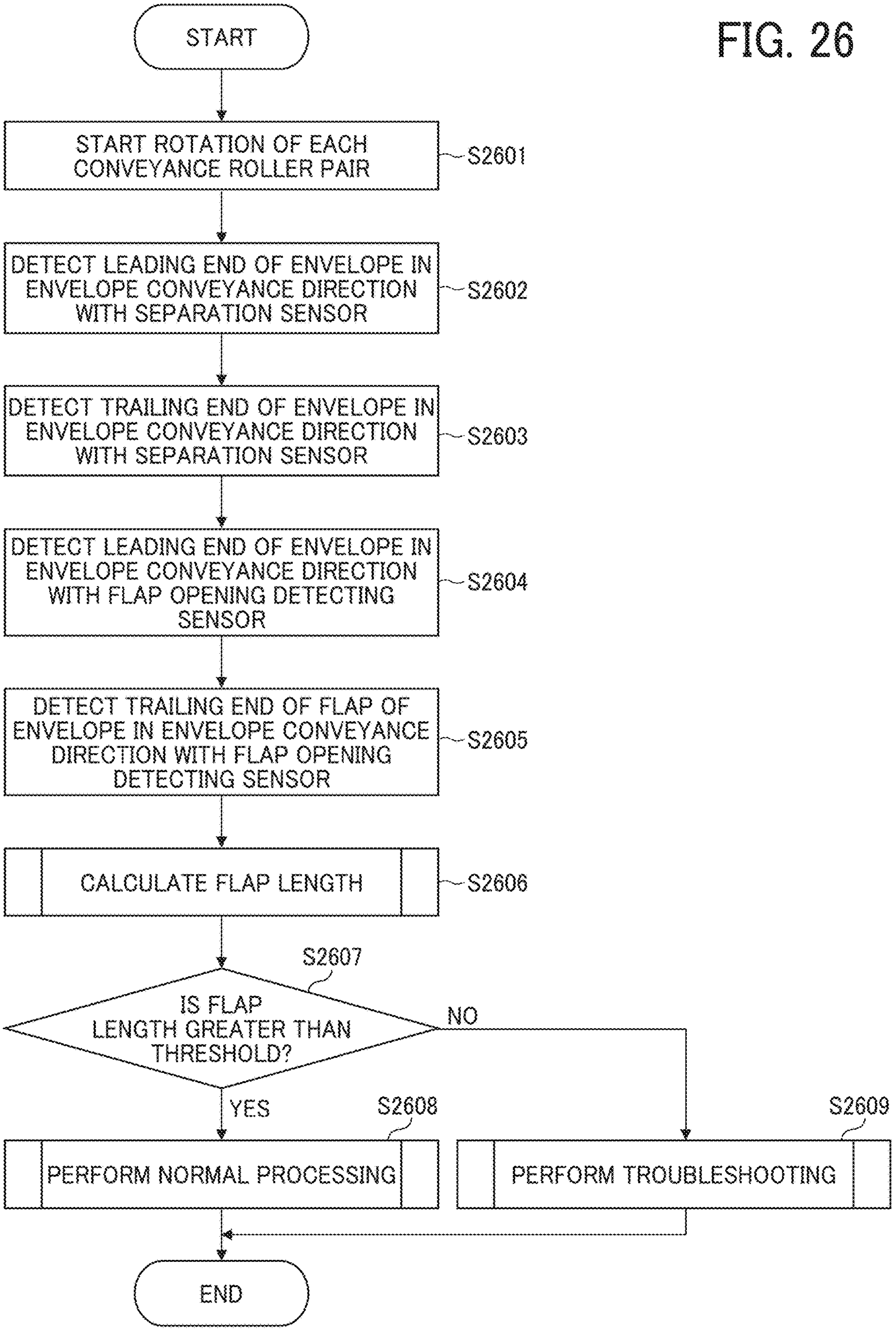
FIG. 26 is a flowchart of a series of processes for conveying the envelope, that is controlled by the controller depicted in FIG. 25.

Referring to FIG. 26 illustrating a flowchart, a description is provided of a series of processes for conveying the envelope E as one of the operations performed by the enclosing-sealing apparatus 100 described above.

FIG. 26 illustrates the processes for conveying the envelope E as a part of processes for conveying the envelope E to the enclosing position where the enclosure is inserted into the envelope E.

In step S2601, the conveyance controller 1511 controls each conveyance roller pair (e.g., the separating roller pair 125 and the envelope conveyance roller pair 126) to start rotation, separate one envelope E from other envelopes E placed on the envelope tray 127, and start conveying the envelope E. The conveyance controller 1511 notifies the flap length calculator 1512 of the number of rotations, the rotation amount, and the like of each conveyance roller pair.

Subsequently, as described above, while the envelope E is conveyed through the envelope entry path 1107, the separation sensor 128 detects the leading end of the envelope E in the envelope conveyance direction DE and sends a detection result to the flap length calculator 1512 in step S2602. Subsequently, the separation sensor 128 detects the trailing end of the envelope E in the envelope conveyance direction DE and sends a detection result to the flap length calculator 1512 in step S2603.

Subsequently, the envelope E enters the envelope enclosing conveyance path 1105 from the envelope entry path 1107. The flap opening detecting sensor 129 detects the leading end of the envelope E in the envelope conveyance direction DE and sends a detection result to the flap length calculator 1512 in step S2604. Subsequently, the flap opening detecting sensor 129 detects the trailing end of the flap ef of the envelope E in the envelope conveyance direction DE and sends a detection result to the flap length calculator 1512 in step S2605.

Subsequently, the flap length calculator 1512 calculates the first envelope length and the second envelope length, calculates the flap length based on the first envelope length and the second envelope length, and notifies the open state determiner 1513 of the flap length in step S2606.

In step S2607, the open state determiner 1513 determines whether or not the flap length is greater than a predetermined threshold. Based on the predetermined threshold that is preset, the open state determiner 1513 identifies the flap length that is calculated if the flap ef does not open properly. For example, if the open state determiner 1513 determines that the flap length is zero (NO in step S2607), the enclosing-sealing apparatus 100 performs troubleshooting in step S2609. As causes of failure that the open state determiner 1513 determines that the open state of the flap ef is faulty, that is, the flap ef does not open properly, the envelope E may be placed on the envelope tray 127 with an erroneous orientation. The flap opener 180 may not open the flap ef sufficiently. The separation sensor 128 and the flap opening detecting sensor 129 may detect the envelope E with a detection error. To address those circumstances, the open state determiner 1513 determines that failure occurs if the open state determiner 1513 determines that the flap length is zero. Additionally, the open state determiner 1513 uses the threshold that defines a failure range with which the open state determiner 1513 determines that failure occurs, that is, the open state of the flap ef is faulty. For example, the threshold is defined in several millimeters. The open state determiner 1513 uses a value within a range in which the open state determiner 1513 determines that the open state of the flap ef is faulty, that is, the flap ef does not open properly, and therefore the envelope E is subject to faulty enclosing. If the open state determiner 1513 determines that the flap length is greater than the threshold (YES in step S2607), the enclosing-sealing apparatus 100 performs normal processing of enclosing and sealing in step S2608.

A description is provided of a configuration of the enclosing-sealing controller 150 according to a first embodiment of the present disclosure, that performs troubleshooting.

Figure 27:
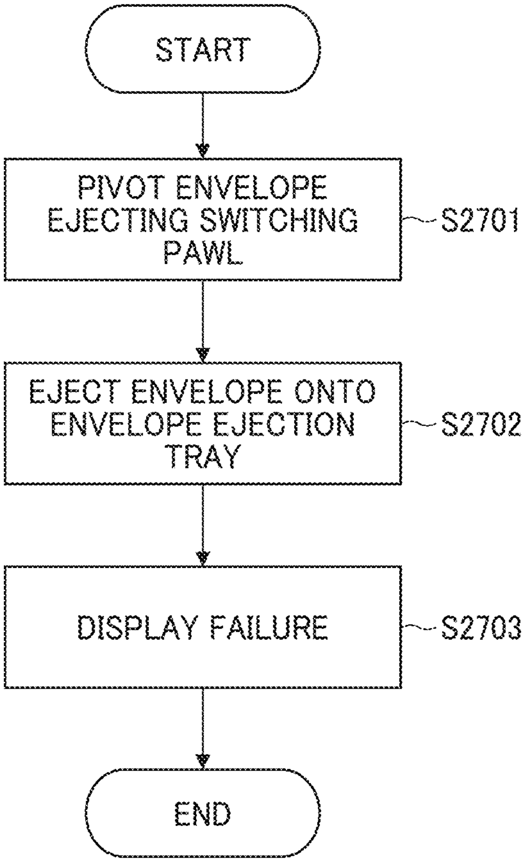
FIG. 27 is a flowchart of one example of detailed processes of the series of processes for conveying the envelope depicted in FIG. 26.

Referring to FIG. 27 illustrating a flowchart, a detailed description is now given of an example of troubleshooting in step S2609 depicted in FIG. 26.

If the open state determiner 1513 determines that the flap length is not greater than the threshold (NO in step S2607) and that the open state of the flap ef is faulty, the enclosing-sealing controller 150 controls the envelope ejecting switching pawl 31 to pivot in step S2701, switching a conveyance path in switchback conveyance of the envelope E from the envelope enclosing conveyance path 1105 to the envelope ejecting path 1108.

Subsequently, the enclosing-sealing controller 150 controls the third vertical conveyance roller pair 131, the fourth vertical conveyance roller pair 132, and the envelope ejecting roller pair 133 to rotate, ejecting the envelope E onto the envelope ejection tray 134 in step S2702.

Subsequently, the enclosing-sealing controller 150 controls the display 191 to display information that failure in conveyance of the envelope E occurs in step S2703.

A description is supplementally provided of the series of processes described above with reference to drawings illustrating conveyance of the envelope E according to the first embodiment of the present disclosure.

Figure 28:
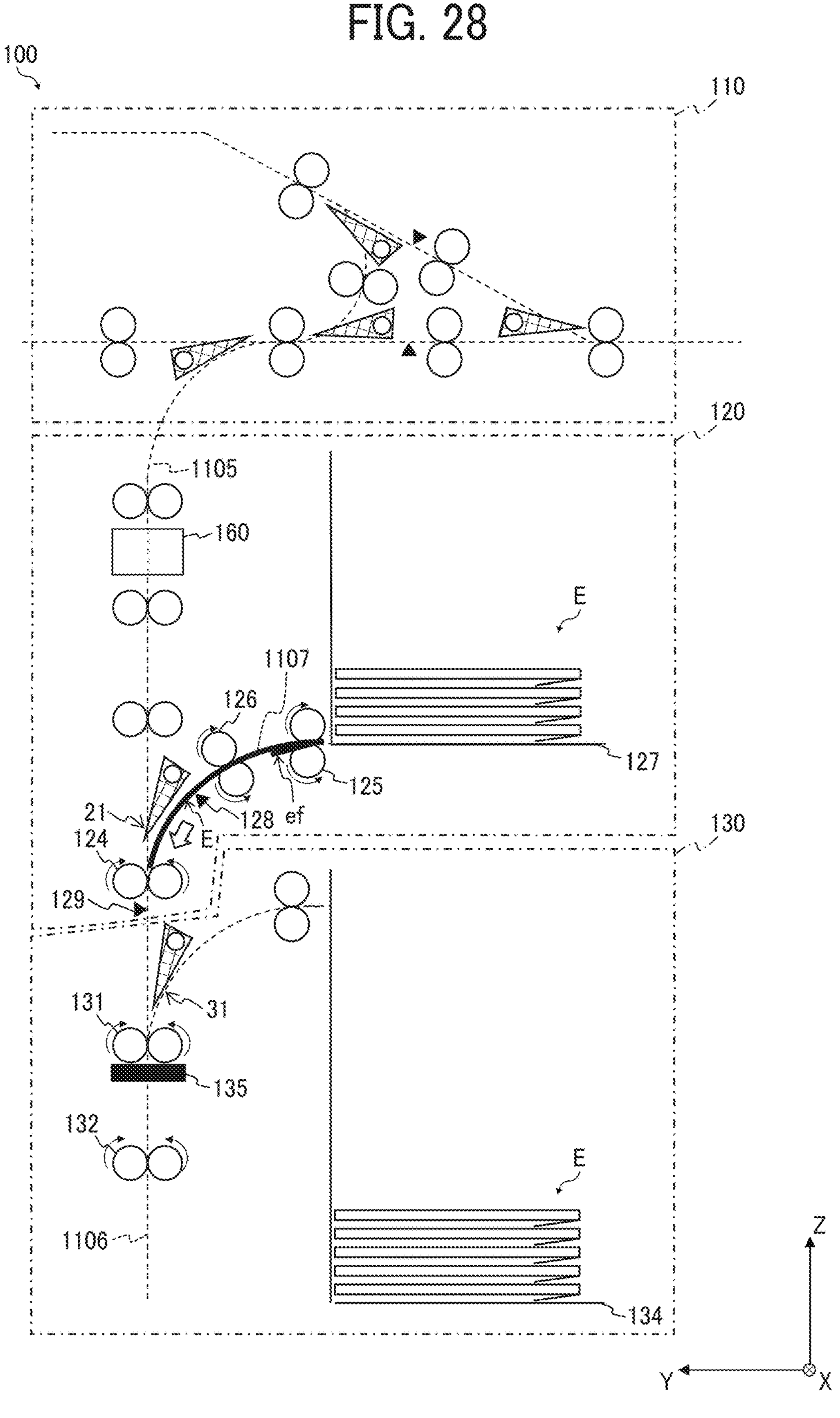
FIG. 28 is a cross-sectional view of the enclosing-sealing apparatus depicted in FIG. 3, illustrating yet another process for enclosing performed by the enclosing-sealing apparatus.
Figure 29:
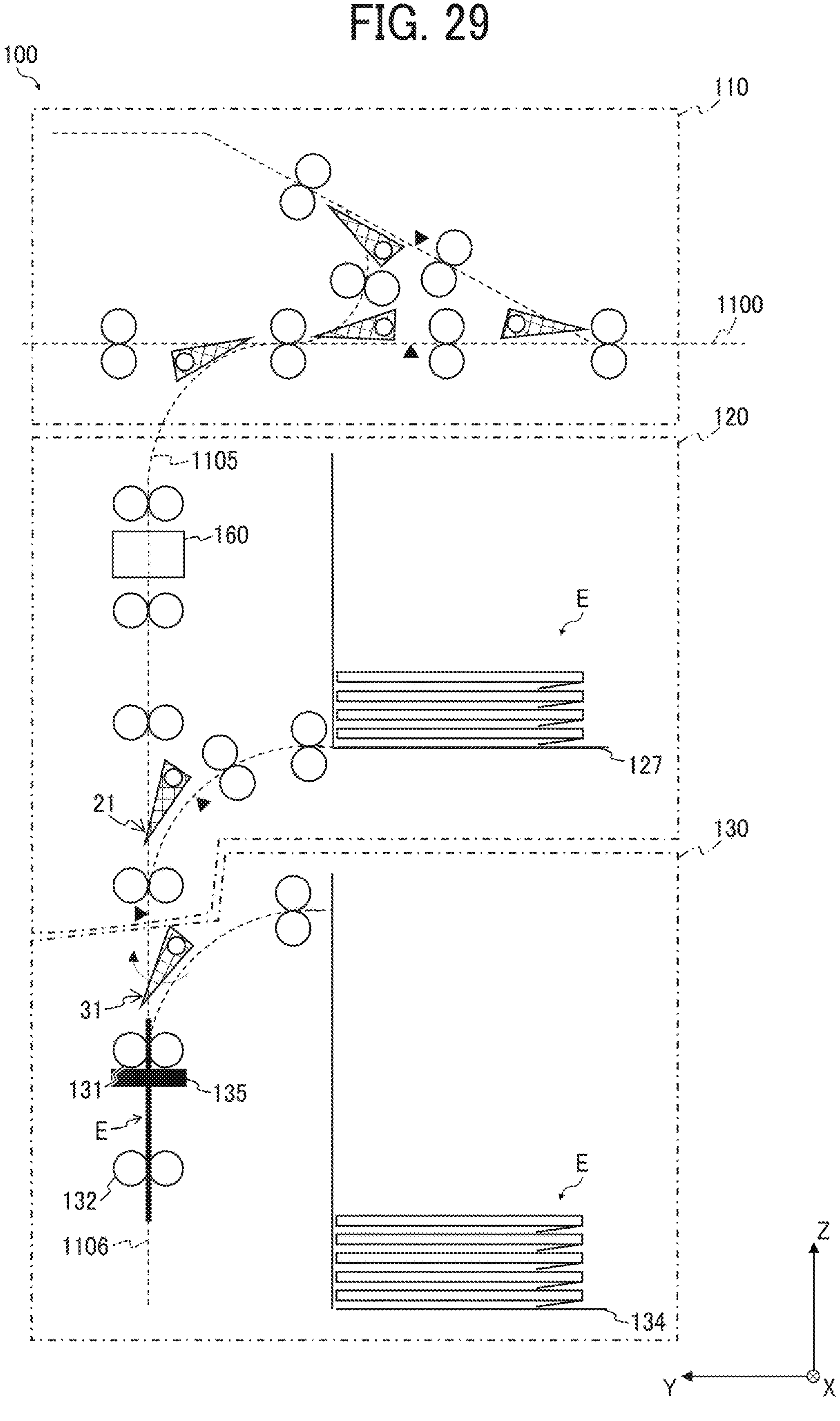
FIG. 29 is a cross-sectional view of the enclosing-sealing apparatus depicted in FIG. 3, illustrating yet another process for enclosing performed by the enclosing-sealing apparatus.

FIGS. 28 and 29 illustrate conveyance of the envelope E in steps S2601 to S2606 depicted in FIG. 26. FIG. 28 illustrates the envelope E at a time during a time period from step S2601 to step S2603. FIG. 29 illustrates the envelope E when the enclosing-sealing controller 150 performs determination in step S2607 after step S2606.

Figure 30:
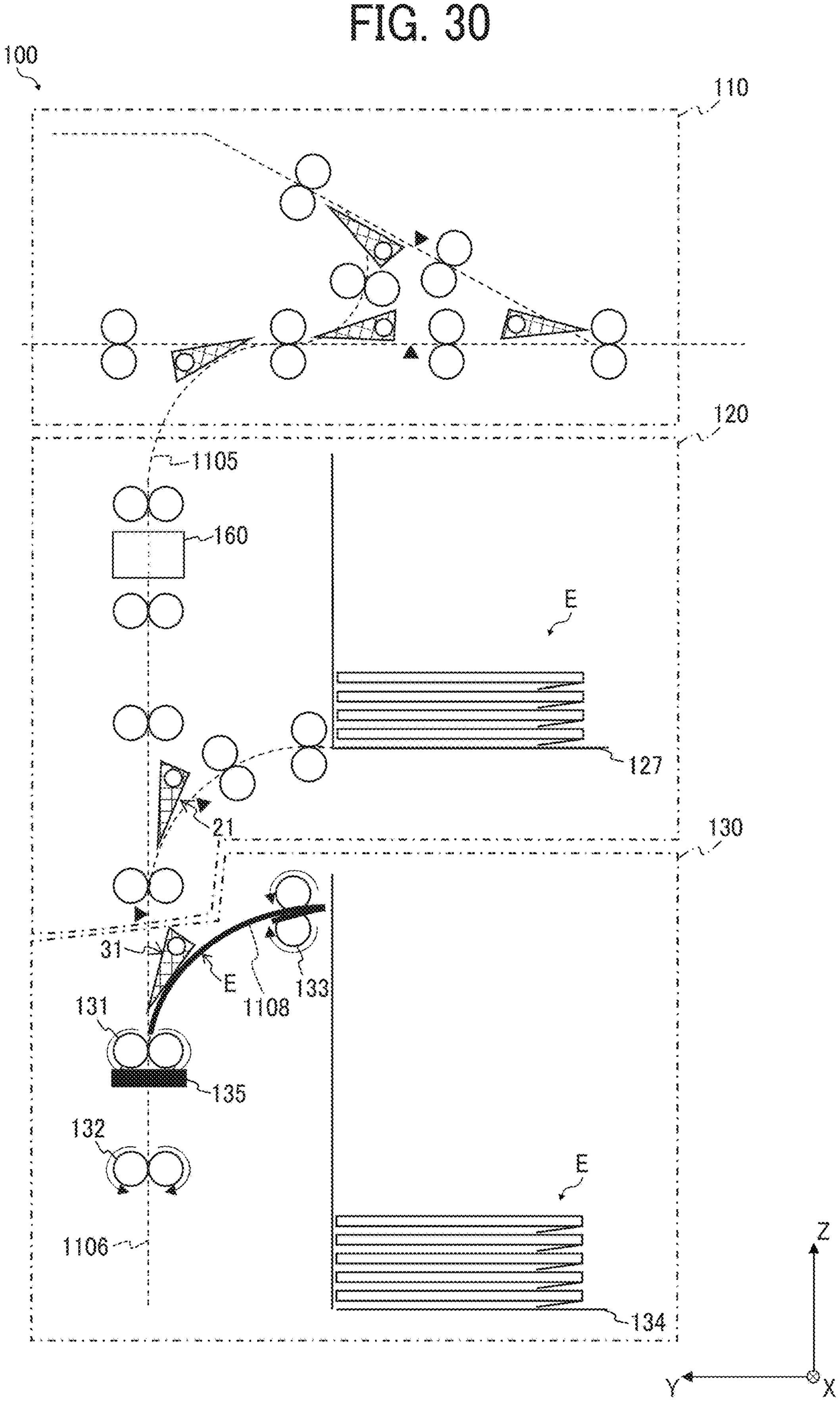
FIG. 30 is a cross-sectional view of the enclosing-sealing apparatus depicted in FIG. 3, illustrating yet another process for enclosing performed by the enclosing-sealing apparatus.
Figure 31:
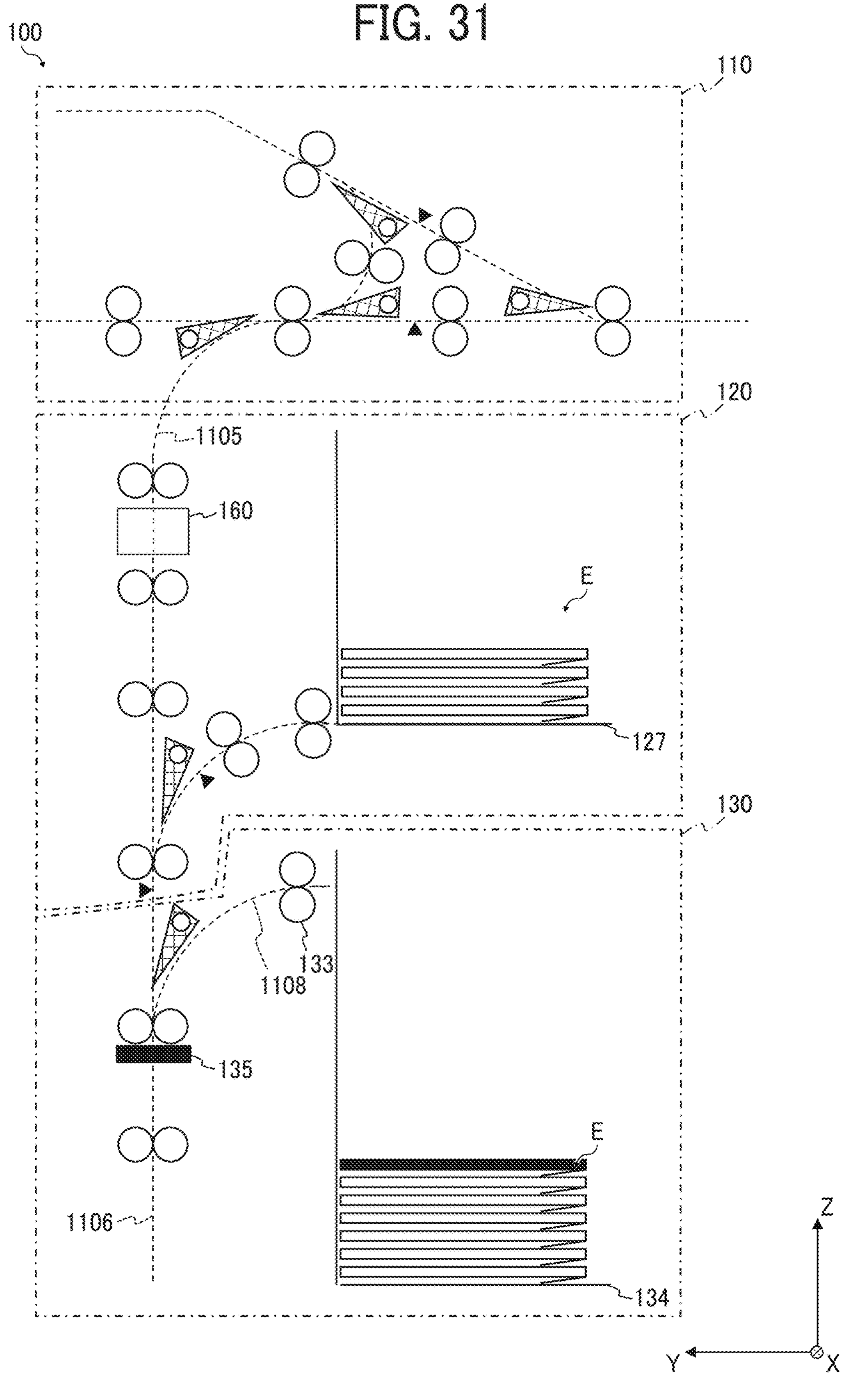
FIG. 31 is a cross-sectional view of the enclosing-sealing apparatus depicted in FIG. 3, illustrating yet another process for enclosing performed by the enclosing-sealing apparatus.

When the envelope E is situated at a position illustrated in FIG. 29, the enclosing-sealing controller 150 performs determination in step S2607. Thereafter, as illustrated in FIG. 30, the third vertical conveyance roller pair 131 and the fourth vertical conveyance roller pair 132 convey the envelope E to the envelope ejecting path 1108. As illustrated in FIG. 31, the envelope ejecting roller pair 133 ejects the envelope E onto the envelope ejection tray 134. The enclosing-sealing controller 150 controls the display 191 to display information that failure occurs.

According to the first embodiment described above, the enclosing-sealing controller 150 uses the separation sensor 128 and the flap opening detecting sensor 129 also used to detect a conveyance state and a conveyance failure of the envelope E. Accordingly, the enclosing-sealing controller 150 determines whether or not the flap ef opens properly. Additionally, if the enclosing-sealing controller 150 determines that the flap ef suffers from failure that the flap ef does not open properly, that is, the open state of the flap ef is faulty, the enclosing-sealing controller 150 performs controls to interrupt conveyance of the envelope E quickly, eject the envelope E onto the envelope ejection tray 134, and display information that failure occurs.

For example, with the separation sensor 128 and the flap opening detecting sensor 129 used to control conveyance of the envelope E, the enclosing-sealing controller 150 controls monitoring of jamming of the envelope E, that hinders the envelope E from moving to a destination and retains the envelope E. Additionally, the enclosing-sealing controller 150 calculates the flap length of the envelope E and determines that failure occurs based on the calculated flap length.

Even if the envelope E is placed on the envelope tray 127 with a proper orientation, the flap opener 180 may not open the flap ef sufficiently. To address this circumstance, even if the flap ef partly opens, the enclosing-sealing controller 150 selects the threshold according to the flap length calculated in step S2606. Accordingly, the enclosing-sealing controller 150 detects and determines that the flap ef partly opens by comparing the calculated flap length with the threshold.

Figure 32:
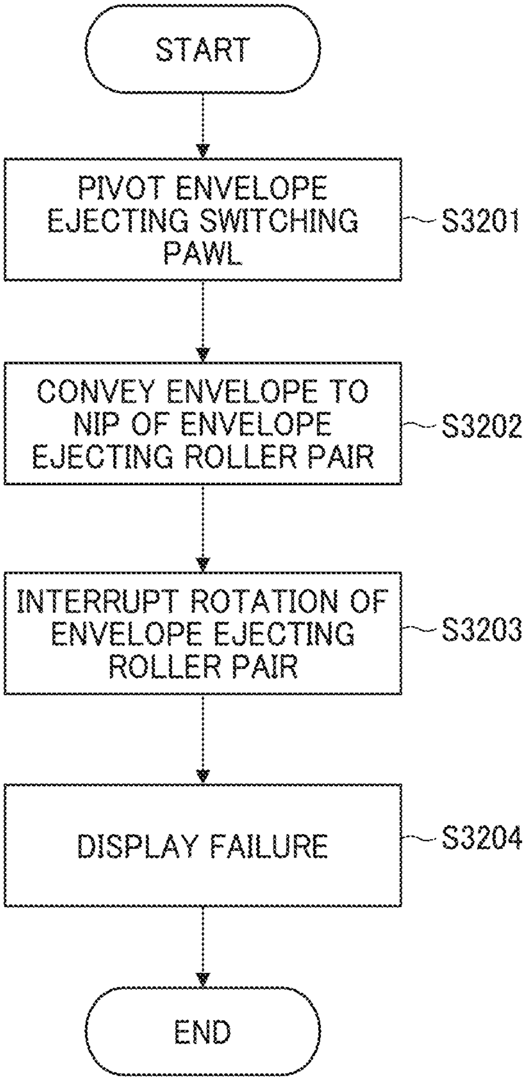
FIG. 32 is a flowchart of another example of detailed processes of the series of processes for conveying the envelope depicted in FIG. 26.

A description is provided of a configuration of the enclosing-sealing controller 150 according to a second embodiment of the present disclosure, that performs troubleshooting. Referring to FIG. 32 illustrating a flowchart, a detailed description is now given of another example of troubleshooting in step S2609 depicted in FIG. 26.

If the open state determiner 1513 determines that the flap length is not greater than the threshold (NO in step S2607) and that the flap ef suffers from failure that the flap ef does not open properly, that is, the open state of the flap ef is faulty, the enclosing-sealing controller 150 controls the envelope ejecting switching pawl 31 to pivot in step S3201, switching a conveyance path in switchback conveyance of the envelope E from the envelope enclosing conveyance path 1105 to the envelope ejecting path 1108.

Subsequently, the enclosing-sealing controller 150 controls the conveyance motor 170 to rotate the third vertical conveyance roller pair 131, the fourth vertical conveyance roller pair 132, and the envelope ejecting roller pair 133 to convey the envelope E to a nip of two rollers of the envelope ejecting roller pair 133, that nips the envelope E in step S3202.

When the envelope E reaches the nip of the envelope ejecting roller pair 133, the enclosing-sealing controller 150 controls the conveyance motor 170 to interrupt rotation of the envelope ejecting roller pair 133 in step S3203.

Subsequently, the enclosing-sealing controller 150 controls the display 191 to display information that failure in conveyance of the envelope E occurs in step S3204.

A description is supplementally provided of the series of processes described above with reference to drawings illustrating conveyance of the envelope E according to the second embodiment of the present disclosure.

FIGS. 28 and 29 illustrate conveyance of the envelope E in steps S2601 to S2606 depicted in FIG. 26, similarly to the first embodiment. FIG. 28 illustrates the envelope E at the time during the time period from step S2601 to step S2603. FIG. 29 illustrates the envelope E when the enclosing-sealing controller 150 performs determination in step S2607 after step S2606.

Figure 33:
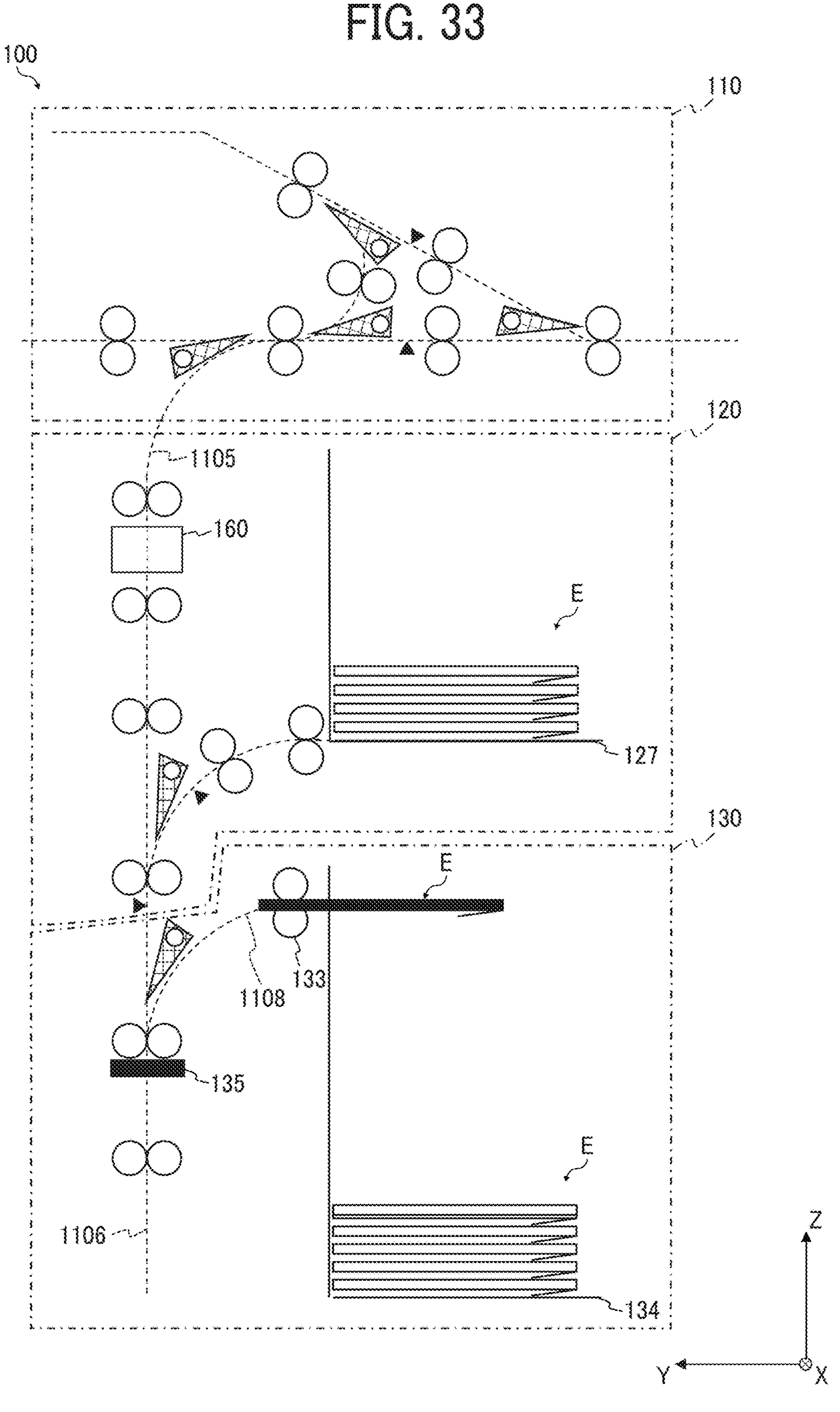
FIG. 33 is a cross-sectional view of the enclosing-sealing apparatus depicted in FIG. 3, illustrating yet another process for enclosing performed by the enclosing-sealing apparatus.

When the envelope E is situated at the position illustrated in FIG. 29, the enclosing-sealing controller 150 performs determination in step S2607. Thereafter, in steps S3201, S3202, and S3203, as illustrated in FIG. 33, the envelope ejecting roller pair 133 halts and holds the envelope E before ejecting the envelope E onto the envelope ejection tray 134. The enclosing-sealing controller 150 controls the display 191 to display information that failure occurs.

According to the second embodiment described above, unlike the first embodiment, the user distinguishes the envelope E that is ejected onto the envelope ejection tray 134 properly from the envelope E that suffers from failure readily.

Like the first embodiment, according to the second embodiment also, the enclosing-sealing controller 150 uses the separation sensor 128 and the flap opening detecting sensor 129 also used to detect a conveyance state and a conveyance failure of the envelope E. Accordingly, the enclosing-sealing controller 150 determines whether or not the flap ef opens properly. Additionally, if the enclosing-sealing controller 150 determines that the flap ef suffers from failure that the flap ef does not open properly, the enclosing-sealing controller 150 performs controls to interrupt conveyance of the envelope E quickly without ejecting the envelope E onto the envelope ejection tray 134 and to display information that failure occurs.

Even if the envelope E is placed on the envelope tray 127 with the proper orientation, the flap opener 180 may not open the flap ef sufficiently. To address this circumstance, even if the flap ef partly opens, the enclosing-sealing controller 150 selects the threshold according to the flap length calculated in step S2606. Accordingly, the enclosing-sealing controller 150 detects and determines that the flap ef partly opens by comparing the calculated flap length with the threshold.

Display of failure is not limited to display of the information on the display 191. Alternatively, the enclosing-sealing apparatus 100 may incorporate a display such as a warning lamp. When the enclosing-sealing controller 150 detects failure of the flap ef (e.g., failure that the open state of the flap ef is faulty), the enclosing-sealing controller 150 turns on or blinks the warning lamp.

Display of failure may not be performed by the notification device 190 of the enclosing-sealing apparatus 100 and may be performed by the display 210 of the image forming apparatus 200.

A description is provided of variations of folding of the sheet S by the sheet folder 310.

FIGS. 34A, 34B, 34C, 34D, 34E, 35A, 35B, 35C, 35D, and 35E illustrate embodiments of sheet folders 310A and 310B as different types of configurations of the sheet folder 310 depicted in FIG. 2. The sheet folder 310 may selectively employ a plurality of types of configurations. Depending on the configuration of the sheet folder 310, even with an identical type of folding, an orientation of the image forming face Ps of the folded sheet Sf may vary when the folded sheet Sf is ejected from the sheet folder 310. In the present disclosure, the sheet folder 310A illustrated in FIGS. 34A, 34B, 34C, 34D, and 34E is defined as type A. Similarly, the sheet folder 310B illustrated in FIGS. 35A, 35B, 35C, 35D, and 35E is defined as type B. In FIGS. 34A, 34B, 34C, 34D, 34E, 35A, 35B, 35C, 35D, and 35E, the print face (e.g., the image forming face Ps) of the sheet S, that bears the image, is marked with a plurality of triangles arranged contiguously. That is, another face of the sheet S bears no image in the description below.

As illustrated in FIGS. 34A, 34B, 34C, 34D, and 34E, the sheet S conveyed into the sheet folder 310A from the image forming apparatus 200 has the image forming face Ps, that is, a lower face, when the sheet S is conveyed in the sheet conveyance direction DS.

As illustrated in FIG. 34A, the sheet S is conveyed toward a conveyance roller pair 311 from the image forming apparatus 200.

Figure 34B:
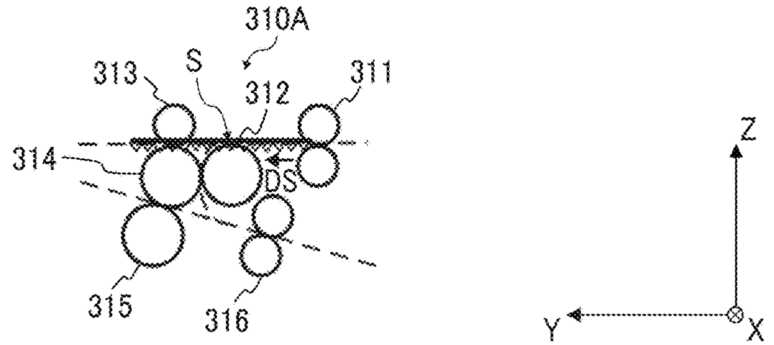
FIG. 34B is a cross-sectional view of the sheet folder depicted in FIG. 34A, illustrating another process for folding the sheet.

As illustrated in FIG. 34B, a first folding roller 312, a first folding conveyance roller 313, and a second folding roller 314 convey the sheet S conveyed downstream in the sheet conveyance direction DS by the conveyance roller pair 311 to a predetermined position.

Figure 34C:
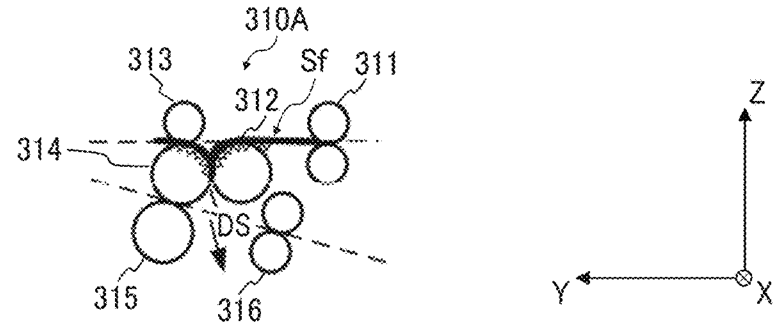
FIG. 34C is a cross-sectional view of the sheet folder depicted in FIG. 34A, illustrating yet another process for folding the sheet.

Thereafter, as illustrated in FIG. 34C, the first folding conveyance roller 313 and the second folding roller 314 rotate backward, forming a first fold on the sheet S and thereby producing the folded sheet Sf.

Figure 34D:
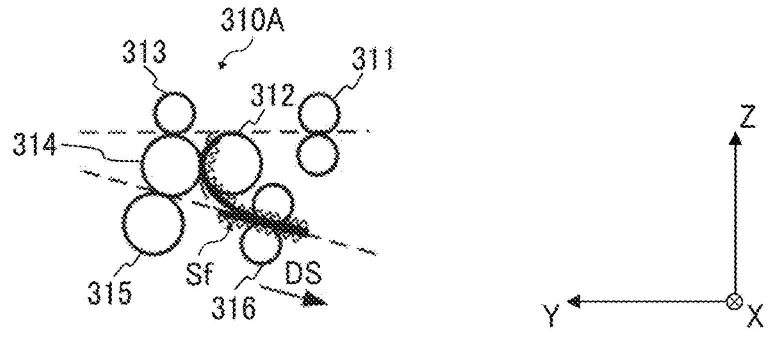
FIG. 34D is a cross-sectional view of the sheet folder depicted in FIG. 34A, illustrating yet another process for folding the sheet.

As illustrated in FIG. 34D, the first folding roller 312, the second folding roller 314, and a second folding conveyance roller pair 316 convey the folded sheet Sf produced with the first fold to a conveyance path different from a conveyance path through which the sheet S is conveyed before the first fold is produced on the sheet S. The folded sheet Sf halts at a predetermined position.

Figure 34E:
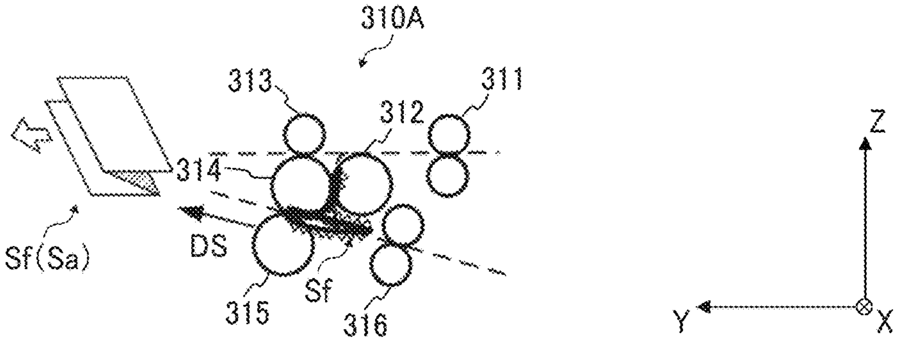
FIG. 34E is a cross-sectional view of the sheet folder depicted in FIG. 34A, illustrating yet another process for folding the sheet.

Thereafter, as illustrated in FIG. 34E, the second folding conveyance roller pair 316 rotates backward and a third folding roller 315 also rotates, conveying the folded sheet Sf downstream in the sheet conveyance direction DS. Thus, a second fold is produced on the folded sheet Sf, completing a 6-page accordion sheet. In this case, the image forming face Ps of the folded sheet Sf is situated on a lower face that faces down in a direction perpendicular to the sheet conveyance direction DS.

A description is provided of folding by the sheet folder 310B of type B.

As illustrated in FIGS. 35A, 35B, 35C, 35D, and 35E, the sheet folder 310B of type B folds the sheet S while the sheet S conveyed from the image forming apparatus 200 is conveyed in the negative Z-direction. The image forming face Ps of the sheet S when the sheet S enters the sheet folder 310B is disposed opposite the positive Y-direction, for example.

Figure 35A:
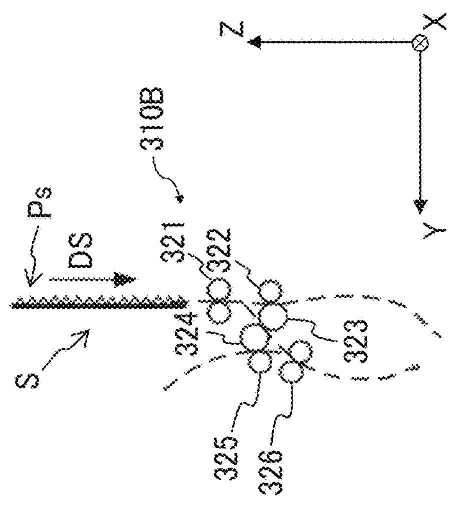
FIG. 35A is a cross-sectional view of a sheet folder of another type interlocked with the enclosing-sealing apparatus depicted in FIG. 3, illustrating a process for folding a sheet.

As illustrated in FIG. 35A, the sheet S is conveyed toward a first conveyance roller pair 321 from the image forming apparatus 200.

Figure 35B:
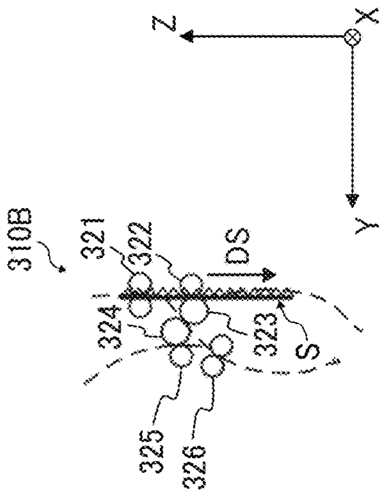
FIG. 35B is a cross-sectional view of the sheet folder depicted in FIG. 35A, illustrating another process for folding the sheet.

Subsequently, as illustrated in FIG. 35B, the first conveyance roller pair 321, a first folding roller 323, and a first folding conveyance roller 322 convey the sheet S downward in the sheet conveyance direction DS to a predetermined position. Thereafter, the sheet S halts.

Figure 35C:
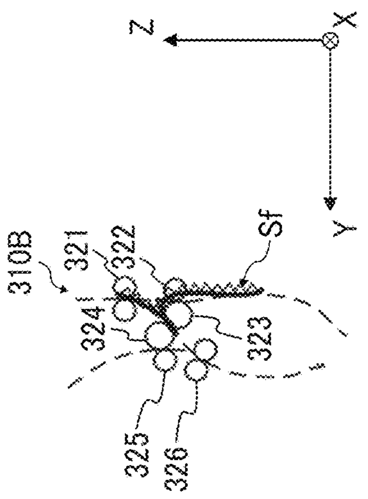
FIG. 35C is a cross-sectional view of the sheet folder depicted in FIG. 35A, illustrating yet another process for folding the sheet.

Thereafter, as illustrated in FIG. 35C, the first folding conveyance roller 322 and the first folding roller 323 rotate backward and a second folding roller 324 rotates, forming a first fold on the sheet S and thereby producing the folded sheet Sf.

Figure 35D:
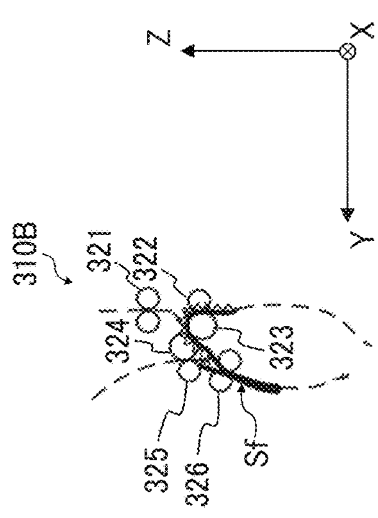
FIG. 35D is a cross-sectional view of the sheet folder depicted in FIG. 35A, illustrating yet another process for folding the sheet.

Further, as illustrated in FIG. 35D, a second conveyance roller pair 326 also rotates, conveying the folded sheet Sf to a predetermined position where the folded sheet Sf halts.

Figure 35E:
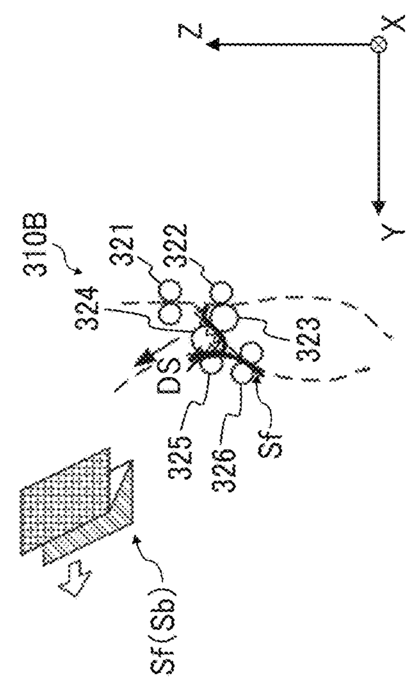
FIG. 35E is a cross-sectional view of the sheet folder depicted in FIG. 35A, illustrating yet another process for folding the sheet.

Thereafter, as illustrated in FIG. 35E, the second conveyance roller pair 326 rotates backward and a second folding conveyance roller 325 rotates, conveying the folded sheet Sf upward in FIG. 35E. The second folding roller 324 and the second folding conveyance roller 325 form a second fold on the folded sheet Sf, completing a 6-page accordion sheet. In this case, unlike in the sheet folder 310A of type A, the image forming face Ps of the folded sheet Sf is situated on an upper face that faces up in a direction perpendicular to the sheet conveyance direction DS. As described above, like the sheet folder 310A of type A and the sheet folder 310B of type B, even if the sheet folders 310A and 310B of different types produce the identical 6-page accordion sheet, the print face of the folded sheet Sf, that is, a folded sheet Sa depicted in FIG. 34E, is oriented in a direction different from a direction in which the print face of the folded sheet Sf, that is, a folded sheet Sb depicted in FIG. 35E, is oriented with respect to the sheet conveyance direction DS. For example, the print face printed with an address or the like may vary depending on the type of the sheet folder 310 as the lower face or the upper face when the folded sheet Sf enters the enclosing-sealing apparatus 100. To address this circumstance, as described below, the enclosing-sealing controller 150 of the enclosing-sealing apparatus 100 according to the embodiments of the present disclosure controls enclosing by reversing the folded sheet Sf while the folded sheet Sf is conveyed and uniformly orienting the image forming face Ps in a predetermined direction based on data indicating the type of the sheet folder 310 before enclosing the folded sheet Sf into the envelope E.

The technology of the present disclosure is not limited to the embodiments described above. The embodiments of the present disclosure may be modified variously within the scope of the present disclosure. The technology of the present disclosure includes technical matters encompassed by a technological concept within the scope of the present disclosure.

Although the embodiments described above disclose preferable examples, the embodiments may be modified into modification examples by those skilled in the art based on the present disclosure. The modification examples are also encompassed by the technological concept within the scope of the present disclosure.

A description is provided of advantages of an enclosing-sealing apparatus (e.g., the enclosing-sealing apparatus 100).

As illustrated in FIGS. 2, 3, and 4, the enclosing-sealing apparatus according to an embodiment of the present disclosure encloses an enclosure (e.g., the sheet S or the folded sheet Sf) into an envelope (e.g., the envelope E) conveyed to an enclosing position and seals the envelope. The enclosing-sealing apparatus includes a conveyance roller (e.g., the first vertical conveyance roller pair 122, the second vertical conveyance roller pair 123, the flap opening roller pair 124, and the envelope conveyance roller pair 126), an envelope conveyance path (e.g., the envelope enclosing conveyance path 1105 and the envelope entry path 1107), a flap opener (e.g., the flap opener 180), a first envelope detector (e.g., the separation sensor 128), a second envelope detector (e.g., the flap opening detecting sensor 129), and a controller (e.g., the enclosing-sealing controller 150).

The conveyance roller conveys the envelope to the enclosing position through the envelope conveyance path. The flap opener is disposed in the envelope conveyance path and opens a flap (e.g., the flap ef) of the envelope while the envelope is conveyed to the enclosing position. The first envelope detector is disposed upstream from the flap opener in an envelope conveyance direction (e.g., the envelope conveyance direction DE) in which the envelope is conveyed in the envelope conveyance path. The first envelope detector detects ends, that is, a leading end and a trailing end, of the envelope in the envelope conveyance direction while the envelope is conveyed. The second envelope detector is disposed downstream from the flap opener in the envelope conveyance direction in the envelope conveyance path. The second envelope detector detects the leading end and the trailing end of the envelope in the envelope conveyance direction in an open state in which the flap opens while the envelope is conveyed. The controller controls enclosing of the enclosure into the envelope. The controller determines the open state of the flap based on a detection result sent from the first envelope detector and a detection result sent from the second envelope detector. If the controller determines that the open state of the flap is faulty, the controller performs troubleshooting for enclosing the enclosure into the envelope.

Accordingly, the enclosing-sealing apparatus is downsized and detects the open state of the flap and a flap length precisely.

The image forming apparatus 200 may be a copier, a printer, a facsimile machine, a multifunction peripheral (MFP) having at least two of copying, printing, scanning, facsimile, and plotter functions, an inkjet recording apparatus, or the like.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An enclosing-sealing apparatus for enclosing an enclosure into an envelope conveyed to an enclosing position and sealing the envelope, the enclosing-sealing apparatus comprising:

a conveyance roller configured to convey the envelope to the enclosing position;

a flap opener configured to open a flap of the envelope while the envelope is conveyed to the enclosing position;

a first envelope detector disposed upstream from the flap opener in an envelope conveyance direction in which the envelope is conveyed, the first envelope detector configured to detect a leading end and a trailing end of the envelope in the envelope conveyance direction while the envelope is conveyed;

a second envelope detector disposed downstream from the flap opener in the envelope conveyance direction, the second envelope detector configured to detect the leading end and the trailing end of the envelope in the envelope conveyance direction in an open state in which the flap opens while the envelope is conveyed; and a controller configured to control enclosing of the enclosure into the envelope, the controller configured to determine the open state of the flap based on a first detection result sent from the first envelope detector and a second detection result sent from the second envelope detector, the controller configured to perform troubleshooting for enclosing the enclosure into the envelope if the controller determines that the open state of the flap is faulty.

2. The enclosing-sealing apparatus according to claim 1, further comprising an envelope conveyance path through which the envelope is conveyed to the enclosing position, wherein the flap opener, the first envelope detector, and the second envelope detector are disposed in the envelope conveyance path.

3. The enclosing-sealing apparatus according to claim 1, wherein the controller is configured to calculate a first envelope length of the envelope in the envelope conveyance direction based on the first detection result, wherein the controller is configured to calculate a second envelope length of the envelope in the envelope conveyance direction based on the second detection result, and wherein the controller is configured to determine the open state of the flap based on the first envelope length and the second envelope length.

4. The enclosing-sealing apparatus according to claim 3, wherein the controller is configured to calculate a flap length of the flap in the envelope conveyance direction based on the first envelope length and the second envelope length, and wherein the controller is configured to determine the open state of the flap based on the flap length.

5. The enclosing-sealing apparatus according to claim 3, wherein the controller is configured to subtract the first envelope length from the second envelope length to calculate a flap length of the flap in the envelope conveyance direction, and wherein the controller is configured to determine that the open state of the flap is faulty if the controller determines that the flap length is not greater than a predetermined threshold.

6. The enclosing-sealing apparatus according to claim 1, wherein the controller is configured to interrupt enclosing of the enclosure into the envelope if the controller determines that the open state of the flap is faulty.

7. The enclosing-sealing apparatus according to claim 1, further comprising an envelope ejection tray onto which the envelope is ejected.

8. The enclosing-sealing apparatus according to claim 7, further comprising an envelope ejecting roller configured to eject the envelope onto the envelope ejection tray.

9. The enclosing-sealing apparatus according to claim 8, wherein the controller is configured to control the envelope ejecting roller to eject the envelope onto the envelope ejection tray without enclosing the enclosure into the envelope if the controller determines that the open state of the flap is faulty.

10. The enclosing-sealing apparatus according to claim 8, wherein the controller is configured to control the envelope ejecting roller to interrupt rotation and hold the envelope without enclosing the enclosure into the envelope and ejecting the envelope onto the envelope ejection tray if the controller determines that the open state of the flap is faulty.

11. The enclosing-sealing apparatus according to claim 1, further comprising a notifier configured to notify a status of enclosing the enclosure into the envelope.

12. The enclosing-sealing apparatus according to claim 11, wherein the controller is configured to control the notifier to notify the troubleshooting if the controller determines that the open state of the flap is faulty.

13. The enclosing-sealing apparatus according to claim 1, wherein each of the first envelope detector and the second envelope detector includes a sensor.

14. An image forming system comprising:

an image forming apparatus configured to form an image on a medium; and an enclosing-sealing apparatus configured to enclose the medium sent from the image forming apparatus into an envelope conveyed to an enclosing position and seal the envelope, the enclosing-sealing apparatus comprising:

a conveyance roller configured to convey the envelope to the enclosing position;

a flap opener configured to open a flap of the envelope while the envelope is conveyed to the enclosing position;

a first envelope detector disposed upstream from the flap opener in an envelope conveyance direction in which the envelope is conveyed, the first envelope detector configured to detect a leading end and a trailing end of the envelope in the envelope conveyance direction while the envelope is conveyed;

a second envelope detector disposed downstream from the flap opener in the envelope conveyance direction, the second envelope detector configured to detect the leading end and the trailing end of the envelope in the envelope conveyance direction in an open state in which the flap opens while the envelope is conveyed; and a controller configured to control enclosing of the medium into the envelope, the controller configured to determine the open state of the flap based on a first detection result sent from the first envelope detector and a second detection result sent from the second envelope detector, the controller configured to perform troubleshooting for enclosing the medium into the envelope if the controller determines that the open state of the flap is faulty.

15. The image forming system according to claim 14, wherein the medium includes a sheet.

16. The image forming system according to claim 14, further comprising a folding apparatus configured to fold the medium bearing the image and send the folded medium to the enclosing-sealing apparatus.

* * * * *